United States Patent
Hochstein et al.

(10) Patent No.: US 9,926,148 B2
(45) Date of Patent: Mar. 27, 2018

(54) PEDESTRIAN-VEHICLE SAFETY SYSTEMS FOR LOADING DOCKS

(71) Applicants: Allan H. Hochstein, Milwaukee, WI (US); Andrew Brooks, Thiensville, WI (US); Jason Senfleben, Hartford, WI (US); Kenneth C. Bowman, Cedarburg, WI (US); Matthew Sveum, Wauwatosa, WI (US); James C. Boerger, Racine, WI (US); Joseph Manone, Mequon, WI (US); Matthew McNeill, Whitefish Bay, WI (US)

(72) Inventors: Allan H. Hochstein, Milwaukee, WI (US); Andrew Brooks, Thiensville, WI (US); Jason Senfleben, Hartford, WI (US); Kenneth C. Bowman, Cedarburg, WI (US); Matthew Sveum, Wauwatosa, WI (US); James C. Boerger, Racine, WI (US); Joseph Manone, Mequon, WI (US); Matthew McNeill, Whitefish Bay, WI (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 499 days.

(21) Appl. No.: 14/317,824

(22) Filed: Jun. 27, 2014

(65) Prior Publication Data
US 2015/0375947 A1     Dec. 31, 2015

(51) Int. Cl.
*G01V 8/20* (2006.01)
*G01S 13/04* (2006.01)
(Continued)

(52) U.S. Cl.
CPC ......... *B65G 69/2882* (2013.01); *B60Q 9/002* (2013.01); *G01V 8/20* (2013.01); *G06K 9/00624* (2013.01); *H04N 7/18* (2013.01)

(58) Field of Classification Search
CPC ...... B60Q 9/002; B65G 69/2882; G01V 8/20; G06K 9/00624; H04N 7/18
(Continued)

(56) References Cited

U.S. PATENT DOCUMENTS 3,832,709 A * 8/1974 Klein .................... G01S 13/348
                                                    342/114
4,704,610 A * 11/1987 Smith .................... G08G 1/087
                                                    340/906
(Continued)

FOREIGN PATENT DOCUMENTS

EP     0855324     7/1998
EP     1775692     4/2007
(Continued)

OTHER PUBLICATIONS

Patent Cooperation Treaty, "International Search Report," issued in connection with Application No. PCT/US2015/037367, dated Sep. 15, 2015, 8 pages.
(Continued)

*Primary Examiner* — Jamie Atala
*Assistant Examiner* — James Boylan
(74) *Attorney, Agent, or Firm* — Hanley, Flight & Zimmerman, LLC

(57) ABSTRACT

Pedestrian-Vehicle safety systems for loading docks are disclosed herein. An example method disclosed herein includes sensing whether a person is within a certain area adjacent a dock face of a loading dock, emitting a first signal in response to sensing the person being present within the certain area, sensing rearward movement of a vehicle toward
(Continued)

the dock face, emitting a second signal in response to sensing rearward movement of the vehicle while the person is not present in the certain area, and emitting a third signal in response to sensing both the rearward movement of the vehicle and the person being present within the certain area.

23 Claims, 36 Drawing Sheets

(51) Int. Cl.
    *G01S 17/93*     (2006.01)
    *H04N 7/18*     (2006.01)
    *B65G 69/28*     (2006.01)
    *B60Q 9/00*     (2006.01)
    *G06K 9/00*     (2006.01)

(58) Field of Classification Search
    USPC .......................... 250/216; 340/435; 348/143
    See application file for complete search history.

(56) References Cited

U.S. PATENT DOCUMENTS

| | | | |
|---|---|---|---|
| 4,928,101 A | 5/1990 | Favors | |
| 5,016,017 A * | 5/1991 | Kodera | G01S 13/60 342/106 |
| 6,614,536 B1 * | 9/2003 | Doemens | G01S 7/4802 356/28 |
| 8,547,234 B2 | 10/2013 | Maly et al. | |
| 8,806,689 B2 | 8/2014 | Riviere et al. | |
| 2002/0041231 A1 | 4/2002 | Drinkard | |
| 2002/0118232 A1 * | 8/2002 | Watanabe | G06F 3/017 715/863 |
| 2002/0148952 A1 * | 10/2002 | Tatum | G01S 7/412 250/221 |
| 2002/0190849 A1 * | 12/2002 | Orzechowski | B66F 9/0755 340/435 |
| 2004/0075046 A1 | 4/2004 | Beggs et al. | |
| 2004/0098224 A1 * | 5/2004 | Takahashi | G01S 7/4026 702/181 |
| 2005/0073438 A1 * | 4/2005 | Rodgers | G08G 1/166 340/944 |
| 2005/0140319 A1 | 6/2005 | Takashima | |
| 2006/0137261 A1 * | 6/2006 | Maly | B65G 69/2882 52/36.3 |
| 2006/0162254 A1 | 7/2006 | Imai et al. | |
| 2006/0187037 A1 | 8/2006 | Eubelen et al. | |
| 2007/0001830 A1 * | 1/2007 | Dagci | B60K 31/185 340/438 |
| 2007/0008124 A1 | 1/2007 | Stadler et al. | |
| 2007/0182550 A1 | 8/2007 | Castello et al. | |
| 2008/0022596 A1 | 1/2008 | Boerger et al. | |
| 2008/0127435 A1 | 6/2008 | Maly et al. | |
| 2008/0223667 A1 | 9/2008 | Tinone et al. | |
| 2008/0272955 A1 * | 11/2008 | Yonak | G01S 13/931 342/54 |
| 2010/0054535 A1 * | 3/2010 | Brown | G06K 9/00369 382/103 |
| 2010/0123558 A1 * | 5/2010 | Park | G01S 13/58 340/10.4 |
| 2010/0162285 A1 | 6/2010 | Cohen et al. | |
| 2011/0035199 A1 * | 2/2011 | Kristofik | G06F 17/5009 703/6 |
| 2011/0220439 A1 | 9/2011 | Bellota | |
| 2012/0025964 A1 | 2/2012 | Beggs et al. | |
| 2012/0045090 A1 * | 2/2012 | Bobbitt | G06K 9/00771 382/103 |
| 2012/0146792 A1 * | 6/2012 | De Luca | G08B 21/245 340/568.1 |
| 2013/0257607 A1 * | 10/2013 | Rigby | B60R 16/02 340/435 |
| 2013/0312205 A1 * | 11/2013 | Riviere | B65G 69/2882 14/71.3 |
| 2015/0382432 A1 * | 12/2015 | Eskonen | H05B 37/0227 315/153 |

FOREIGN PATENT DOCUMENTS

| | | |
|---|---|---|
| EP | 2206664 | 7/2010 |
| EP | 2465796 | 6/2012 |
| GB | 2119987 | 11/1983 |
| WO | 2012084919 | 6/2012 |

OTHER PUBLICATIONS

Patent Cooperation Treaty, "Written Opnion," issued in connection with Application No. PCT/US2015/037367, dated Sep. 15, 2015, 8 pages.
Crawford Hafa, "Hafa Eye Operating Manual," dated Mar. 31, 2005, 29 pages.
IFM, "Image Sensor," 1998-2015, retrieved from http://www.ifm.com/ifmus/web/pmd3d-portal1.htm; http://www.ifm.com/ifmus/web/padv/020_020_010_010_010_010.html; http://www.ifm.com/ifmus/web/news/pnews_8r3n6b.html; http://www.ifm.com/ifmus/web/news/pnews_8t9jh3.html on Jan. 27, 2015, 7 pages.
BEA, "Sparrow: Unidirectional opening sensor for automatic industrial doors," Jan. 2010, last retrieved from http://www.bea-industrial.be/uploads/docs/manuals/ug_sparrow_en_v1.pdf, on Jan. 27, 2015, 2 pages.
BEA, "Sparrow: Opening Sensor for Industrial Doors Commercial sheet," last retrieved from http://www.bea-industrial.be/uploads/docs/product_sheets/ind_cs_sparrow_en_v1_web.pdf, on Jan. 27, 2015, 2 pages.
BEA, "LZR -I100/-I110 Laser Scanners for Industrial Doors," May 2011, last retrieved from http://www.bea-industrial.be/uploads/docs/manuals/ug_lzr-100-110_en_v5.pdf, on Jan. 27, 2015, 12 pages.
BEA, "LZR-i100 Safety Sensor for Industrial Doors Commercial sheet," last retrieved from http://www.bea-industrial.be/uploads/docs/product_sheets/ind_cs_LZR-i100_en_v1_web.pdf, on Jan. 27, 2015, 2 pages.
BEA, "LZR-i110 Safety Sensor for Industrial Doors Commercial sheet," last retrieved from http://www.bea-industrial.be/uploads/docs/product_sheets/ind_cs_LZR-i110_en_v1_web.pdf, on Jan. 27, 2015, 2 pages.
BEA, "Falcon/-XL Opening sensor for automatic industrial doors," last retrieved from http://www.bea-industrial.be/uploads/docs/manuals/ug_falcon_en_v3.pdf, on Jan. 27, 2015, 2 pages.
BEA, "Falcon: Opening Sensor for Industrial Doors Commercial sheet," last retrieved from http://www.bea-industrial.be/uploads/docs/product_sheets/ind_cs_falcon_falconxl_en_v1_web.pdf, on Jan. 27, 2015, 2 pages.
BEA, "LZR i30 Safety Sensor for Industrial Doors," Nov. 22, 2013, last retrieved from http://www.beainc.com/wp-content/themes/bea/documents/79.0006.04.En%20LZR-i30%2020131122.pdf, on Jan. 27, 2015, 2 pages.
Pepperl & Fuchs, "Ultrasonic sensor UC4000-30GM-IUR2-V15 Technical data," Aug. 12, 2014, last retrieved from http://files.pepperl-fuchs.com/selector_files/navi/productInfo/edb/104094_eng.pdf on Jan. 27, 2015, 5 pages.
Pepperl & Fuchs, "Multi-Ray LED Scanner OMD8000-R2100-R2-2V15 Dimensions," Sep. 25, 2014, last retrieved from http://files.pepperl-fuchs.com/selector_files/navi/productInfo/edb/264888_eng.pdf, on Jan. 27, 2015, 3 pages.
Internatinal Bureau, "International Preliminary Report on Patentability" issued, in connection with International Application No. PCT/US2015/037367, dated Jan. 5, 2017 (10 pages).
IP Australia, "Examination Report No. 1," issued in connection with Australian Patent Application No. 2015280046, dated Oct. 31, 2017, 5 pages.

(56) References Cited

OTHER PUBLICATIONS

International Searching Authority, "International Search Report", issued in connection with International Application No. PCT/US2017/054951, dated Dec. 20, 2017, 4 pages.

International Searching Authority, "Written Opinion", issued in connection with International Application No. PCT/US2017/054951, dated Dec. 20, 2017, 6 pages.

United States Patent and Trademark Office, "Final Office Action," issued in connection with U.S. Appl. No. 15/286,177, Dec. 28, 2017, 16 pages.

Canadian Intellectual Property Office, "Office Action", issued in connection with Canadian Application No. 2,952,730, dated Dec. 29, 2017, 4 pages.

IP Australia, "Notice of Acceptance," issued in connection with Australian Application No. 2015280046, dated Jan. 3, 2018, 4 pages.

\* cited by examiner

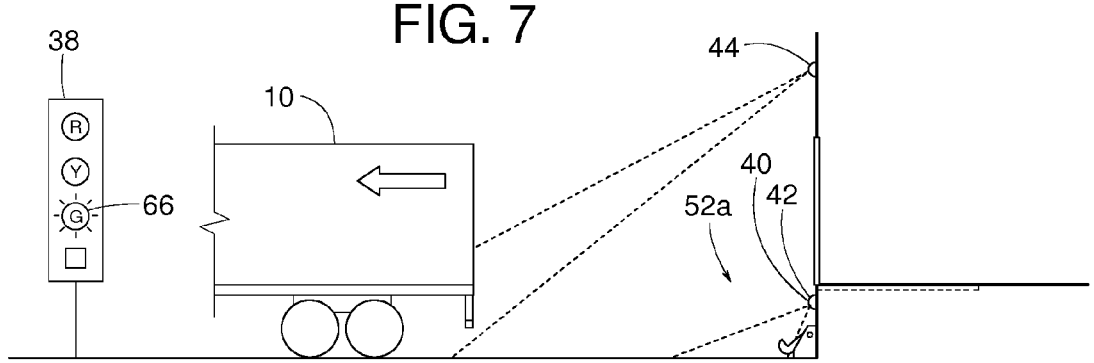
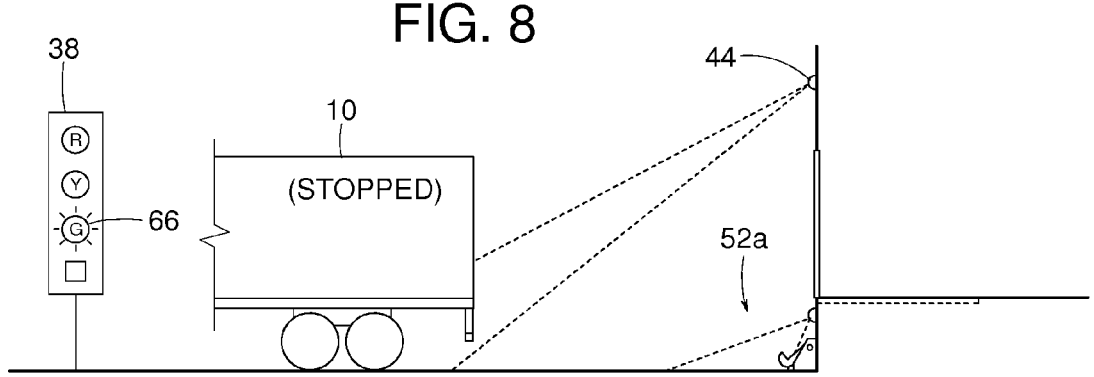
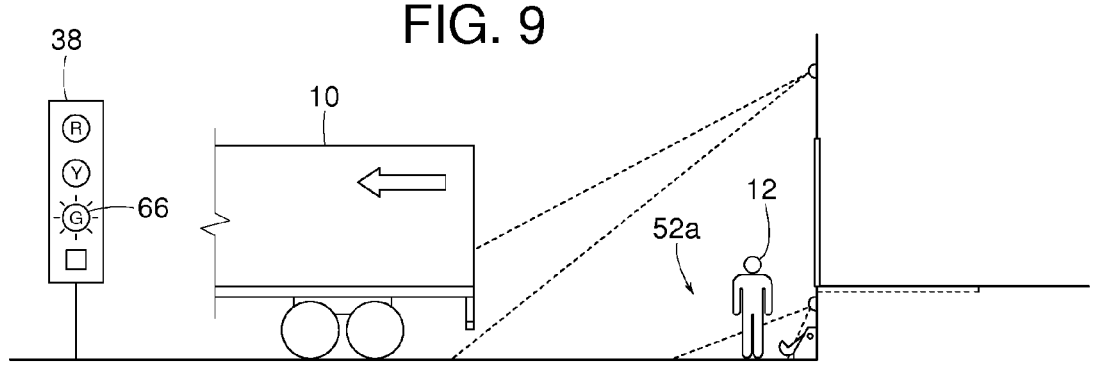

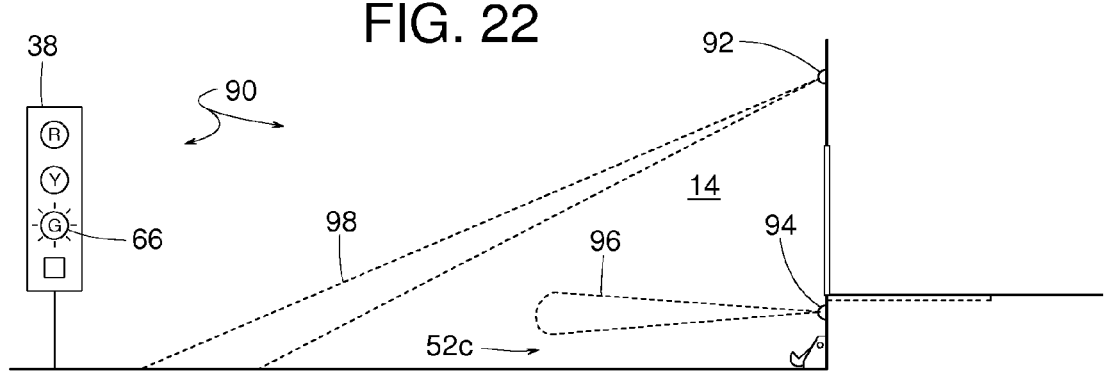
FIG. 22
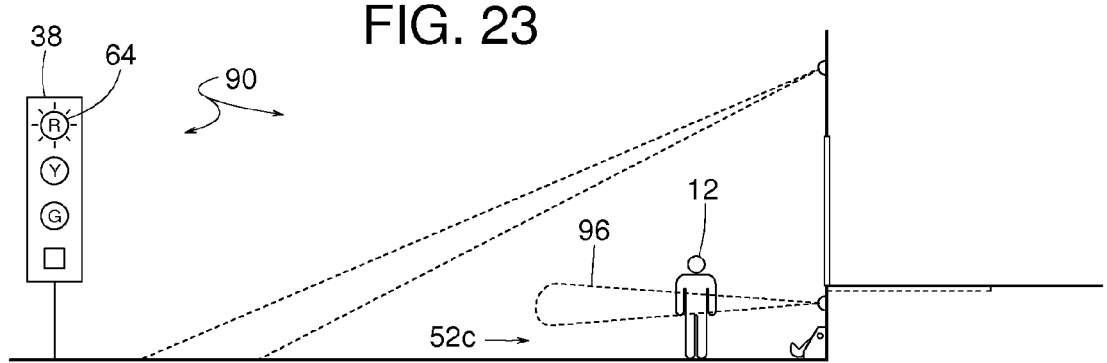
FIG. 23
FIG. 24
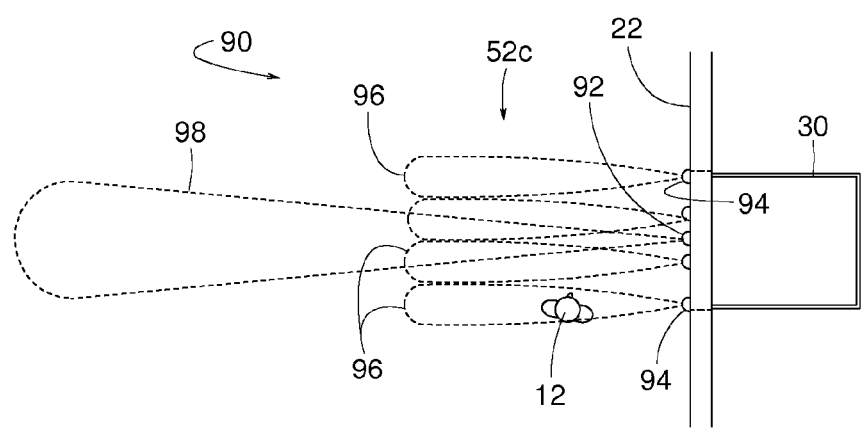

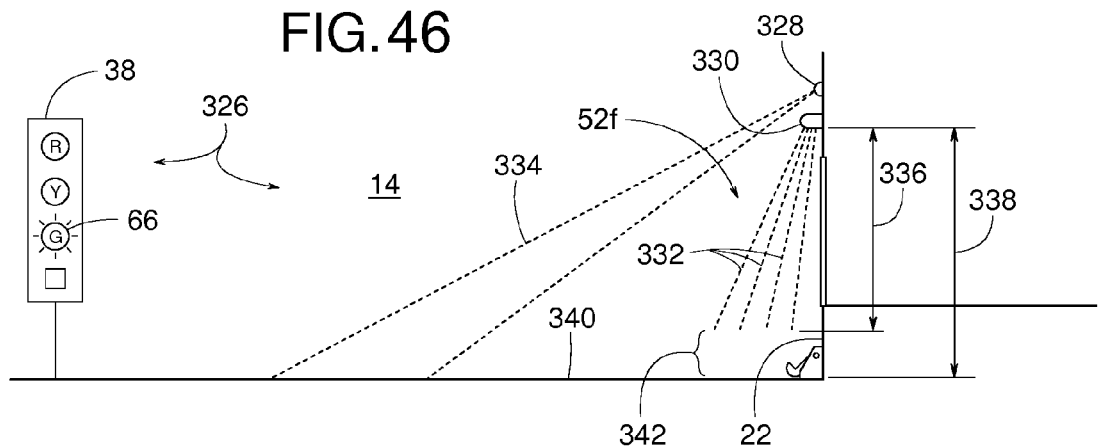
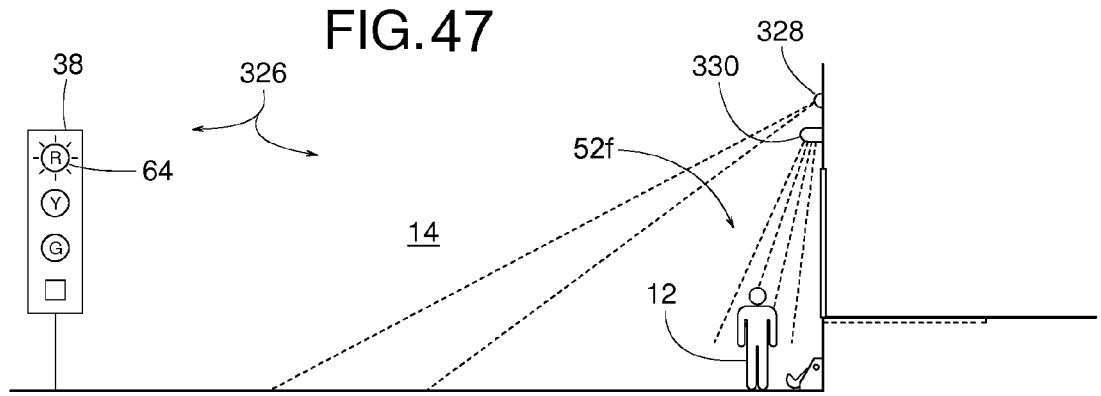
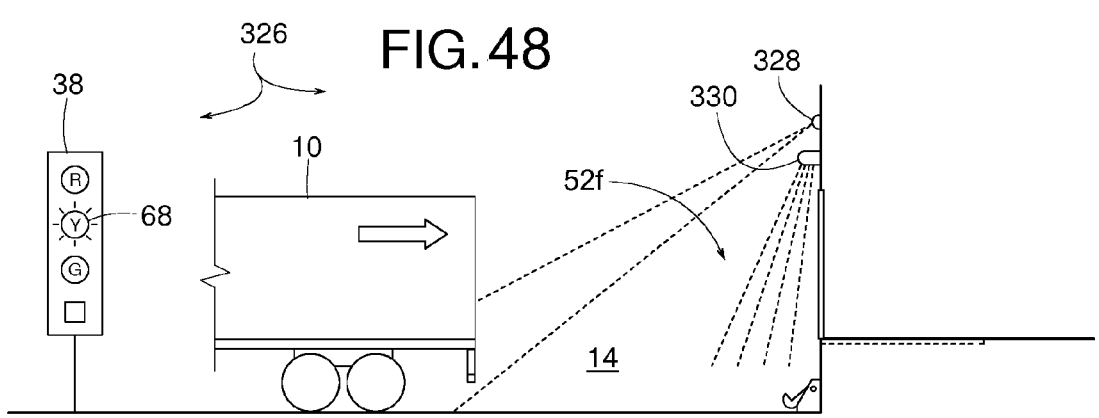

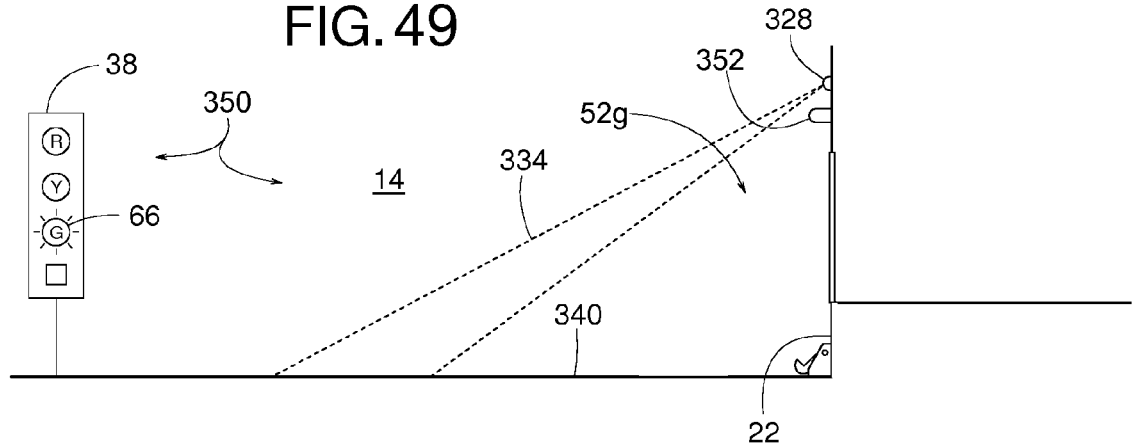
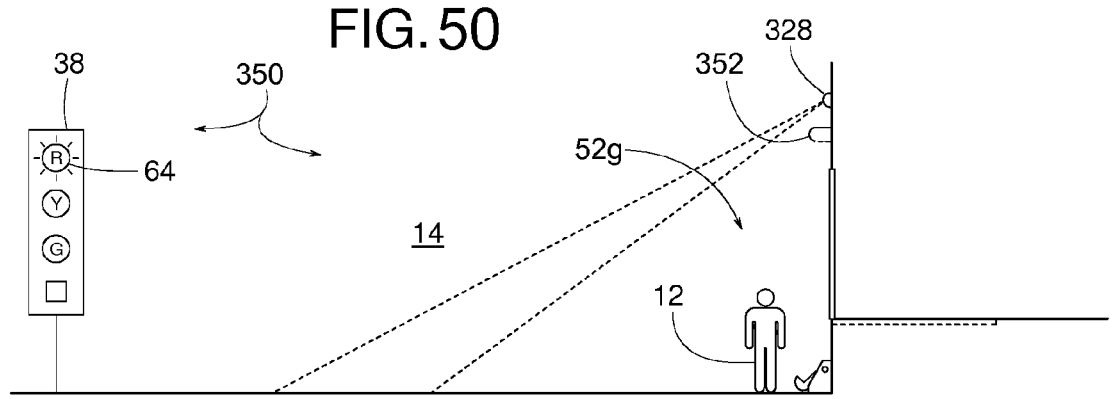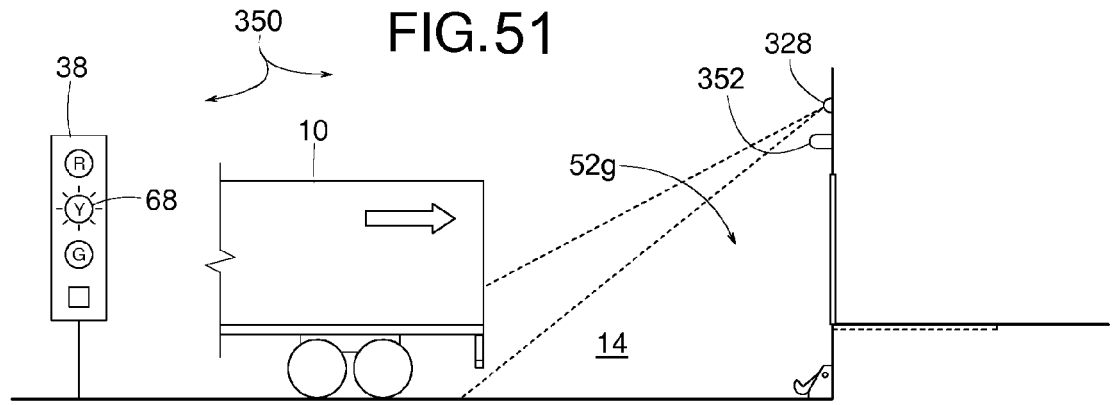

PEDESTRIAN-VEHICLE SAFETY SYSTEMS FOR LOADING DOCKS

FIELD OF THE DISCLOSURE

The present disclosure relates generally to safety systems and, more specifically, to pedestrian-vehicle safety systems for loading docks.

BACKGROUND

Typical loading docks provide an area for trucks to back up next to an elevated platform of a building so that cargo can be readily transferred between the truck and the building. Some loading docks include equipment, such as dock levelers and/or vehicle restraints. Dock levelers provide an adjustable bridge between the platform and the truck bed. Vehicle restraints help prevent the truck from prematurely driving away from the platform.

To reduce the likelihood of a truck accidentally striking or crushing personnel that might be in the area, some loading docks might have various vehicle and/or personnel sensing systems. Although such systems might determine whether a person is within a certain area while a vehicle is present, such systems do not address certain conditions where an early warning signal or a preliminary alert might be helpful even though a collision is neither imminent nor likely to occur.

BRIEF DESCRIPTION OF THE DRAWINGS

FIG. 7 is a side view similar to FIG. 3 but without the person present at the loading dock and showing the vehicle moving forward in a direction away from the loading dock.

FIG. 8 is a side view similar to FIG. 3 but without the person present at the loading dock and the vehicle stationary at the loading dock.

FIG. 9 is a side view similar to FIG. 3 but with the vehicle moving forward in a direction away from the loading dock.

FIG. 22 is a side view of FIG. 21.

FIG. 23 is a side view similar to FIG. 22 but with a person present at a loading dock.

FIG. 24 is a top view of FIG. 23.

FIG. 46 is a side view of another example safety system constructed in accordance with the teachings disclosed herein.

FIG. 47 is a side view similar to FIG. 46 but showing a person present at a loading dock.

FIG. 48 is a side view similar to FIG. 46 but showing a vehicle backing toward a dock face of the loading dock.

FIG. 49 is a side view of another example safety system constructed in accordance with the teachings disclosed herein.

FIG. 50 is a side view similar to FIG. 49 but showing a person present at a loading dock.

FIG. 51 is a side view similar to FIG. 49 but showing a vehicle moving toward a dock face of the loading dock.

DETAILED DESCRIPTION

Example safety methods disclosed herein for use at truck loading docks employ sensor systems that are able to not only detect personnel and vehicles but can also distinguish the personnel from the vehicles. In some examples, the sensor systems disclosed herein detect whether a vehicle is approaching a dock, leaving the dock, or is parked at the dock. Some example methods and systems disclosed herein provide non-emergency alert signals that notify personnel that a vehicle is present at the dock but is either stopped or restrained relative to, or are departing from, the dock area. In some examples disclosed herein, warning signals provide variable outputs reflecting a magnitude or urgency of certain potential conditions (e.g., accidents). Some example methods and systems disclosed herein provide a graphical indoor display that indicates outdoor operating conditions.

Figure 1:
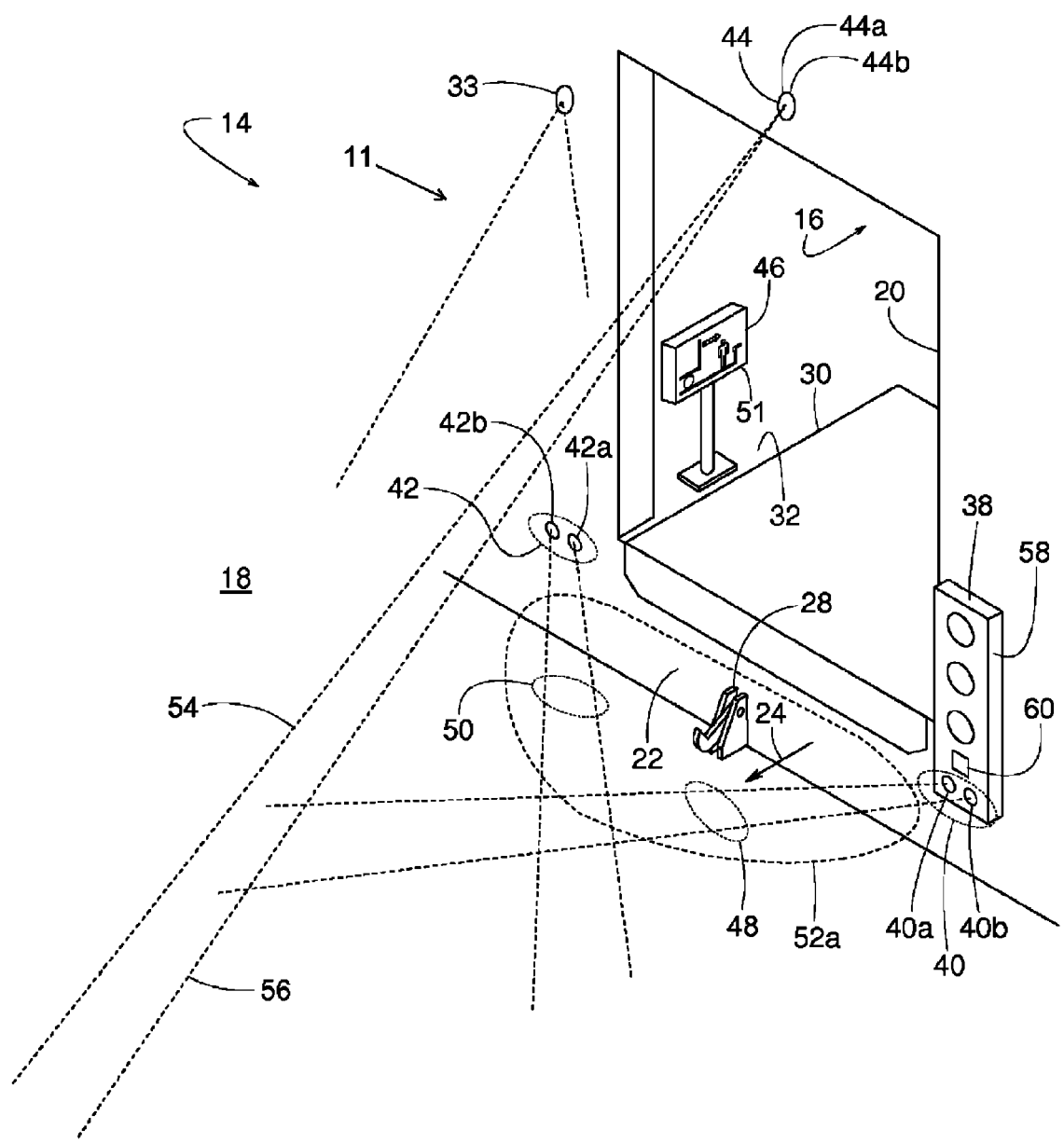
FIG. 1 is a perspective view of an example safety system constructed in accordance with the teachings disclosed herein.
Figure 2:
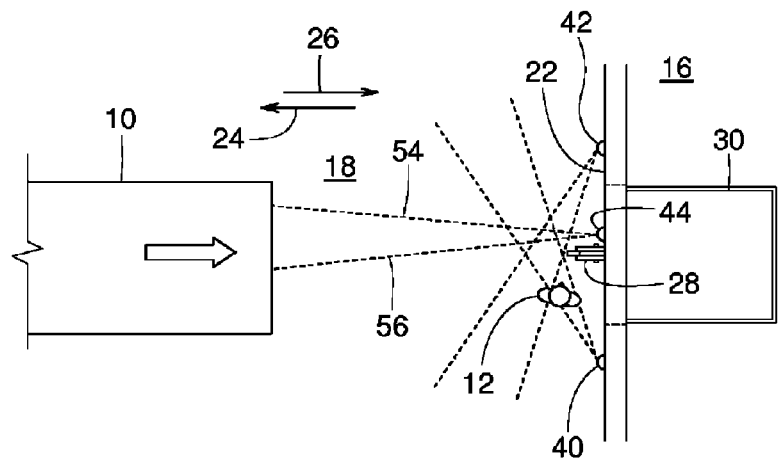
FIG. 2 is a top view of FIG. 1 but showing a person and a vehicle present at a loading dock.
Figure 3:
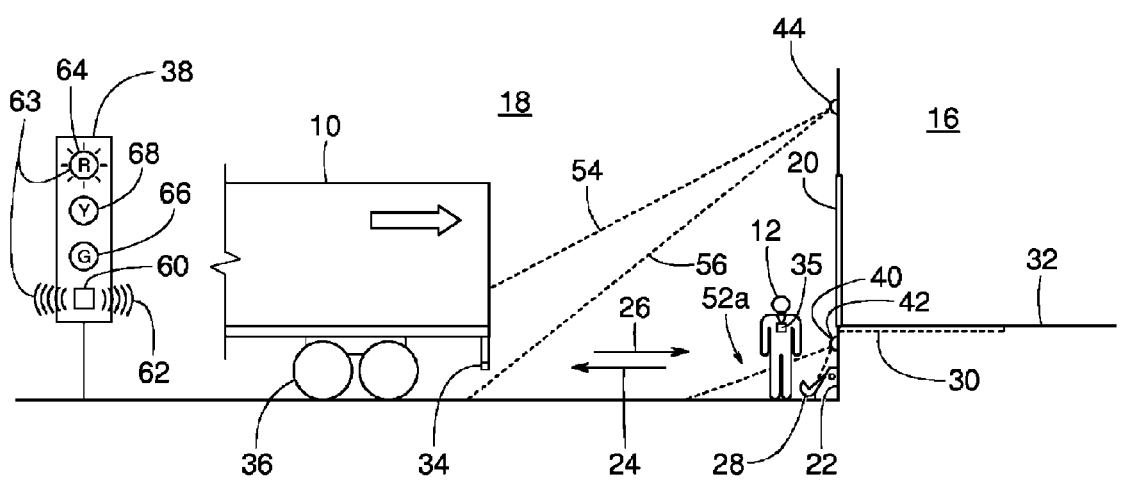
FIG. 3 is a side view of FIG. 2.
Figure 55:
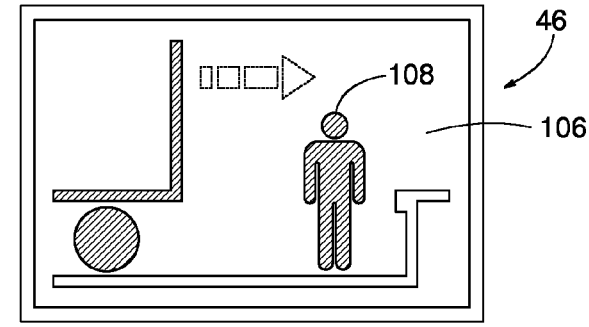
FIG. 55 is a front view similar to FIG. 52 but with the example signal device displaying another example signal.

FIGS. 1-55 show example safety apparatus and methods that use sensors, sensing systems, electronic systems, signal devices, and/or control strategies to prevent or reduce a likelihood of a collision between a vehicle 10 and a person 12 at a loading dock 14. The loading dock 14 of the illustrated example includes an indoor area 16, an outdoor area 18, a doorway 20, and a dock face 22 that generally faces in a forward direction 24 toward the outdoor area 18. The dock face 22 generally facing in a forward direction does not necessarily mean that the dock face 22 is perfectly planar and vertical but rather that the dock face 22 is orientated or faces more toward the outdoor area 18 than the toward indoor area 16. Thus, as the vehicle 10 backs up toward the dock face 22, the vehicle 10 travels or moves in a rearward direction 26 (FIGS. 2 and 3).

Some examples of the loading dock 14 disclosed herein may also include a vehicle restraint 28 and a dock leveler 30. To facilitate transferring cargo between the vehicle 10 and an indoor platform 32, the dock leveler 30 provides an adjustable bridge spanning a gap that might exist between the dock face 22 and a rear edge of the vehicle 10. To help prevent the vehicle 10 from prematurely pulling away from the dock face 22 during loading and unloading operations, the example vehicle restraint 28 selectively engages a vehicle's rear impact guard 34 (ICC bar), a tire 36 and/or some other portion of the vehicle 10.

The term "vehicle" refers to any device for transporting purposes. Examples of the vehicle 10 include, but are not limited to, a truck, a trailer, an open trailer bed, an enclosed trailer bed, and/or a lorry. The term, "person" refers to any human individual such as a dock worker or a pedestrian. Sensing an RFID tag or some other electromagnetic element 35 (FIG. 3) carried by a person is also considered herein as sensing a person.

The term, "sensor" refers to any device that can detect the presence and/or movement of the vehicle 10 and/or the person 12. Some example sensors detect or sense the presence of the vehicle 10 and/or the person 12 regardless of whether the vehicle 10 and/or the person 12 are moving. Some example sensors (e.g., only) detect or sense movement of the vehicle 10 and/or the person 12 in a direction away from the sensor and/or the dock face 22. Some example sensors (e.g., only) detect or sense movement of the vehicle 10 and/or the person 12 toward the sensor and/or the dock face 22. Some example sensors detect or sense movement of the vehicle 10 and/or the person 12 toward and/or away from the sensor and/or the dock face 22. Some example sensors detect and distinguish movement of the vehicle 10 and/or the person 12 toward and/or away from the sensor and/or the dock face 22. Some examples sensors detect and distinguish movement of the vehicle 10 and/or the person 12 laterally or sideways relative to the sensor and/or the dock face 22 (e.g., along a plane parallel to the dock face 22). A video camera with video analytics (e.g., a camera system 33 of FIGS. 49-51) is an example of such a sensor.

Example sensors that sense or detect presence and/or movement operate under various principles, examples of which include, but are not limited to, active infrared, passive infrared, ultrasonic, radar, microwave, laser, electromagnetic induction, pressure pad, ultra-IR LED, time-of-flight pulse ranging technology, photoelectric eye, thermal, video analytics, and/or any combination(s) thereof. Some example sensors that may be used to implement the systems disclosed herein include, but are not limited to, a model BEA LZR, a model BEA Sparrow, a model BEA Falcon, a model LZR-i100, a model BEA LZR-i30, a model UC4000 Ultrasonic Sensor, and a model R2100 Multi-Beam LED Scanner. The BEA LXR examples are products of BEA Industrial of Belgium, and the R2100 and the UC400 examples are products of Pepperl & Fuchs of Germany.

The terms "sensing system" and "electronic sensor system" refers to any apparatus that includes at least one sensor. Some example sensing systems and electronic sensor systems include multiple sensors connected in communication with a signal device.

Figure 11:
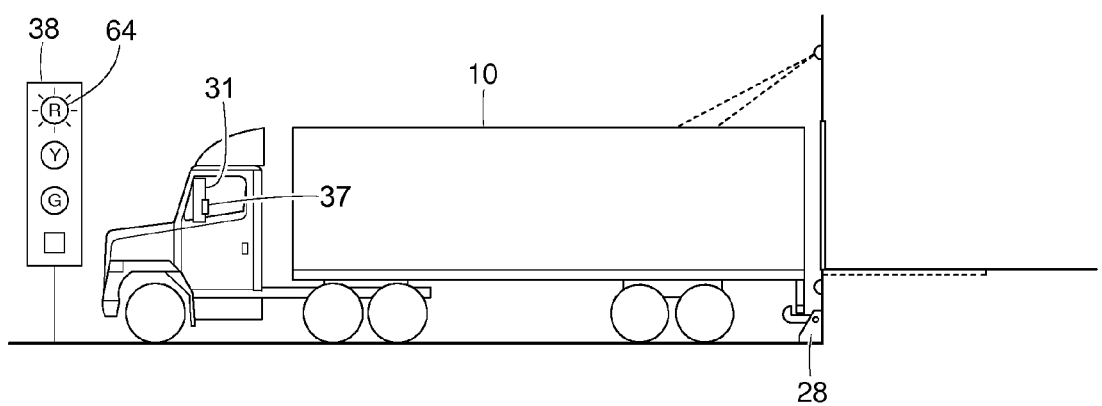
FIG. 11 is a side view similar to FIG. 3 but without the person present at the loading dock and the vehicle stationary and restrained at the loading dock.
Figure 12:
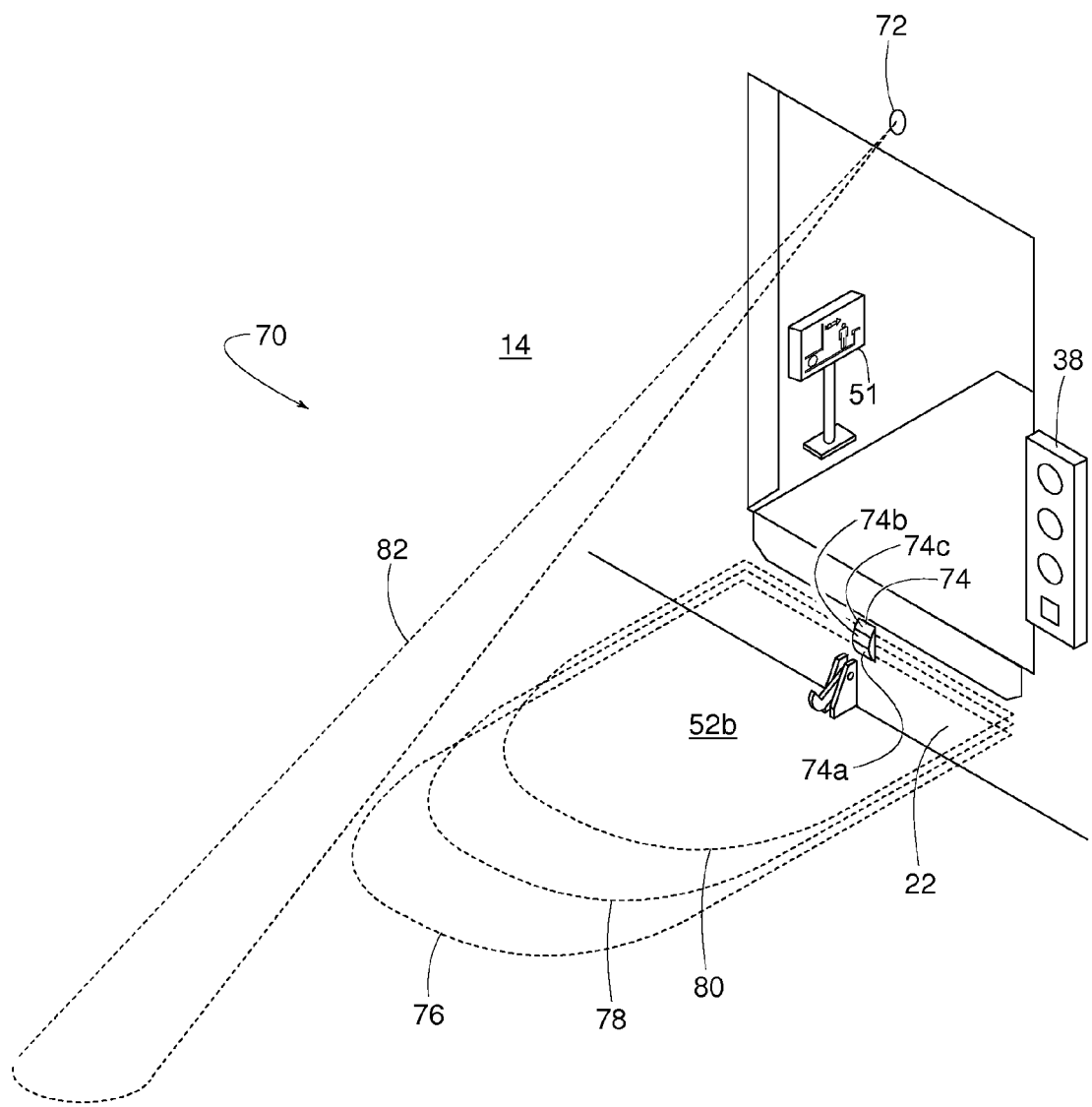
FIG. 12 is a perspective view of another example safety system constructed in accordance with the teachings disclosed herein.

The term "signal device" refers to any device for communicating information to the person 12, a driver of the vehicle 10, and/or any other person and/or other system(s). The term, "electronic system" refers to any combination of one or more sensors, one or more signal devices and/or associated circuitry. Examples of a signal device disclosed herein include, but are not limited to, a light, a horn, a buzzer, a vibrator, a cellular phone, a mobile device, an alarm, a graphical display, and/or any combination(s) thereof. Some example signal devices are installed at a stationary location at the outdoor area 18, some example signal devices are installed at a stationary location at the indoor area 16, and/or some example signal devices are portable (e.g., carried by the person 12 and/or a driver of the vehicle 10). FIG. 11, for example, shows a portable signal device 37 attached to a side view mirror 31 of the vehicle 10. In some examples, a cellular phone or mobile device carried within the vehicle 10 and/or with the driver of the vehicle 10 implements an example portable signal device disclosed herein. Some example signal devices emit various lights that are distinguishable by color, intensity, movement, and/or pattern such as flashing or continuous. Some example signal devices emit sound(s) which may be distinguishable by volume, pitch, tone, and/or pattern such as intermittent or continuous. Consequently, in the Detailed Description of this patent, references to signals such as red, yellow and green lights are merely examples, and other distinguishable signals can be used instead.

The example safety system 11 shown in FIGS. 1-11 includes a first pair of pedestrian sensors 40 (e.g., an away sensor 40*a* and a bi-directional 40*b*), a second pair of pedestrian sensors 42 (e.g., an away sensor 42*a* and a bi-directional sensor 42*b*), a pair of vehicle sensors 44 (e.g., an incoming sensor 44*a* and an away sensor 44*b*), the outdoor signal device 38, an indoor signal device 46, the vehicle restraint 28 and the dock leveler 30. To detect the person 12 in the vicinity of the dock face 22, the pedestrian sensors 40 and 42 provide respective sensing projections 48 and 50 that cross or overlap to cover and define a certain area 52*a* proximate the dock face 22. The term, "sensing projection" refers to a line, a line segment, an area and/or a range within which a sensor responds to the person 12 and/or the vehicle 10. To detect movement of the vehicle 10, particularly the vehicle 10 approaching the dock face 22, the vehicle sensors 44 provide sensing projections 54 and 56 that extend beyond the area 52*a* (e.g., a distance away from the dock face 22 that is greater than a distance in which the area 52*a* projects from the dock face 22, an area outside of a perimeter defined by the area 52*a*, etc.).

Response signals from the pedestrian sensors 40, 42 and/or the vehicle sensors 44 are conveyed to a controller 51 that controls the output of the outdoor signal device 38 and/or the indoor signal device 46. The term "controller" refers to any circuitry (e.g., wiring, relays, IC circuit, computer, programmable logic controller, logic circuit, etc.) that determines the operation of a signal device in response to receiving input from one or more sensors (e.g., the sensors 40, 42 and/44). The controller 51 of the illustrated example is housed within an enclosure that contains the example indoor signal device 46. However, in some examples, the controller 51 can be positioned at any convenient location such as a remote location communicatively coupled to the components (e.g., the sensors 40, 42 and/or 44, the signal devices 38 and/or 46, etc.) of the system 11 of FIGS. 1-11. In some examples various parts of the controller 51 can be distributed over multiple locations. Example locations of the controller include, but are not limited to, housed within a separate enclosure, housed within an enclosure 58 that contains the example outdoor signal device 38, housed within a sensor enclosure, positioned at remote locations such as a control room of a warehouse, and/or various combinations thereof. To provide a compact, robust installation, some examples of the enclosure 58 contain both the outdoor signal device 38 and at least one of the sensors 40*a*, 40*b*, 42*a*, 42*b*, 44*a* and/or 44*b*. In some examples, the away sensor 40*a* and the bi-directional 40*b* are mounted separate from the enclosure 58, just as the away sensor 42*a* and the bi-directional sensor 42*b* are mounted separate from the enclosure 58. FIGS. 2-11 schematically illustrate the mounting location of the outdoor signal device 38.

Regardless of how the pedestrian sensors 40 and 42 and/or the vehicle sensors 44 are mounted or enclosed, some examples of the safety system 11 illustrated in FIGS. 1-11 are configured such that the incoming sensor 44*a* detects only rearward movement of the vehicle 10 (e.g., in a direction toward the dock face 22), the away sensor 44*b* detects only forward movement of the vehicle 10 (e.g., in a direction away from the dock face 22), the away sensors 40*a* and 42*a* detect only motion in a direction away from dock face 22, and the bi-directional sensors 40*b* and 42*b* detect motion in both directions (e.g., movement in a direction away and toward the dock face 22). Specifically, in some examples, the incoming sensor 44*a* is a BEA Falcon sensor configured to sense only incoming truck traffic (e.g., the vehicle 10 moving toward the dock face 22). For example, the incoming sensor 44*a* of the illustrated example is located (e.g., centrally) above doorway 20. In some examples, the incoming sensor 44*a* is adjusted to only sense an area, for example, between approximately 25 to 35 feet away from dock face 22, is configured to sense large objects (e.g., the vehicle 10), and will not sense a person (e.g., the person 12) or large cross traffic objects (e.g., a forktruck). The away sensor 44*b*, in some examples, is a BEA Falcon sensor configured to sense only outgoing truck traffic (e.g., the vehicle 10 moving away from the dock face 22), is located (e.g., centrally) above the doorway 20, is adjusted to sense between approximately 25 to 35 feet away from dock face 22, is configured to sense large objects (e.g., the vehicle 10), and will not sense people or large cross traffic objects (e.g., a forktruck). The away sensor 42*a*, in some examples, is a BEA Sparrow sensor configured to sense only motion away from dock face 22, is located near a lower left corner of the doorway 20, and is pointed inward toward the area 52*a*. The away sensor 40*a*, in some examples, is a BEA Sparrow sensor configured to sense only motion away from dock face 22, is located near a lower right corner of the doorway 20, and is pointed inward toward the area 52*a*. The bi-directional sensor 42*b*, in some examples, is a BEA Sparrow sensor configured to sense both directions (e.g., movement toward and away from the dock face 22), is located near the lower left corner of doorway 20, is pointed inward toward the area 52*a*, and is only active when the incoming sensor 44*a* is OFF or inactive. The bi-directional sensor 40*b*, in some examples, is a BEA Sparrow sensor configured to sense both directions (e.g., movement toward and away from the dock face 22), is located near the lower right corner of the doorway 20, is pointed inward toward area 52*a*, and is only active when the incoming sensor 44*a* is OFF or inactive.

Referring to FIGS. 2 and 3, when the vehicle sensors 44 determine or sense the vehicle 10 is approaching the dock face 22 while the pedestrian sensors 40 or 42 detect or sense the person 12 within the area 52*a*, the outdoor signal device 38 emits a signal 63 (e.g., a third signal) that indicates the vehicle 10 is moving back or toward the dock face 22 while the person 12 is within the area 52*a*. The signal 63 of the illustrated example is a combination of a horn 60 sounding an audible alarm 62 and the outdoor signal device 38 emitting a red light 64 (e.g., a first signal). In some examples, once the incoming sensor 44*a* is ON or active, inputs from the bi-directional sensors 42*b* and 40*b* will be ignored or disregarded by, for example, the controller 51. This allows the vehicle 10 to back in toward the dock face 22 normally (e.g., when the person 12 is not present or detected in the area 52*a*). Furthermore, the main purpose of the bi-directional sensors 42*b* and 40*b* is to provide reliable sensing prior to the vehicle 10 entering the loading dock 14. If the vehicle 10 stops while backing in toward the dock face 22 (e.g., the incoming sensor 44*a* is ON), the bi-directional sensors 42*b* and 40*b* would once again be active (e.g., the controller 51 may activate the signal 63 in response to signals provided by the bi-directional sensors 42*b* and 40*b*).

Figure 4:
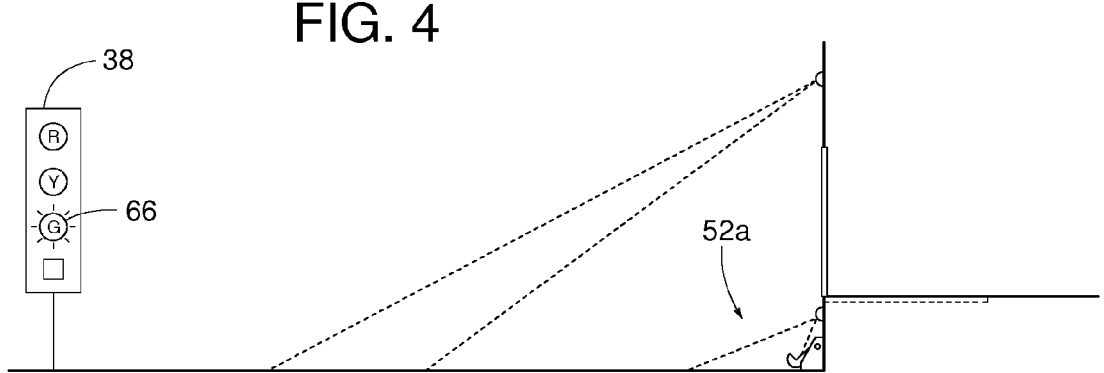
FIG. 4 is a side view similar to FIG. 3 but with neither the person nor the vehicle present at the loading dock.
Figure 5:
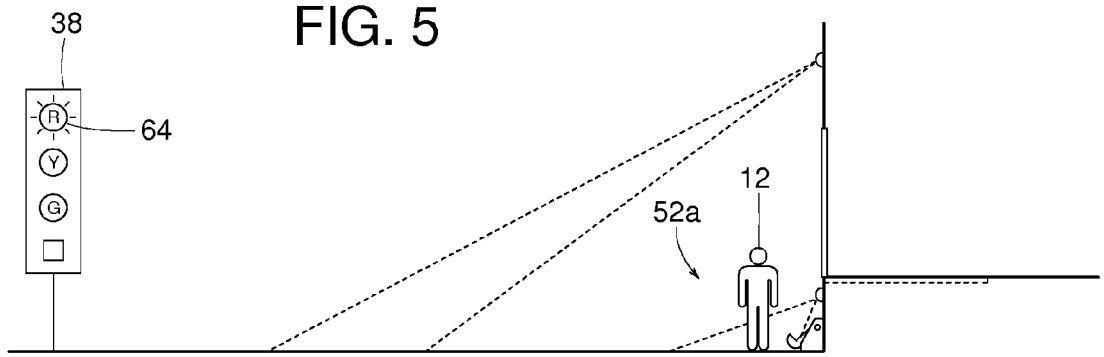
FIG. 5 is a side view similar to FIG. 3 but without the vehicle present at the loading dock.

When neither the person 12 nor the vehicle 10 is present, as illustrated in FIG. 4, the pedestrian sensors 40 and 42 and the vehicle sensors 44 are OFF or inactive and the controller 51 causes the outdoor signal device 38 to emit a green light 66 (e.g., a fourth signal). When the vehicle 10 is not present or detected by the vehicle sensors 44, and the person 12 is detected within the area 52*a*, the incoming sensor 44*a* is OFF or inactive, the away sensor 44*b* is OFF or inactive, the away sensor 42*a* and/or 40*a* is ON or active, the bi-directional sensor 42*b* and/or 40*b* is ON or active, and the outdoor signal device 38 responds by emitting a red light 64 without the audible alarm 62, as shown in FIG. 5. In some examples, the away sensors 42*a* and/or 40*a* are set up to form a grid to provide a broader sensing range or area. Alternatively, a single centrally located BEA Sparrow might be less effective because the person 12 would have to walk to or along a centerline of the loading dock 14 before the sensor would sense movement in a direction away from the dock face 22. In some examples, the away sensors 42*a* and/or 40*a* are not configured bidirectional (towards and away) because then every time the vehicle 10 backs in or moves in a direction toward the dock face 22, the vehicle 10 would activate the away sensors 42*a* and/or 40*a*.

Figure 6:
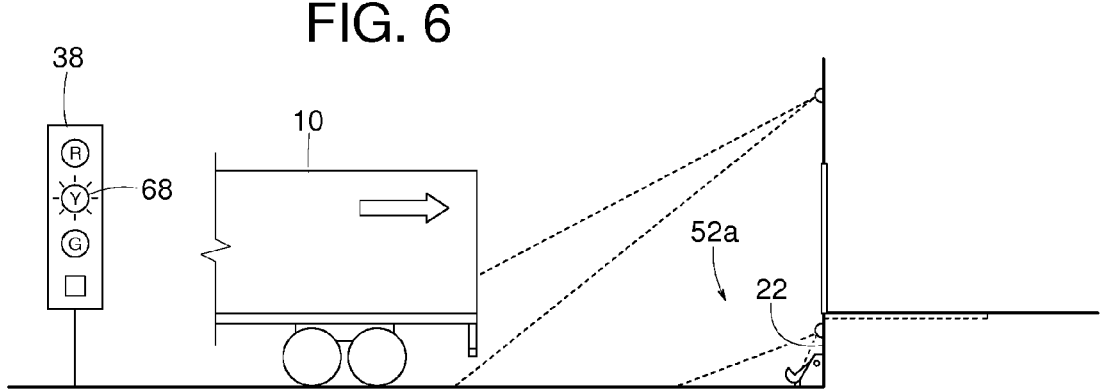
FIG. 6 is a side view similar to FIG. 3 but without the person present at the loading dock.

When the person 12 is not present within the area 52*a* while the vehicle 10 is moving back toward dock face 22, the incoming sensor 44*a* is ON, the away sensors 42*a* and 40*a* are OFF, the bi-directional sensors 42*b* and 40*b* are OFF, and the outdoor signal device 38 responds by emitting a yellow light 68 (e.g., a second signal), as shown in FIG. 6. The yellow light 68 of the illustrated example provides a warning that the vehicle 10 is backing or moving toward the loading dock 14 and, that a person 12 near the loading dock 14 (e.g., near but outside of area 52*a*), including the driver of the vehicle 10, should proceed with caution. In some examples, the vehicle 10 backing in toward the dock face 22 will not turn on or activate the away sensors 42*a* and 40*a* because the away sensors 42*a* and 40*a* of the illustrated example are configured to sense or detect motion only in a direction away from the dock face 22. In some examples, the incoming sensor 44*a* being ON activates the yellow light 68. In some examples, when the vehicle 10 enters the loading dock 14, the away sensors 42*a* and 40*a* will not turn ON because of their directional configuration (e.g., only sense motion away from the dock face 22). In some examples, when the vehicle 10 enters the loading dock 14, the bi-directional sensors 42*b* and 40*b* will turn ON or be active, but their signals will be ignored (e.g., by the controller 51) because the incoming sensor 44*a* is ON.

Referring to FIG. 7, when the vehicle sensors 44 determine that the vehicle 10 is moving forward away from the dock face 22 while the pedestrian sensors 40 and 42 indicate, sense or detect the person 12 is beyond or outside a perimeter of the area 52*a* (e.g., the incoming sensor 44*a* is OFF, the away sensor 44*b* is ON, the away sensor 42*a* and/or 40*a* is ON, and the bi-directional sensor 42*b* and/or 40*b* is ON) the outdoor signal device 38 emits a green light 66 to indicate that the vehicle 10 may continue departing the loading dock 14 (e.g., in a direction away from the dock face 22). Although the sensors 42*a*, 40*a*, 42*b*, and/or 40*b* may be ON, the signals they generate are ignored (e.g., by the controller 51) because the away sensor 44*b* is also ON thus eliminating the possibility of the vehicle's departure responding to the pedestrian sensors 40 and 42. In some examples, a timer ensures the pedestrian sensors 40 and 42 do not turn on prior to the away sensor 44*b*. Alternatively, this could be accomplished via programming states, when the pedestrian sensors 40 and 42 are ignored until the away sensor 44*b* comes ON or OFF. When the vehicle sensor 44 determines that the vehicle 10 has stopped and the person 12 is not present, the outdoor signal device 38 emits the green light 66, as shown in FIG. 8.

If the vehicle 10 is moving forward (e.g., away from the dock face 22) while the person 12 is present within the area 52*a*, the incoming sensor 44*a* is OFF, the away sensor 44*b* is ON, the away sensors 42*a* and/or 40*a* is ON, the bi-directional sensors 42*b* and/or 40*b* is ON, the signal device 38 responds by emitting the green light 66, as shown in FIG. 9. In some examples, associated timers each with inputs that can be adjusted to hold the signal for a minimum of time (e.g., a pre-set or predetermined period of time, three seconds for each, etc.). For example, when the person 12 is sensed in the area 52*a*, and the system 11 assumes that once the person 12 is sensed, the person 12 will be there for a period of time such as, for example, an additional three seconds (e.g., a timer would be re-initiated if the person 12 is re-sensed). In some examples, similar logic is applied to sensing the vehicle 10. This avoids problems associated with loss of signal due to sudden stops in movement of the vehicle 10 and/or the person 12, and/or sudden changes in visual and/or audio signals to the person 12 and/or to a driver of the vehicle 10. In some examples, a system only has the requirement to turn on a red light when the person 12 is present in the area 52*a* (e.g., no audible alarm when the vehicle 10 and the person 12 are present) and the incoming sensor 44*a* is eliminated.

Figure 10:
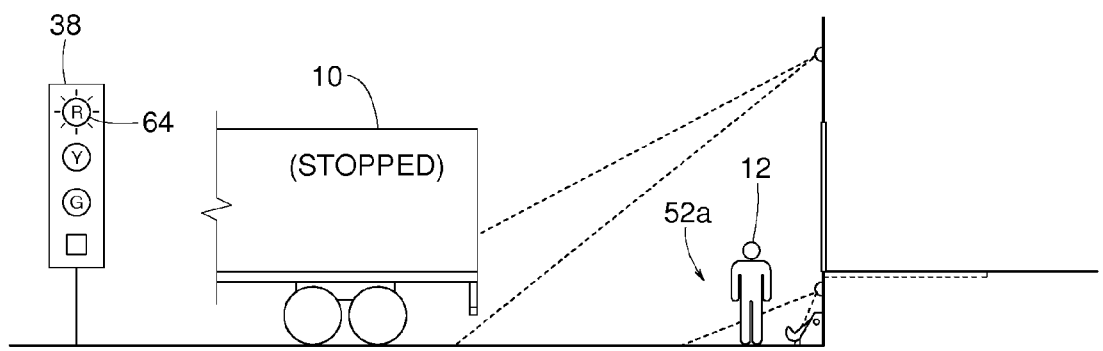
FIG. 10 is a side view similar to FIG. 3 but with the vehicle stationary at the loading dock.

Referring to FIG. 10, the signal device 38 emits the red light 64 when the person 12 is present within the area 52*a* even though the vehicle 10 is not moving (e.g., parked or stationary relative to the dock face 22). The outdoor signal device 38 also emits the example red right 64 when the vehicle restraint 28 is deployed to engage and restrain the vehicle 10, as shown in FIG. 11. In the example of FIGS. 1-11, the red light 64 is a first signal, the yellow light 68 is a second signal, a combination of the red light 64 and the horn alarm 62 is a third signal, and the green light 66 is a fourth signal.

The example illustrated in FIGS. 12-20 includes an electronic sensor system 70 including a motion sensor 72 configured to sense the vehicle 10 moving back toward the dock face 22 and a presence sensor 74 providing a plurality of respective first, second and third sensing projections or zones 76, 78 and 80 (e.g., and/or any number of additional projections or zones) that define and cover an area 52*b* proximate the dock face 22. The presence sensor 74 of the illustrated example includes a first zone sensor 74*a*, a second zone sensor 74*b* and a third zone sensor 74*c*. In some examples, the motion sensor 72 is a single BEA Falcon microwave motion sensor having a sensing projection 82 extending beyond the area 52*b*. In some examples, the presence sensor 74 is a multiple LZR-i100 presence sensor.

A first sensing projection 76, a second sensing projection 78 and/or a third sensing projection 80 (also referred to as zones) extend different lengths from the dock face 22. In some examples, the projected lengths range between approximately three feet and twelve feet. In some examples, the first, second and third sensing projections 76, 78 and 80 respectively extend a first sensing length 84, a second sensing length 86 and a third sensing length 88 (e.g., in a direction non-parallel or perpendicular relative to the dock face 22). To distinguish between the person 12 and the vehicle 10, some examples of the first zone sensor 74a are configured to detect objects having a width significantly greater than the expected width of the person 12 while the second and third zone sensors 74b and 74c are configured to sense or detect objects having widths expected of the person 12 or the vehicle 10.

More specifically, in some examples, the motion sensor 72 is configured to sense only incoming vehicle traffic (e.g., movement of the vehicle 10 toward the dock face 22), is located (e.g., centrally) above doorway 20, is adjusted to sense between approximately 25 to 35 feet from the dock face 22, can only sense large objects (e.g., the vehicle 10), and will not sense cross traffic or people (e.g., the person 12). The first, second and third zone sensors 74a, 74b and 74c sense object presence at the loading dock 14, are located out of harms way, are configured to sense various ranges (e.g., approximately 3 ft., 6 ft., 9 ft., and 12 ft. from the dock face 22) and each covers a zone (e.g., provided by the first, second and third sensing projections 76, 78, 80) extending from the dock face 22 to the range limit. In some examples, the first zone sensor 74a only senses large objects (e.g., at least 72 inches wide), such as the example vehicle 10. In some examples, the first, second and third zone sensors 74a, 74b and/or 74c are combined and configured to form a grid (e.g., a grid having a length and width parallel relative to a driving surface 89 of the loading dock 14) projecting away from the dock face 22 to detect movement of the vehicle 10 as it enters each detection zone, and the loading dock 14, in sequence. In some examples, the second and third zone sensors 74b and 74c are configured to detect any object (e.g., the person 12) within its field. In some examples, the person 12 is detected as follows: a) the person 12 entering from the driveway 89, where the first sensing projection 76 is interrupted without interrupting the second sensing projection 78; b) the person 12 entering from the side, where multiple zones (e.g., the first and second zones 76 and 78, the first, second and third zones 76, 78 and 80, etc.) are activated simultaneously; and/or c) the person 12 jumps down to the loading dock 14 from dock leveler 30, where the two or more of the first, second and third zones 76, 78 and 80 are activated simultaneously. In some examples, a time restraint is added. For example, the first zone sensor 74a turning ON and then the second zone sensor 74b turning ON a period of time after the first zone sensor 74a turning ON satisfies the sequence requirement. However, the second zone sensor 74b turning ON too soon (e.g., the vehicle 10 is not backing in faster than two mph) could indicate that the person 12 is entering area 52b. In some examples, it is assumed that when the motion sensor 72 first detects the vehicle 10 entering the loading dock 14, the first zone sensor 74a cannot detect the person 12 and as the vehicle 10 continues toward the dock face 22, each of the first second and third sensing projections 76, 78 and 80 will be sequentially triggered. If the sequence of triggering the first second and third sensing projections 76, 78 and 80 continues uninterrupted, no warning will be sounded or displayed. On the other hand, activation of the second zone sensor 74b without prior activation of the first zone sensor 74a (i.e., out of sequence) will indicate that the person 12 is present in the area 52b. In some examples, simultaneous activation of multiple zones (e.g., the first second and third sensing projections 76, 78 and 80 activated out of sequence) indicates the person 12 is present in the area 52b. Anything other than incremental (e.g., not all at once) and sequential turning ON of the first, second and third zone sensors 74a, 74b and 74c indicates the person 12 is present. The yellow light 68 indicates the vehicle 10 is moving with respect to motion sensor 72 and/or the dock face 22 and/or the yellow light 68 indicates any time the vehicle 10 is stationary or moving within the first zone provided by the first sensing projection 76. In some examples, the signal device 38 emits signals depending on which of the first, second and third sensing projections 76, 78 and 80 are interrupted and/or depending on the sequence and/or speed in which of the first, second and third sensing projections 76, 78 and 80 are interrupted.

Figure 13:
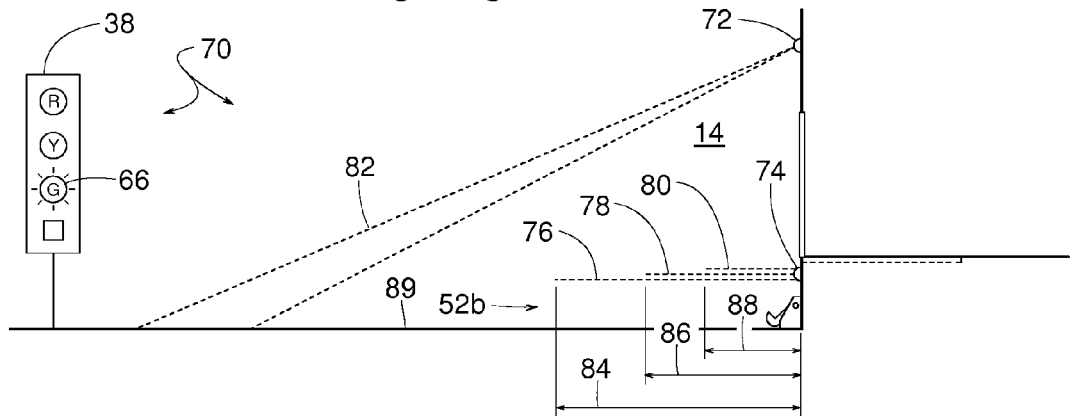
FIG. 13 is a side view of FIG. 12.
Figure 14:
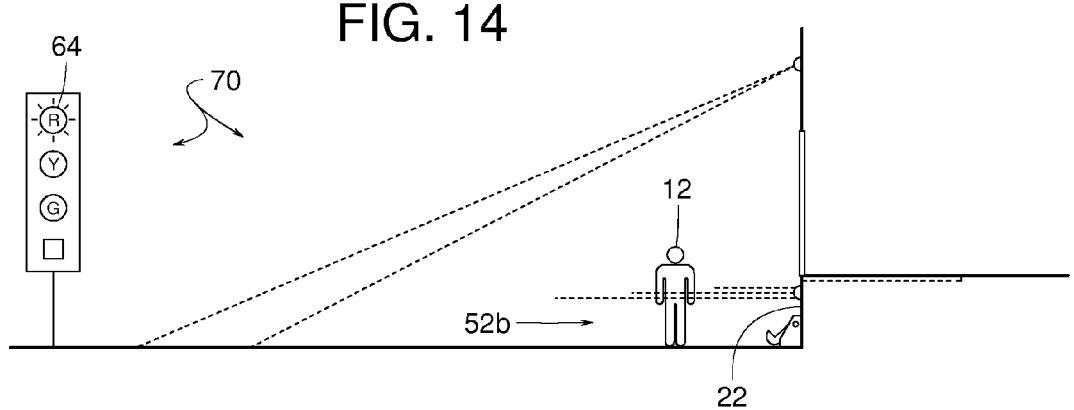
FIG. 14 is a side view similar to FIG. 13 but with a person present at a loading dock.

More specifically, in some examples, as illustrated in FIG. 13, when the motion sensor 72 and the first, second and third zone sensors 74a, 74b, and 74c are OFF, the outdoor signal device 38 responds by emitting the green light 66 when neither the vehicle 10 nor the person 12 is present at the loading dock 14. The outdoor signal device 38 emits the red light 64 when the electronic sensor system 70 determines that the person 12 is present within the area 52b, as shown in FIG. 14, where the motion sensor 72 and the first zone sensor 74a are OFF and the second and third zone sensors 74b and 74c indicate the person 12 is present in the area 52b.

Figure 15:
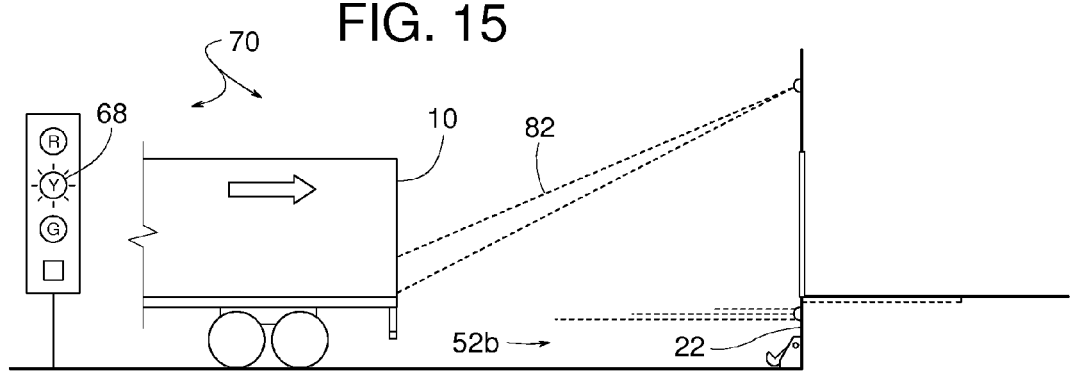
FIG. 15 is a side view similar to FIG. 13 but with a vehicle moving back toward a dock face of the loading dock.

The outdoor signal device 38 emits the yellow light 68 when the sensor system 70 determines that the vehicle 10 is moving back toward the dock face 22 while the person 12 is not within the area 52b, as illustrated in FIG. 15, where the motion sensor 72 senses the vehicle 10 while the first, second and third zone sensors 74a, 74b and 74c are OFF. If the vehicle 10 continues moving back toward the dock face 22 to a point where the vehicle 10 triggers the motion sensor 72 and the first and third zone sensors 74a and 74c, the outdoor signal device 38 responds by continuing to emit the yellow light 68. Other example scenarios causing the outdoor signal device 38 to emit the yellow light 68 include the following: a) the vehicle 10 stops within the first and second sensing projections 76 and 78 such that the motion sensor 72 is OFF and the first and second zone sensors 74a and 74b are ON due to the presence of the vehicle 10; b) when the motion sensor 72 no longer detects the vehicle 10 in motion and the first zone sensor 74a (e.g., a large object sensor) indicates the presence of the vehicle 10 near the dock face 22; c) the vehicle 10 stops within the first, second and third sensing projections 76, 78 and 80 such that the motion sensor 72 is OFF and the first, second and third zone sensors 74a, 74b and 74c are ON due to the vehicle 10 (e.g., when the motion sensor 72 no longer detects the vehicle 10 in motion and the first zone sensor 74a (e.g., a large object sensor) indicates the presence of the vehicle 10 near the dock face 22; or d) the vehicle 10 stopped at the dock face 22 but not restrained by the vehicle restraint 28, where the motion sensor 72 is OFF and the first, second and third zone sensors 74a, 74b and 74c are ON due to the vehicle 10 being present. In this scenario, when the motion sensor 72 no longer detects the vehicle 10 in motion, and the first zone sensor 74a indicates presence of the vehicle 10, the vehicle 10 is presumed to be present at the dock face 22.

Figure 16:
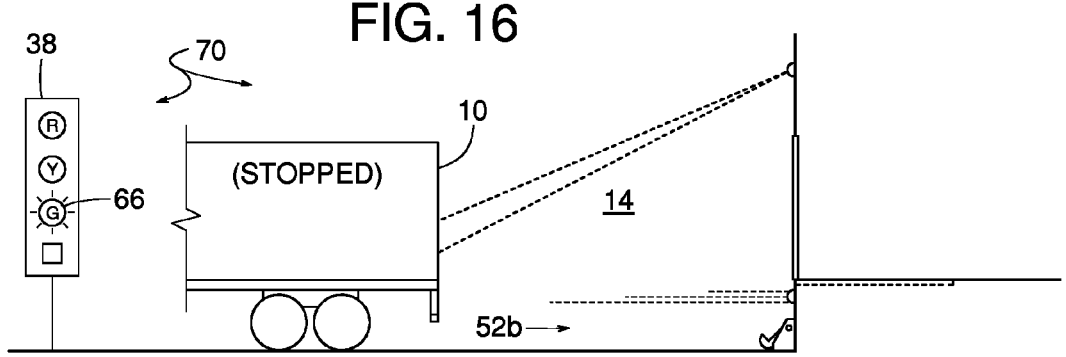
FIG. 16 is a side view similar to FIG. 13 but with a stationary vehicle present at the loading dock.

The signal device 38 emits the green light 66 when the vehicle 10 is stationary and the person 12 is not within the area 52b, as illustrated in FIG. 16, where the motion sensor 72 and the first, second and third zone sensors 74a, 74b and 74c are OFF. Other example scenarios causing the outdoor signal device 38 to emit the green light 66 include the vehicle 10 moving (e.g., forward or outbound) away from the dock face 22 but the vehicle 10 is still within the area 52b, where the motion sensor 72 is OFF and the first, second and third zone sensors 74a, 74b and 74c are ON due to the vehicle 10 being present. In this case, the outbound vehicle 10 is not detected by the motion sensor 72. Regardless of the position of the vehicle 10 within the first, second and third sensing projections 76, 78 and 80, the first zone sensor 74a will still indicate vehicle presence until the vehicle 10 completely leaves the first sensing projection 76 (e.g., the outermost zone from the dock face 22). In some examples, the signals from the first, second and third zone sensors 74a, 74b and 74c are evaluated or processed (e.g., by the controller 51) as a condition that is safe (e.g., OK) as long as they turn OFF in reverse sequence. For example, if the person 12 enters the area 52b while the vehicle 10 is outbound, the sequence would be interrupted, so the outdoor signal device 38 would emit the red light 64 instead of, for example, the yellow light 68 or the green light 66. Other example scenarios causing the signal device 38 to emit the green light 66 include the vehicle 10 moving forward away from the dock face 22 with the vehicle 10 being beyond the area 52b, where the first, second and third zone sensors 72, 74a, 74b and 74c are OFF. In this case, the outbound vehicle 10 is not detected by the sensor 72. If the person 12 enters the area 52b while the vehicle 10 is outbound, the outdoor signal device 38 would emit the red light 64. If the vehicle 10 is stopped and/or reversing toward the dock face 22, the motion sensor 72 would detect the vehicle 10 approaching.

Figure 17:
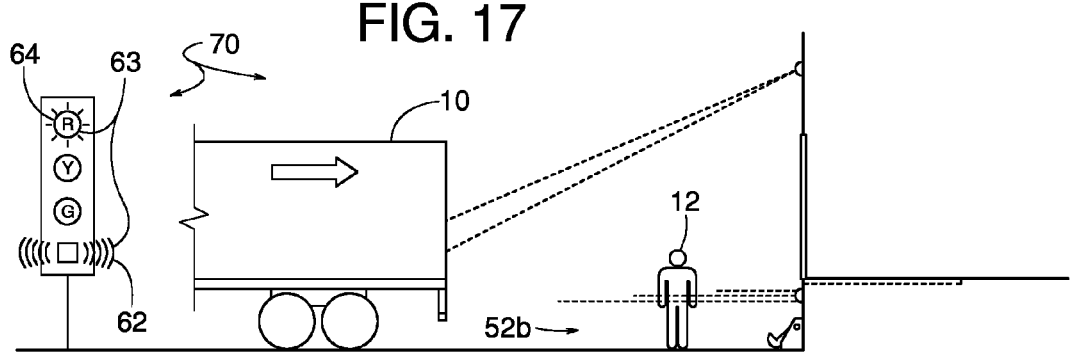
FIG. 17 is a side view similar to FIG. 13 but with the vehicle moving back toward the dock face while a person is present at the loading dock.

The signal device 38 emits the signal 63 (e.g., the red light 64 plus the horn alarm 62) when the vehicle 10 is moving back toward the dock face 22 while the person 12 is present within the area 52b, as shown in FIG. 17, where the motion sensor 72 detects the vehicle 10 moving and the second and third zone sensors 74b and 74c sense the person 12 present within the area 52b. In this example, the first zone sensor 74a does not detect the person 12, and the first zone sensor 74a detects only large objects (e.g., objects such as the vehicle 10). Also, the second and third zone sensors 74b and 74c detection of objects or persons present in the area 52b will turn on the red light 64. The red light 64 is also ON if only the second zone sensor 74b is ON, or if the second and third zone sensors 74b and 74c are ON. Simultaneous signals generated by the first, second and third zone sensors 74a, 74b and 74c and the motion sensor 72 indicates a potentially dangerous condition and cause the audible alarm 62 to activate or sound. In addition or alternatively, the motion sensor 72 senses the incoming vehicle 10 while the person 12 "jumps" between the dock face 22 and the vehicle 10 to simultaneously trigger the presence sensor 74 signals, thus interrupting the incoming vehicle sequence. In some such example, the red light 64 and/or the audible alarm 62 are activated.

Figure 18:
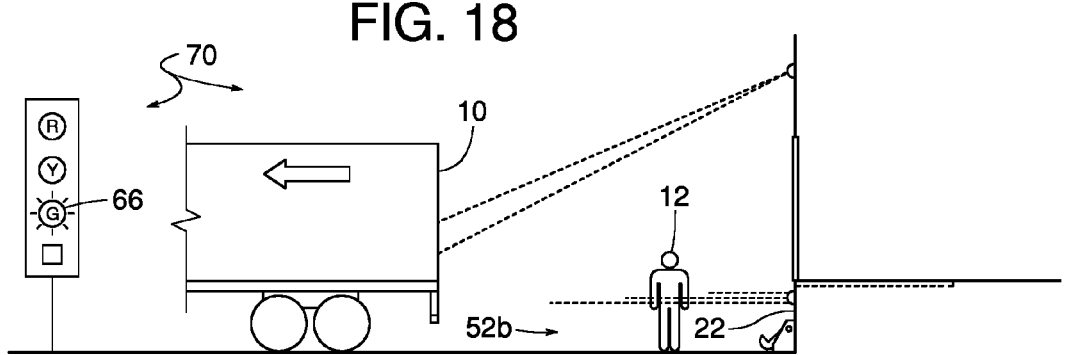
FIG. 18 is a side view similar to FIG. 13 but with the vehicle moving forward in a direction away from the dock face while a person is present at the loading dock.
Figure 19:
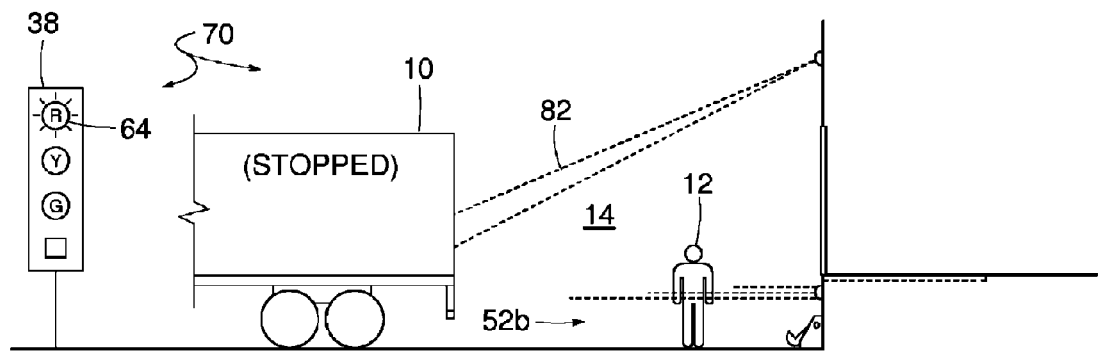
FIG. 19 is a side view similar to FIG. 13 but with a stationary vehicle and a person present at the loading dock.
Figure 20:
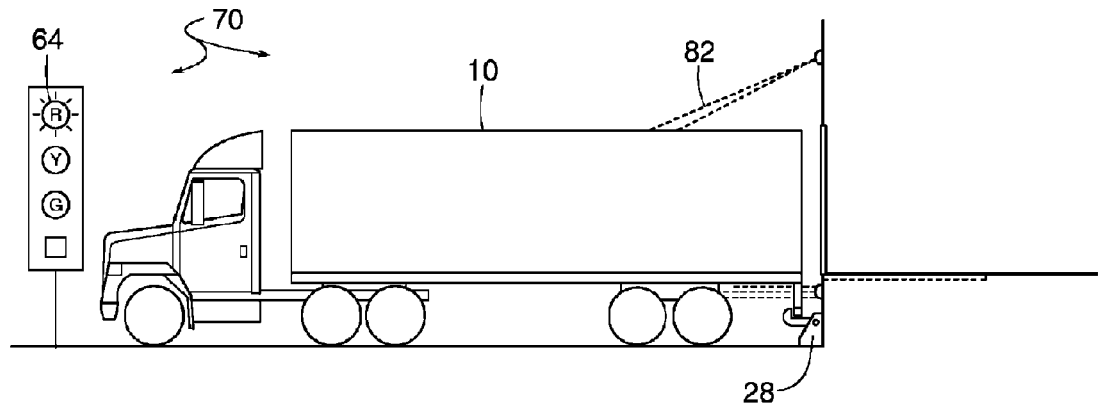
FIG. 20 is a side view similar to FIG. 13 but without the person present at the loading dock and the vehicle stationary and restrained at the loading dock.
Figure 21:
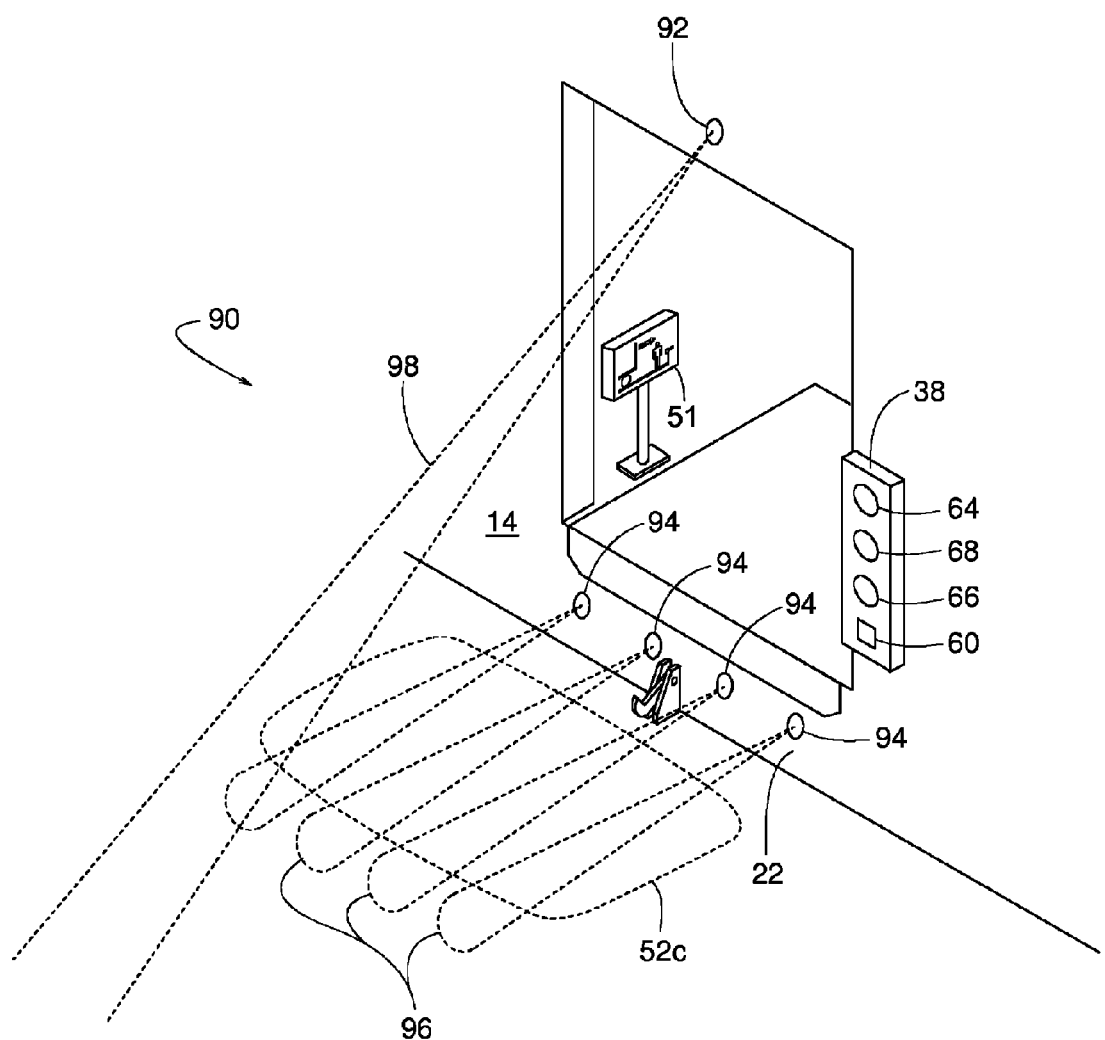
FIG. 21 is a perspective view of another example safety system constructed in accordance with the teachings disclosed herein.

The outdoor signal device 38 emits the green light 66 when the vehicle 10 is moving forward away from the dock face 22 even though the person 12 is within the area 52b, as shown in FIG. 18. The outdoor signal device 38 emits the red light 64 when the person 12 is within the area 52b even though the vehicle 10 is stationary, as shown in FIG. 19. The outdoor signal device 38 emits the red light 64 when the vehicle restraint 28 is engaging the vehicle 10, as shown in FIG. 20.

Still referring to FIGS. 12-20, in some examples, the first zone sensor 74a has two outputs, one for large objects, such as the vehicle 10, and one for smaller "objects," such as the person 12. In such examples, the sensing projection 76 of the first zone sensor 74a extends out about thirty feet from the dock face 22 and distinguishes between large and small objects, thus, the motion sensor 72 and the second and third zone sensors 74b and 74c can be omitted. In some examples, the first zone sensor 74a differentiates object size based on, for example, the object's width.

The example illustrated in FIGS. 21-31 includes an electronic system 90 including a motion sensor 92 (e.g., a third sensor) configured to sense the vehicle 10 moving back toward the dock face 22 and a plurality of distance sensors 94 (e.g., first and second sensors) providing a plurality of sensing projections 96 (e.g., any plural number of projections) that define and cover a certain area 52c proximate the dock face 22. In some examples, the motion sensor 92 is a BEA Falcon microwave motion sensor having a sensing projection 98 extending beyond the area 52c (e.g., in a direction away from the dock face 22). In some examples, the distance sensors 94 are UC400 ultrasonic sensors.

Since the vehicle 10 is significantly wider than the person 12, the system 90 can distinguish between the vehicle 10 and the person 12 based on the number of sensing projections 96 that are interrupted to place its respective sensor 94 in a triggered state. For example, if a subject (e.g., the vehicle 10) interrupts all four sensing projections 96 equally such that each of their respective distance sensors 94 are in a triggered state and providing substantially equivalent feedback signals (i.e., equivalent distance readings) or feedback signals within a threshold, the system 90 determines that the interrupting subject is caused by the vehicle 10. Conversely, if only one or two projections 96 of the respective distance sensors 94 are interrupted (e.g., simultaneously), the system 90 determines that the interruption is caused by the person 12. If all four projections 96 are interrupted but one or two result in a significantly different feedback signal (i.e., different distance readings), system 90 determines that both the vehicle 10 and the person 12 are within the sensing range of the distance sensors 94. In addition, some examples of the motion sensor 92 are configured to sense only motion of the vehicle 10 moving back toward the dock face 22.

More specifically, in some examples, the motion sensor 92 is a BEA Falcon microwave unit that is configured to sense only incoming vehicle movement, is located above doorway 20, is adjusted to sense approximately between 25 to 35 feet from dock face 22, senses only large objects (e.g., the vehicle 10), and will not sense the person 12 nor large cross traffic objects (e.g., a forktruck). In some examples, the distance sensors 94 are UC400 sensors employing ultrasonic technology for sensing the presence and distance (e.g., a distance from dock face 22) of any object such as the person 12 and/or the vehicle 10. Each of the distance sensors 94 provides an analog feedback signal that indicates the distance from each distance sensor 94 to the detected object. The analog feedback signal can be received and interpreted by the example controller 51 and/or any suitable PLC or other conventional controller. In some examples, the sensing range of the distance sensors 94 are adjusted to sense approximately between 12 to 15 feet from dock face 22. With feedback from the motion sensor 92 and the distance sensors 94, the system 90 can control the outdoor signal device 38 in the manner illustrated in FIGS. 22-31.

Figure 25:
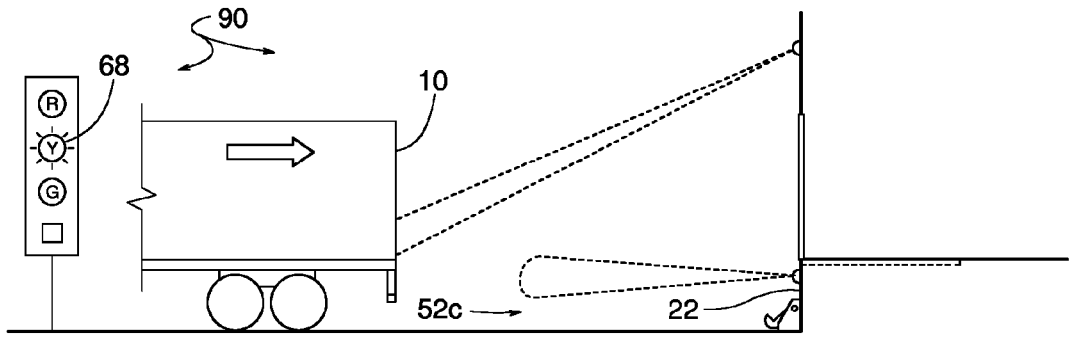
FIG. 25 is a side view similar to FIG. 22 but with a vehicle moving back toward a dock face of the loading dock.
Figure 26:
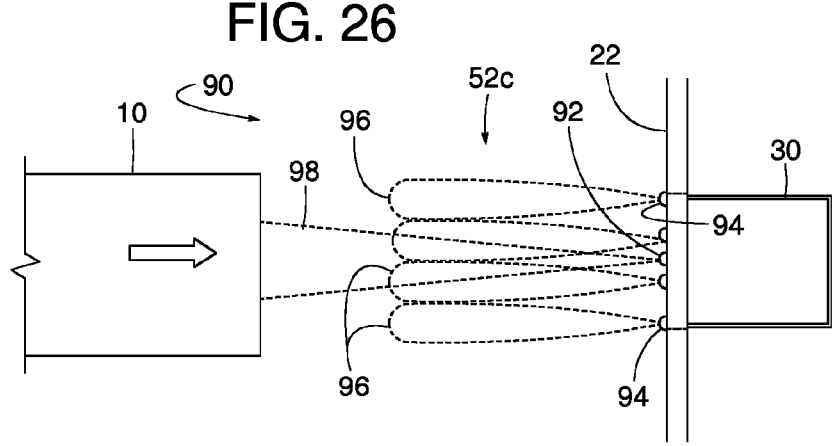
FIG. 26 is a top view of FIG. 25.
Figure 27:
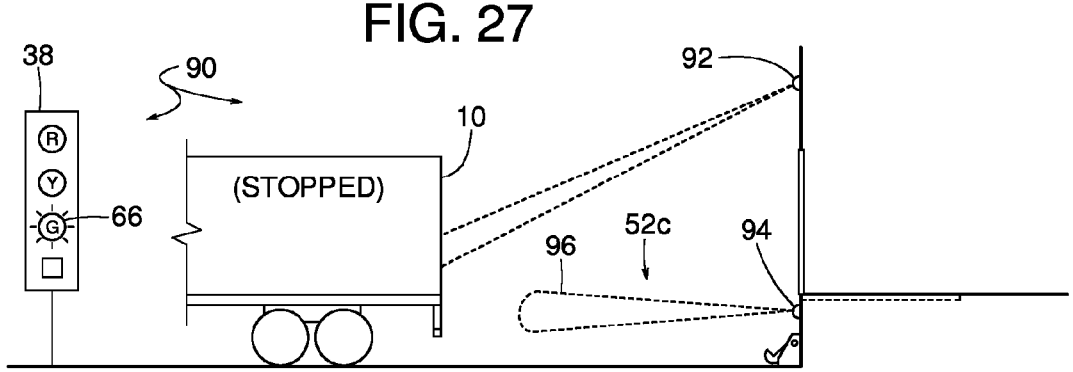
FIG. 27 is a side view similar to FIG. 22 but with a stationary vehicle present at the loading dock.
Figure 28:
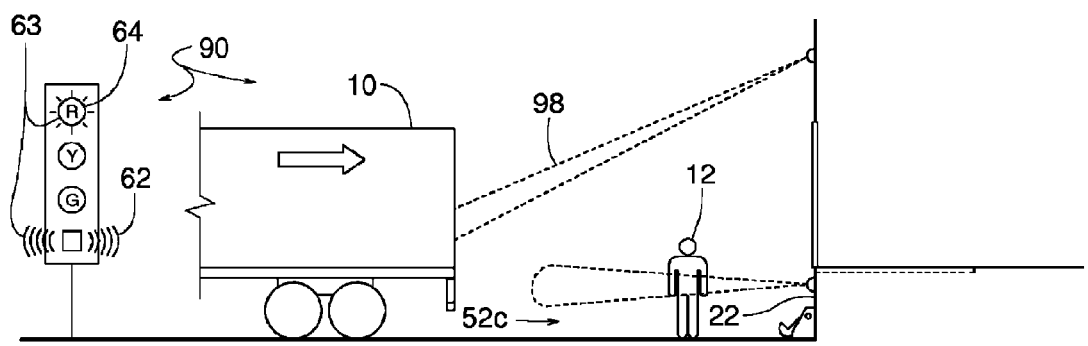
FIG. 28 is a side view similar to FIG. 22 but with a vehicle moving back toward the dock face while a person is present at the loading dock.
Figure 29:
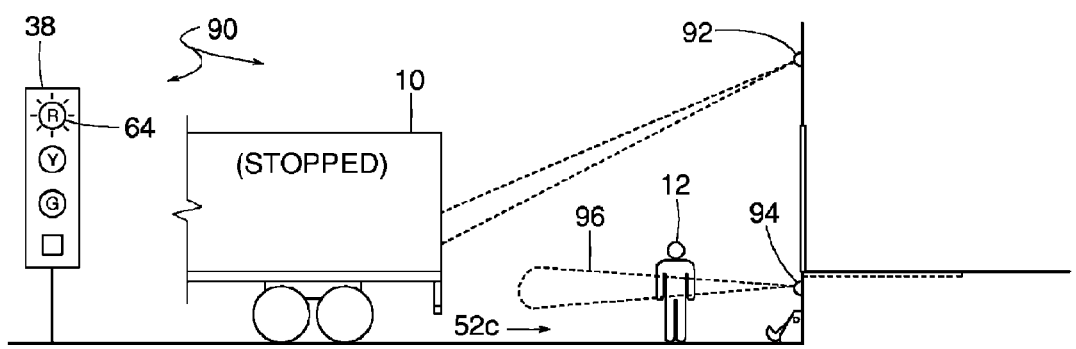
FIG. 29 is a side view similar to FIG. 22 but with a stationary vehicle at the loading dock and a person present at the loading dock.
Figure 30:
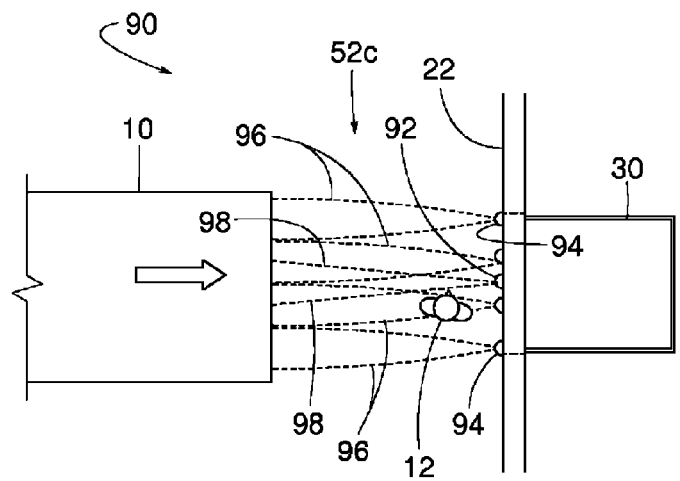
FIG. 30 is a top view showing both a vehicle and a person near the dock face of the loading dock.
Figure 31:
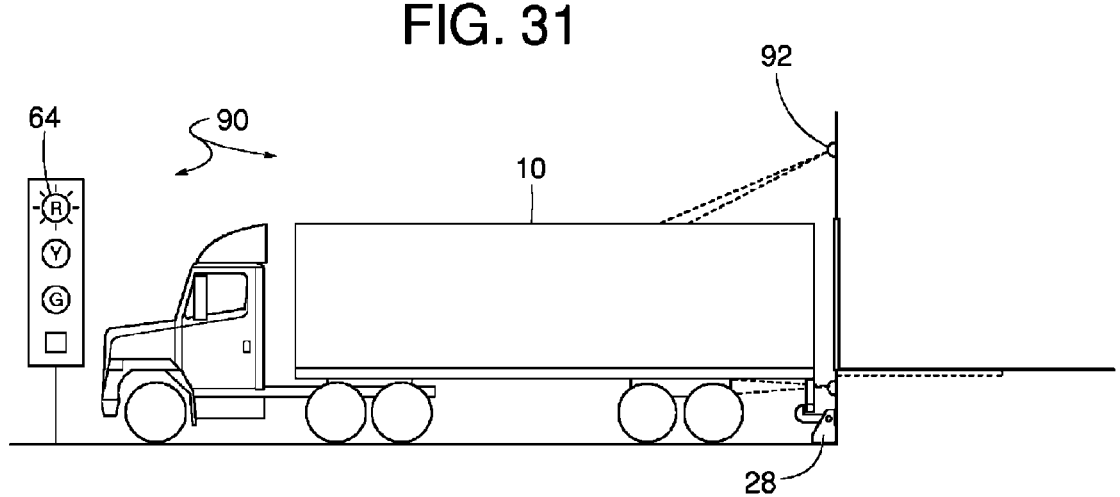
FIG. 31 is a side view similar to FIG. 22 but without the person present at the loading dock and the vehicle stationary and restrained at the loading dock.

Referring to FIG. 22, the outdoor signal device 38 emits the green light 66 in response to the motion sensor 92 and the distance sensors 94 being OFF as a result of neither the vehicle 10 nor the person 12 being present at loading dock 14, as illustrated in FIG. 22. The outdoor signal device 38 emits the red light 64 in response to the distance sensors 94 providing unequal distance readings, which the system 90 interprets as a condition where the person 12 is within the area 52c, as shown in FIGS. 23 and 24. The outdoor signal device 38 emits the yellow light 68 in response to the motion sensors 92 being ON and the distance sensors 94 being either OFF or at least providing substantially equal distance readings (e.g., substantially equal distance readings, distance readings falling within a threshold range, etc.) as a result of the vehicle 10 moving back toward the dock face 22 while the person 12 is not within the area 52c, as illustrated in FIGS. 25 and 26. The outdoor signal device 38 emits the green light 66 in response to the motion sensor 92 being OFF and the distance sensors 94 being either OFF or at least providing substantially equal distance readings as a result of the vehicle 10 being substantially stationary and the person 12 is not within the area 52c, as illustrated in FIG. 27. The outdoor signal device 38 emits the signal 63 (e.g., the red light 64 and/or the audible alarm 62) in response to the motion sensor 92 being ON and the distance sensors 94 providing unequal distance readings as a result of the vehicle 10 moving back toward the dock face 22 while the person 12 is present within the area 52c, as shown in FIG. 28. The outdoor signal device 38 emits the red light 64 in response to the distance sensors 94 providing unequal distance readings while the motion sensor 92 is OFF as a result of the person 12 being within the area 52c while the vehicle 10 is stationary, as shown in FIG. 29. The outdoor signal device 38 emits the signal 63 (e.g., the red light 64 and/or audible alarm 62, as shown in FIG. 28) in response to the distance sensors 94 providing unequal distance readings as a result of both the vehicle 10 and the person 12 being within the area 52c, as shown in FIG. 30. The outdoor signal device 38 emits the red light 64 when the vehicle restraint 28 is engaging the vehicle 10, as shown in FIG. 31.

The example illustrated in FIGS. 32-40 includes an electronic sensor system 320 including, for example, three sensors, a pedestrian sensor 321, a bi-directional sensor 322 and an incoming sensor 323 mounted near a front edge of a dock shelter header 324 above the doorway 20. In some examples, the pedestrian sensor 321 is a BEA Sparrow with a sensing projection 321a that extends about 10 feet from the dock face 22 for detecting pedestrian movement in an area 52d. In some examples, the area 52d covers both the area immediately in front of the dock face 22 plus an elevated forward edge portion of the platform 32 and/or the dock leveler 30. The bi-directional sensor 322, in some examples, is a BEA Falcon with a sensing projection 322a that extends about 35 feet from the dock face 22 for detecting both incoming and outgoing movement of the vehicle 10. The incoming sensor 323, in some examples, is a BEA Falcon with a sensing projection 323a that extends about 12 feet from the dock face 22 for detecting only incoming movement of vehicle 10. The system 320 also includes the outdoor signal device 38 responsive to input from the pedestrian sensor 321, the bi-directional sensor 322 and/or the incoming sensor 323 plus, in some examples, input from any suitable controller (e.g., a manually operated switch) that activates the vehicle restraint 28 and/or input from a sensor (e.g., a limit switch) that detects whether the vehicle restraint 28 is restraining the vehicle 10.

Figure 32:
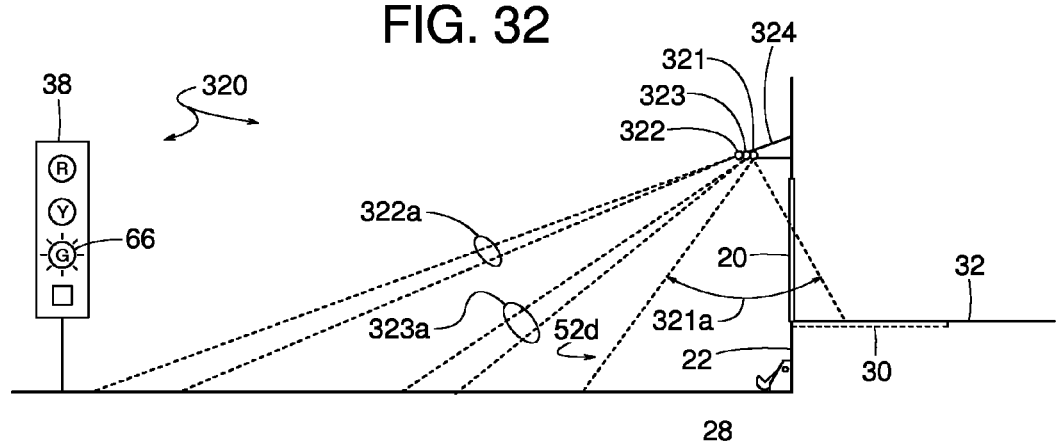
FIG. 32 is a side view of another example safety system constructed in accordance with the teachings disclosed herein.
Figure 33:
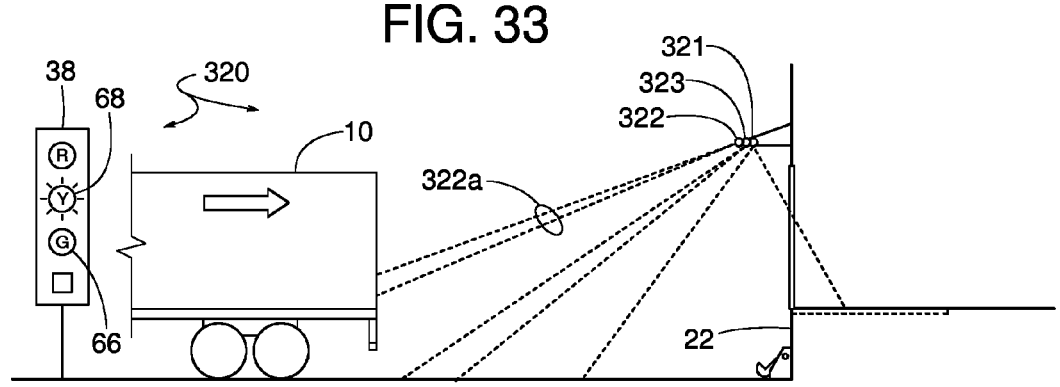
FIG. 33 is a side view similar to FIG. 32 but showing an incoming vehicle moving toward a dock face of a loading dock.
Figure 34:
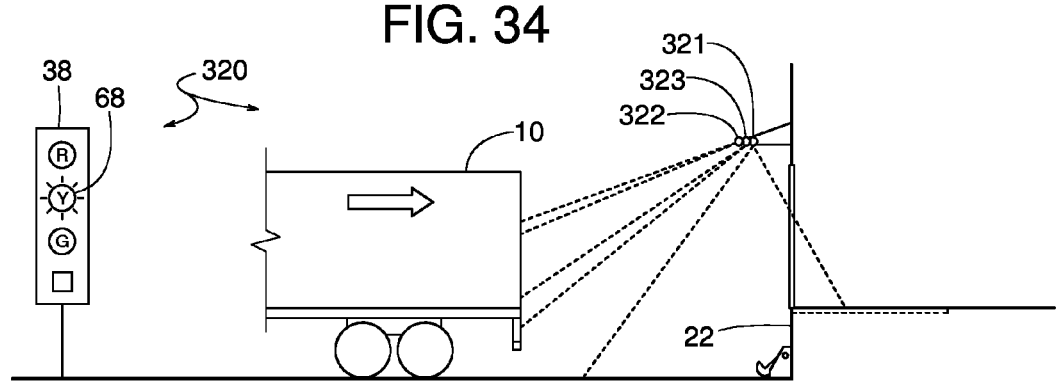
FIG. 34 is a side view similar to FIG. 33 but showing the vehicle moving closer to the dock face of the loading dock.

When neither the person 12 nor the vehicle 10 is present, as illustrated in FIG. 32, the pedestrian sensor 321, the bi-directional sensor 322 and the incoming sensor 323 are OFF and the signal device 38 responds by emitting the green light 66. When the vehicle 10 is backing toward the dock face 22 and triggers the bi-directional sensor 322 while the pedestrian sensor 321 and the incoming sensor 323 are OFF, the outdoor signal device 38 responds by emitting the yellow light 68, as shown in FIG. 33. If the vehicle 10 of FIG. 33 stops moving relative to the dock face 22, the signal device 38 emits the green light 66 instead of the yellow light 68. If the vehicle 10 is backing closer to the dock face 22 such that the vehicle's movement turns the bi-directional sensor 322 and the incoming sensor 323 ON while the pedestrian sensor 321 is OFF, as shown in FIG. 34, the outdoor signal device 38 responds by emitting the yellow light 68.

Figure 35:
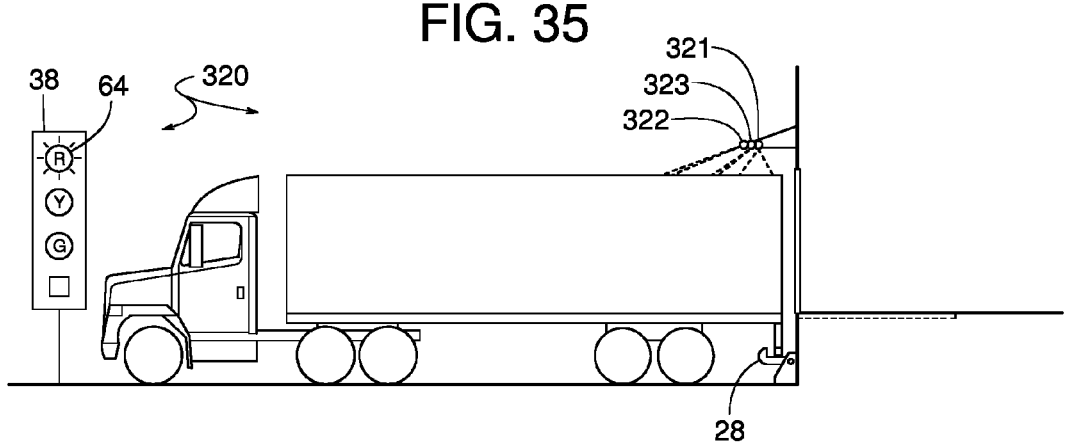
FIG. 35 is a side view similar to FIG. 32 but showing the vehicle restrained at the loading dock.
Figure 36:
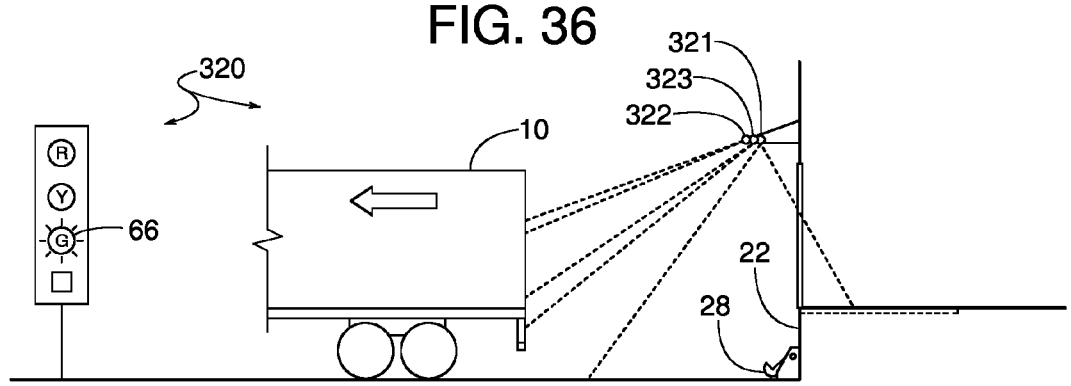
FIG. 36 is a side view similar to FIG. 32 but showing the vehicle departing the loading dock.

Referring to FIG. 35, once the vehicle 10 is docked after having turned the bi-directional sensor 322 and the incoming sensor 323 ON, and the vehicle restraint 28 is energized and/or is restraining the vehicle 10, the outdoor signal device 38 responds by emitting the red light 64. At this point, incidental movement of the vehicle 10 might trigger the pedestrian sensor 321. However, the triggering of the pedestrian sensor 321 will be ignored (e.g., by the controller 51) because the vehicle restraint 28 has the vehicle 10 restrained at the dock face 22. After the vehicle restraint 28 releases the vehicle 10 and the vehicle 10 departs, as shown in FIG. 36, the vehicle's forward movement in a direction away from the dock face 22 turns the pedestrian sensor 321 and the bi-directional sensor 322 ON while the incoming sensor 323 is OFF, where the outdoor signal device 38 responds by emitting the green light 66.

Figure 37:
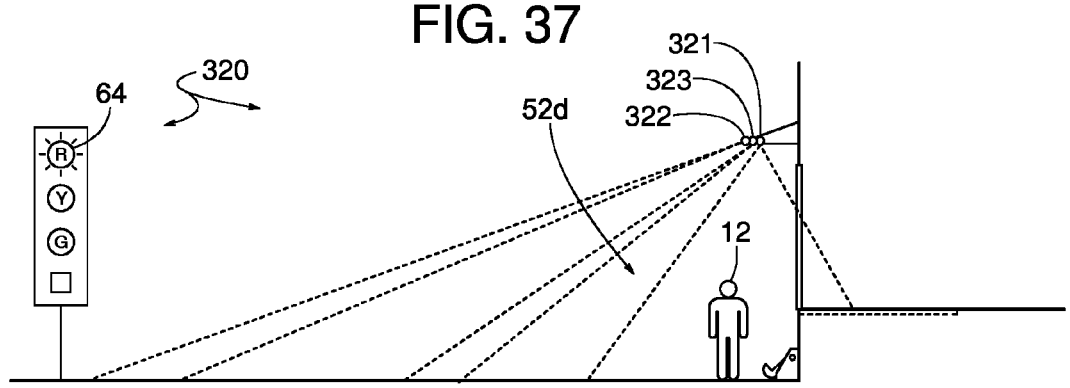
FIG. 37 is a side view similar to FIG. 32 but showing a person near the dock face of the loading dock.
Figure 38:
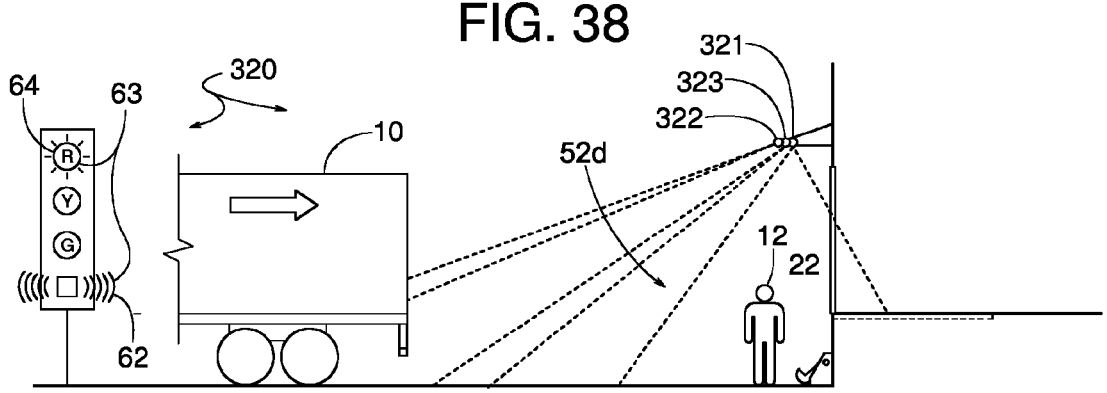
FIG. 38 is a side view similar to FIG. 32 but showing an incoming vehicle moving toward the dock face of the loading dock and a person near the dock face of the loading dock.

Referring to FIG. 37, if the pedestrian sensor 321 detects the person 12 in the area 52d while no vehicle is present, the pedestrian sensor 321 turns ON and the bi-directional sensor 322 and the incoming sensor 323 are OFF, where the signal device 38 responds by emitting the red light 64. If the pedestrian sensor 321 detects the person 12 in the area 52d and the bi-directional sensor 322 detects the vehicle 10 moving back toward the dock face 22 (but not close enough to trip the incoming sensor 323), as shown in FIG. 38, the pedestrian sensor 321 and the bi-directional sensor 322 turn ON while the incoming sensor 323 is OFF. In the example of FIG. 38, the outdoor signal device 38 responds by emitting the signal 63 (e.g., the red light 64 plus the audible alarm 62).

Figure 39:
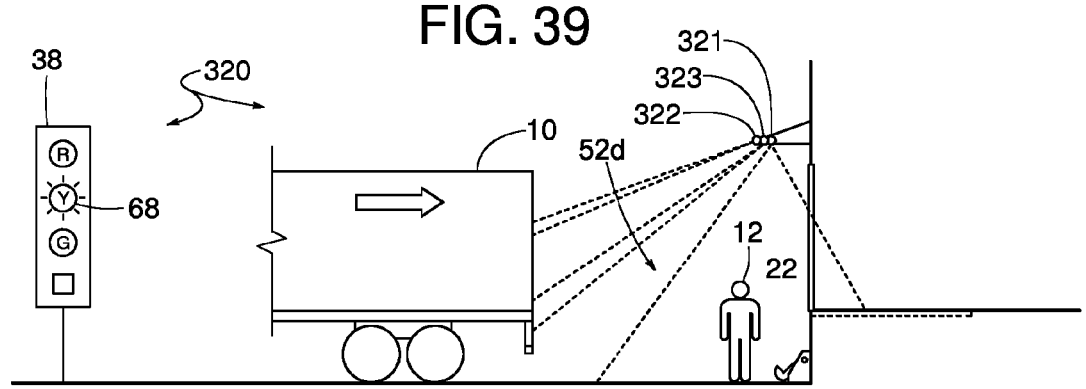
FIG. 39 is a side view similar to FIG. 38 but showing the incoming vehicle moving closer to the dock face of the loading dock.
Figure 40:
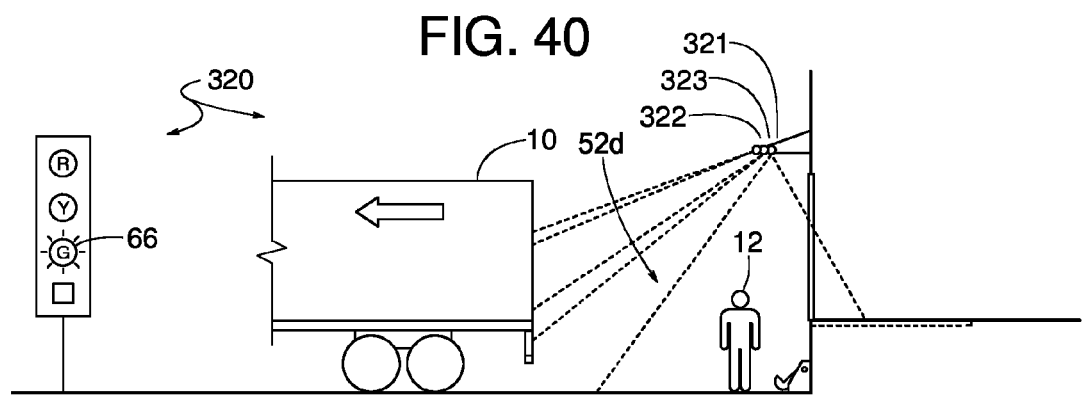
FIG. 40 is a side view similar to FIG. 39 but showing the vehicle moving forward away from the dock face of the loading dock.
Figure 41:
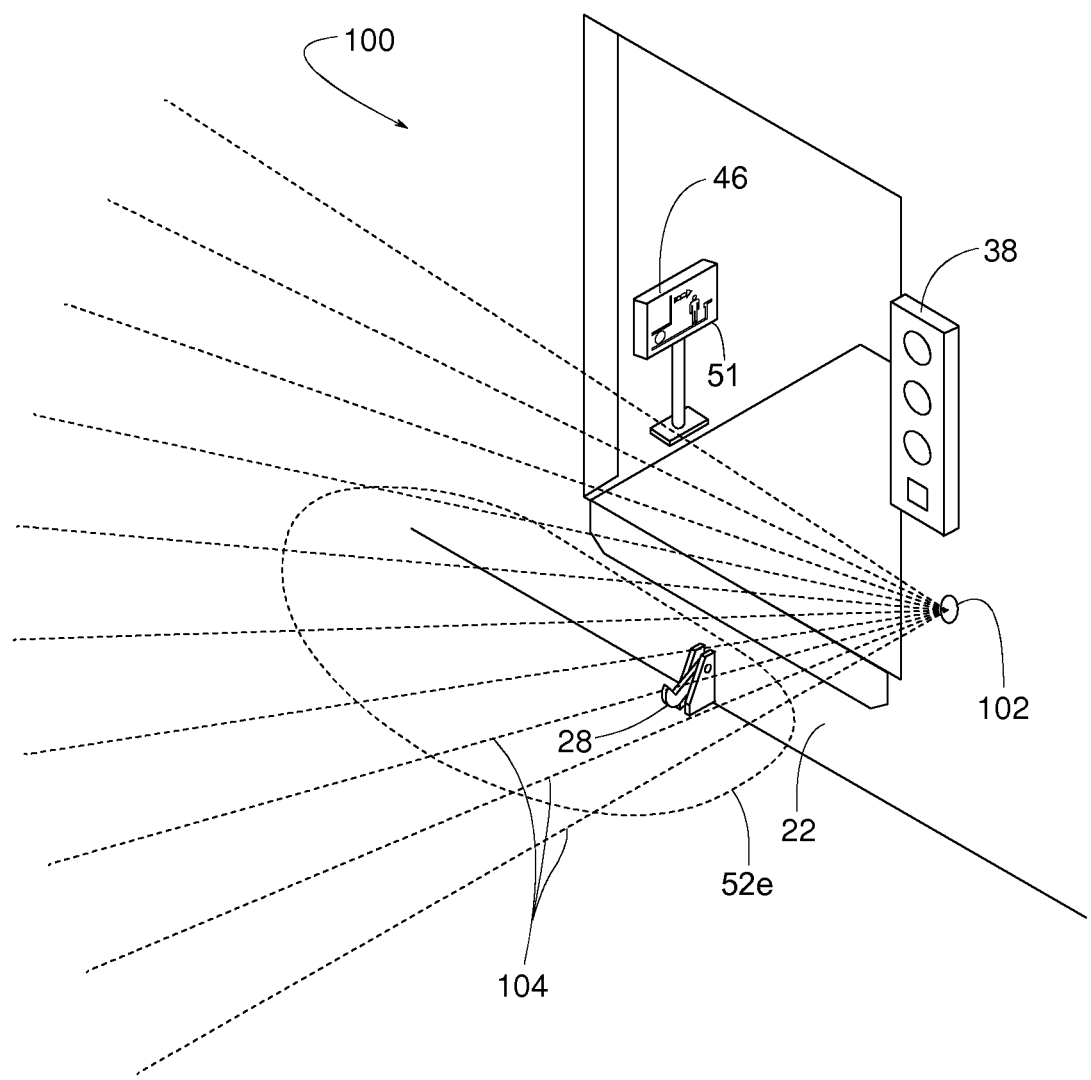
FIG. 41 is a perspective view of another example safety system constructed in accordance with the teachings disclosed herein.

In some examples, the incoming vehicle 10 triggering the incoming sensor 323, as shown in FIG. 39, disables the pedestrian sensor 321. Consequently, the person 12 suddenly jumping or moving into the area 52d between the vehicle 10 and the dock face 22 would not, in some examples, trigger the red light 64 and/or the audible alarm 62. In some examples, as reference, the vehicle 10 backing in at 2 mph travels approximately 10 feet in about 3.4 seconds while the person 12 moving at 2.8 mph can move approximately 6 feet (centerline of dock) in about 1.46 seconds. If the vehicle 10 is moving forward instead of backward, as shown in FIG. 40, the bi-directional sensor 322 and the pedestrian sensor 321 are ON and the incoming sensor 323 is OFF. In the example of FIG. 40, the outdoor signal device 38 responds by emitting the green light 66.

The example illustrated in FIGS. 41-45 includes a sensing system 100 comprising a sensor 102 emitting a plurality of sensing projections 104 angularly distributed in a generally starburst array covering a monitored area 52e of within approximately a ninety degree range. In some examples, within an area (e.g., the area 52e) less than a ninety degree range (e.g., 88 degrees), there are a plurality of sensing projections 104. In some examples, the plurality of sensing projections 104 plus additional projections cover an area beyond or greater than approximately a ninety degree range. In some examples, the sensor 102 is an R2100 Multi-Beam LED Scanner having a single enclosure.

When a subject enters the monitored area 52e, the system 100 determines whether the subject is the vehicle 10 or the person 12 based on a characteristic manner in which the plurality of projections 104 is interrupted. The characteristic manner of an actual interruption is compared to one or more predefined characteristic manners. Example characteristics include, but are not limited to, a sequence in which the plurality of sensing projections 104 are interrupted, a quantity of interrupted sensing projections 104, and/or combinations thereof. The sequence of interruptions also indicates whether the subject is entering or leaving the area 52e. When multiple projections 104 are interrupted, a comparison of the resulting distance feedback signals of the sensor 102 indicates whether only one subject is within the area 52e or whether both the person 12 and the vehicle 10 are present within the area 52e.

Figure 42:
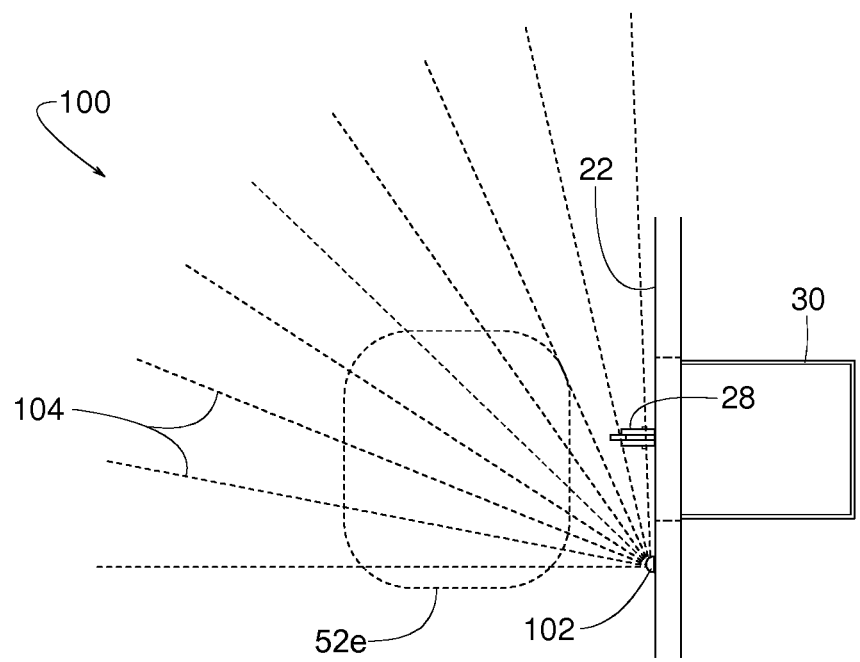
FIG. 42 is a top view of FIG. 41.
Figure 43:
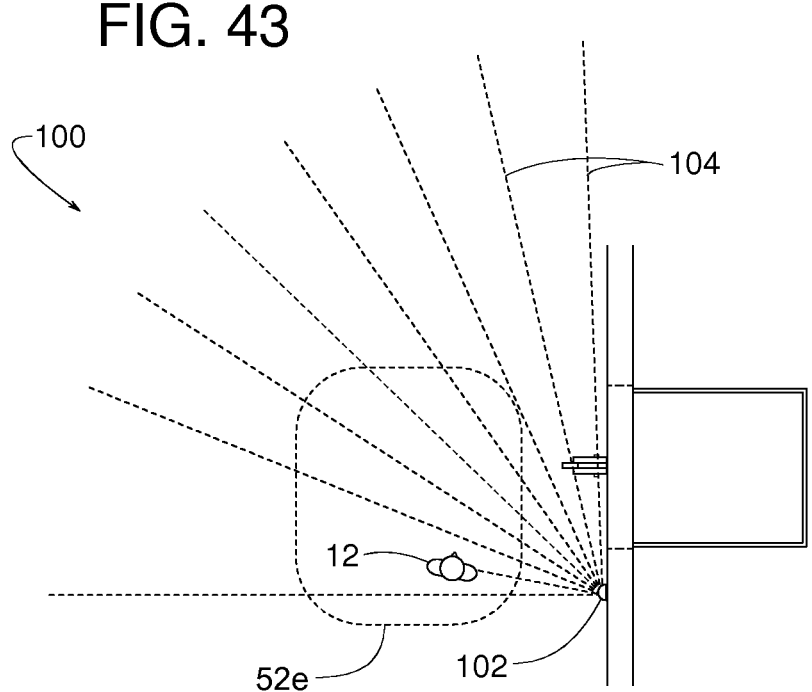
FIG. 43 is a top view similar to FIG. 42 but with a person present at the loading dock.
Figure 44:
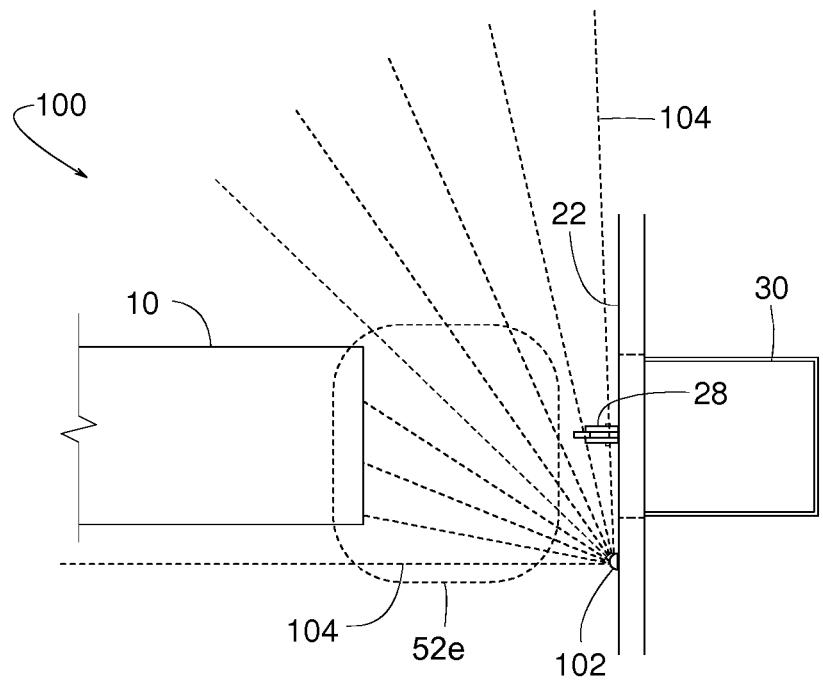
FIG. 44 is a top view similar to FIG. 42 but with a vehicle present at the loading dock.
Figure 45:
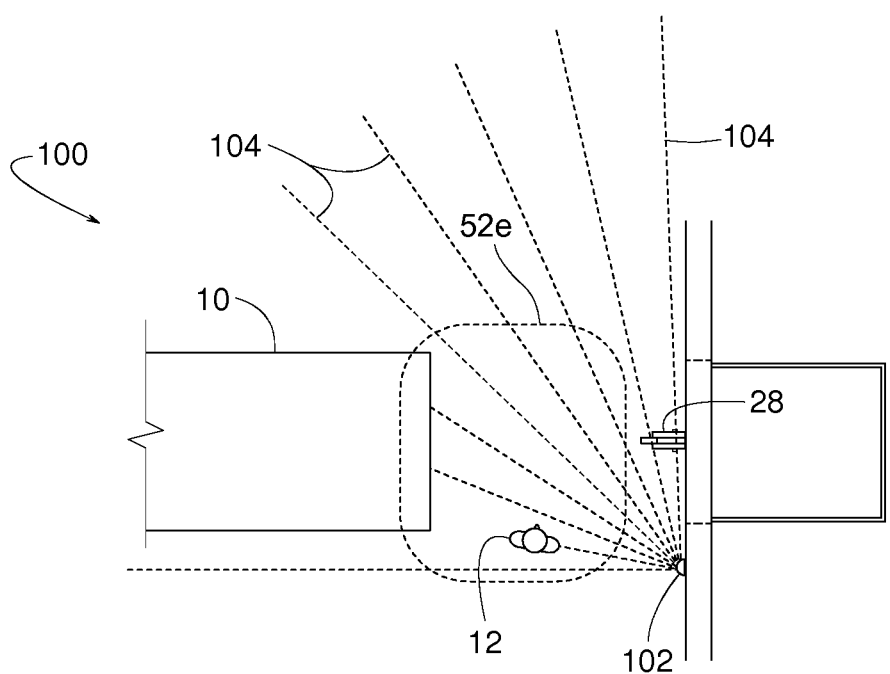
FIG. 45 is a top view similar to FIG. 42 but with a vehicle and a person present at the loading dock.

When no projections 104 are interrupted, as shown in FIG. 42, the system 100 determines that neither the person 12 nor the vehicle 10 is present within the area 52e. If only one projection 104 is interrupted, as shown in FIG. 43, the system 100 determines that only the person 12 is within the area 52e. If at least a number of projections 104 (e.g., a certain number of projections, a number greater than a threshold, etc.) are interrupted, as shown in FIG. 44, the system 100 determines that the vehicle 10 is within the area 52e. If a number of projections are interrupted and at least one results in a significantly lower distance reading, the system 100 determines that both the vehicle 10 and the person 12 are within area 52e, as shown in FIG. 45. In view of these examples and based on other characteristics (e.g., sequence, speed, etc.) in which the projections 104 are interrupted, the system 100 can control the outdoor signal device 38 accordingly.

The example illustrated in FIGS. 46-48 includes an electronic sensor system 326 including a motion sensor 328 mounted overhead and configured to sense the vehicle 10 moving back toward the dock face 22 and a presence sensor 330 mounted overhead and providing a plurality of sensing projections 332 that define and cover a certain area 52f proximate the dock face 22. In some examples, the motion sensor 328 is a single BEA Falcon microwave motion sensor having a sensing projection 334 extending beyond the area 52f (e.g., a distance away from the dock face 22).

In the illustrated example of the presence sensor 330, the sensing projections 332 are generally planar and fan out or diverge from the sensor 328 and toward a driveway 340 of the loading dock 14. The person 12 interrupting at least one of the sensing projections 332 triggers the presence sensor 330. Some examples of the presence sensor 330 include, but are not limited to, a laser scanner, multiple LZR-i100 presence sensors, one or more other LZR sensors, and/or a BEA Microscan sensor.

Some examples of the system 326 have the sensing projections 332 that extend only a limited distance 336 (e.g., a first sensing length) that is less than a full distance 338 (e.g., a certain height) from the sensor 330 to the driveway 340 of the loading dock 14. The difference between the distances 338 and 336 provides an undetected shallow area 342 that is left unmonitored by the presence sensor 330. The unmonitored area 330 prevents false triggers due to accumulations of snow or debris on the driveway 340. In some examples, the presence sensor 330 includes means for adjusting the distance 336. In response to signals from the motion sensor 328 and the presence sensor 330, the system 326 controls the outdoor signal device 38 and/or the indoor signal device 46 (e.g., shown in FIGS. 52-55) in a manner similar to those described with reference to FIGS. 1-4.

The example illustrated in FIGS. 49-51 includes an electronic sensor system 350 including a motion sensor 328 mounted overhead and configured to sense a vehicle 10 moving back toward the dock face 22. The electronic sensor system 350 of the illustrated example includes a three dimensional (3-D) imaging scanner or sensor 352 mounted adjacent the doorway (e.g., above the doorway). The imaging scanner 352 of the illustrated example scans an area 52g proximate the dock face 22. For example, the imaging scanner 352 of the illustrated example is capable of detecting a height, a width and a length of an object in the area 52g (e.g., a dimensional envelope of an object in an x-axis, y-axis and z-axis directions). In some examples, the imaging sensor 352 is implemented by an Efector PMD 3-D imaging sensor manufactured by IFM Electronic (Pty) Ltd., Germany. In the illustrated example, the sensing projection 334 of the motion sensor 328 extends beyond the area 52g (e.g., a distance away from the dock face 22).

In operation, the motion sensor 328 of the illustrated example provides a sensing projection 334 beyond the area 52g to sense or detect the vehicle 10 moving relative to the dock face 22 (e.g., moving toward the dock face 22). The imaging scanner 352 scans the area 52g to detect the presence of the person 12. In particular, the imaging scanner 352 provides a scanned image or signal to the controller 51 and the controller 51 processes the scanned image to detect whether the person 12 is present in the area 52g. For example, the controller 51 may be configured to detect whether a scanned object is within a dimensional envelope or profile of interest (e.g., a predetermined dimensional envelope). For example, the imaging scanner 352 of the illustrated example detects a height of an object in the area 52g relative to the driveway 340 (e.g., in a direction perpendicular to the driveway 340 (z-axis)), detects or determines a width of the object in the area 52g (e.g., in a direction perpendicular to the height and parallel relative to the dock face 22 (x-axis)), and detects or determines a length of the object in the area 52g (e.g., in a direction perpendicular to the dock face 22 and parallel to the driveway 340 (y-axis)). In some examples, the imaging scanner 352 distinguishes different objects positioned in the area 52g based on their shapes or profiles (e.g., heights, widths and/or lengths). For example, the controller 51 of the illustrated example may be configured to detect objects in the area 52g that are approximately between 12"×12" in length to 24"× 24" in width and approximately between 3 feet and 9 feet in height. For example, when the imaging sensor 352 scans an image within the area 52g that is within the dimensional profile, the controller 51 determines the scanned object to be a person. However, if the dimensions of the object are outside of the dimensional profile, the controller 51 may be configured to determine that the scanned object is a vehicle. Thus, in some examples, the motion sensor 328 is eliminated and the imaging sensor 352 detects the presence of the vehicle 10 and the person 12. In some examples, the motion sensor 328 is replaced by another imaging scanner similar to the imaging scanner 352. In response to signals from the sensor 328 and/or the imaging scanner 352, the system 350 of the illustrated example controls the outdoor signal device 38 and/or the indoor signal device 46 (FIGS. 52-55) in a manner similar to those described with reference to FIGS. 1-48.

Figure 52:
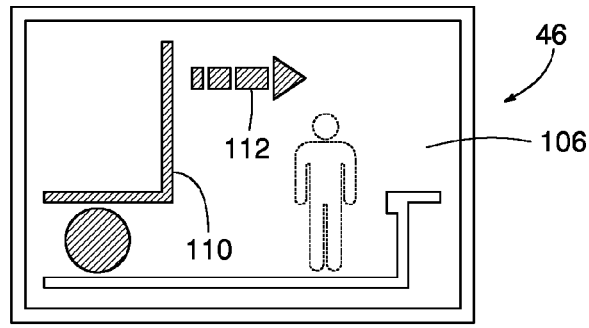
FIG. 52 is a front view of an example signal device constructed in accordance with the teachings disclosed herein.
Figure 53:
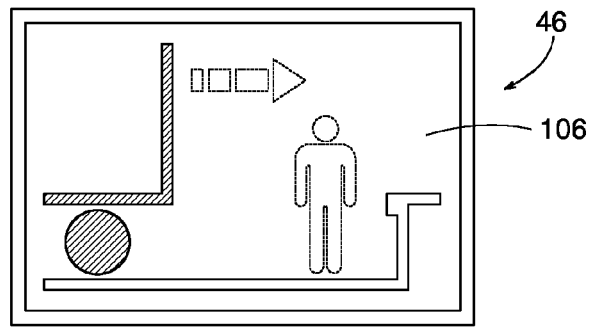
FIG. 53 is a front view similar to FIG. 52 but with the example signal device displaying another example signal.
Figure 54:
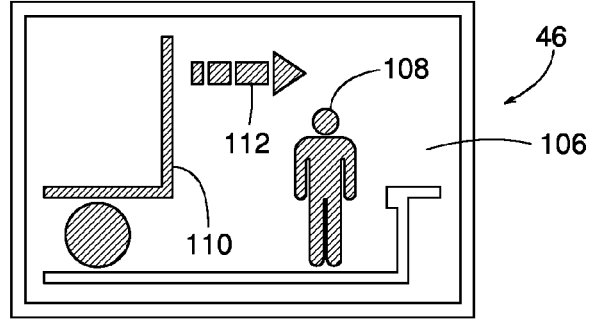
FIG. 54 is a front view similar to FIG. 52 but with the example signal device displaying yet another example signal.

In some examples, as shown in FIGS. 52-55, the indoor signal device 46 provides a graphical display 106 with various symbols or icons that can be turned on and off to indicate a status of the operating conditions in the outdoor area 18. The various symbols are automatically turned on and off (e.g., via the controller 51) in response to feedback from the various outdoor sensors. In the illustrated example, the graphical display 106 includes a person-symbol 108, a vehicle-symbol 110 and a travel symbol 112. The person-symbol 108 being turned on, as shown in FIGS. 54 and 55, indicates the presence of the person 12 in an area (e.g., the area 52a-52g) proximate the dock face 22. The vehicle-symbol 110 being turned on, as shown in FIGS. 52-55, indicates that the vehicle 10 is present at the loading dock 14. Travel symbol 112 being on, as shown in FIGS. 52 and 54, indicates the vehicle 10 is moving in a direction back toward the dock face 22.

Figure 56:
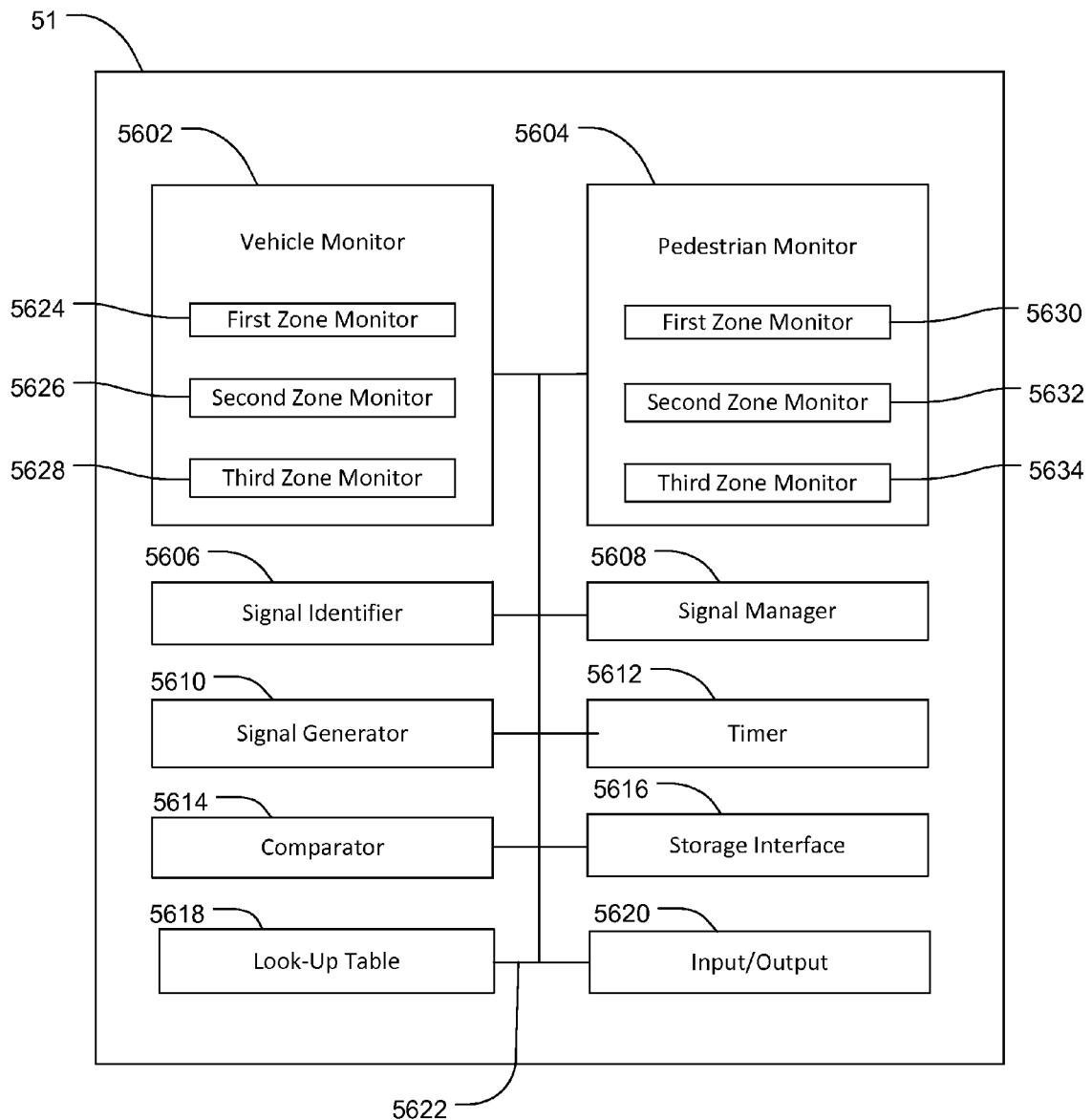
FIG. 56 is a block diagram representative of an example implementation of the example controller of FIGS. 1-51.

FIG. 56 is a block diagram representative of an example implementation of the example controller 51 of FIGS. 1-55. In the illustrated example of FIG. 56, the controller 51 includes a vehicle monitor 5602, a pedestrian monitor 5604, a signal identifier 5606, a signal manager 5608, a signal generator 5610, a timer 5612, a comparator 5614, a storage interface 5616, a look-up table 5618 and an input/output interface 5620. The example vehicle monitor 5602, the example pedestrian monitor 5604, the example signal identifier 5606, the example signal manager 5608, the example signal generator 5610, the example timer 5612, the example comparator 5614, the example storage interface 5616, the example look-up table 5618 and/or the example input/output interface 5620 of the illustrated example are in communication via a communication bus 5622. The input/output interface 5620 of the illustrated example communicatively couples the example controller 51 to one or more loading dock devices such as, for example, one or more of the example sensors 40, 42, 44, 72, 74, 92, 94, 321, 322, 323, 102, 328, the example imaging scanner 352, the example electromagnetic element 35, the example portable signal device 37, the example outdoor signal device 38, the example indoor signal device 46, and/or any other device that may be used in conjunction with the example loading dock 14 of FIGS. 1-55.

In the illustrated example of FIG. 56, the input/output interface 5620 receives a signal from one or more of the example sensors 40, 42, 44, 72, 74, 92, 94, 321, 322, 323, 102, 328 and/or the example imaging scanner 352. In turn, the input/output interface 5620 of the illustrated example communicates the received signal to the example signal identifier 5606. The signal identifier 5606 of the illustrated example determines a sensor from which a signal is received by the input/output interface 5620. For example, in the example system of FIGS. 1-11, the example signal identifier 5606 determines or identifies (e.g., tags) whether a signal received is provided by the example pedestrian sensors 40 (e.g., the away sensor 40a and the bi-directional sensor 40b), the example pedestrian sensors 42 (e.g., the away sensor 42a and the bi-directional sensor 42b), and/or the example vehicle sensors 44 (e.g., the incoming sensor 44a and the bi-directional sensor 44b). In the example system of FIGS. 12-20, the signal identifier 5606 determines whether a signal received is provided by the example motion sensor 72 and/or the example presence sensors 74 (e.g., the first zone sensor 74a, the second zone sensor 74b, and/or the third zone sensor 74c). In the example system of FIGS. 21-31, the signal identifier 5606 determines whether a signal received is provided by the example motion sensor 92 and/or any one of the example distance sensors 94. In the example system of FIGS. 32-40, the signal identifier 5606 determines whether a signal received is provided by the example pedestrian sensor 321, the example bi-directional sensor 322 and/or the example incoming sensor 323. In the example system of FIGS. 41-45, the signal identifier 5606 determines whether a signal received is provided by the example sensor 102. In the example system of FIGS. 46-48, the example signal identifier 5606 determines whether a signal received is provided by the example motion sensor 328 and/or the example presence sensor 330. In the example system of FIGS. 49-51, the example signal identifier 5606 determines whether a signal received is provided by the example motion sensor 328 and/or the example imaging scanner 352. In some examples, the example signal identifier 5606 determines a zone associated with the received signal. For example, referring to FIG. 12, the signal identifier 5606 identifies a signal received from the example first zone sensor 74a, a signal received from the example second zone sensor 74b, and/or a signal received from the example third zone sensor 74c.

The signal identifier 5606 communicates the received signal to the example signal manager 5608. In some examples, the signal identifier 5606 communicates the received signal to the vehicle monitor 5602 and/or the pedestrian monitor 5604. The signal manager 5608 of the illustrated example filters the received signal if the received signal should be ignored by the vehicle monitor 5602 and/or the pedestrian monitor 5604. For example, referring to the example system of FIGS. 1-11, signals generated by the example pedestrian sensors 40 and 42 are ignored until the example away sensor 44b is activated. In some examples, referring to FIG. 12, when the vehicle monitor 5602 determines that a vehicle is present at the loading dock 14 based on the signals provided by the example presence sensor 74 (e.g., the example first zone sensor 74a, the example second zone sensor 74b and/or the example third zone sensor 74c), the signal manager 5608 ignores signals provided by the example motion sensor 72, which also indicate the presence of a vehicle at the example loading dock 14. Thus, the signal manager 5608 prevents the signal from the example motion sensor 72 from being analyzed by the vehicle monitor 5602 when the example presence sensor 74 detects the presence of the vehicle 10 at the loading dock 14. The signal manager 5608 communicates the received signals to the vehicle monitor 5602 and/or the pedestrian monitor 5604. However, in some examples, the controller 51 does not include either the signal identifier 5606 and/or the signal manager 5608 and the vehicle monitor 5602 and/or the pedestrian monitor 5604 receive the signals from the input/output interface 5620. In some examples, the vehicle monitor 5602 and/or the pedestrian monitor 5604 receive signals from the signal identifier 5606, the signal manager 5608 and/or the input/output interface 5620.

In the illustrated example of FIG. 56, the example vehicle monitor 5602 receives a signal from a sensor via, for example, the signal manager 5608 and/or the input/output interface 5620. The example vehicle monitor 5602 of the illustrated example analyzes the signal to determine the presence of a vehicle (e.g., the example vehicle 10) at the loading dock 14. Additionally, when a vehicle is detected at the loading dock 14, the example vehicle monitor 5602 determines a status of the vehicle such as, for example, whether the vehicle is moving in a direction toward the dock face 22 of the loading dock 14, in a direction away from the dock face 22 of the loading dock, and/or whether the vehicle is parked or stationary relative to the dock face 22 of the loading dock 14. For example, to determine the presence and/or status of a vehicle at the loading dock 14, the vehicle monitor 5602 of the illustrated example receives a signal from the example vehicle sensors 44 (e.g., the incoming sensor 44a and the away sensor 44b) of FIGS. 1-11, the example motion sensor 72 and/or the example presence sensor 74 (e.g., the first zone sensor 74a, the second zone sensor 74b, and/or the third zone sensor 74c) of FIGS. 12-20, the example motion sensor 92 and/or the example distance sensors 94 of FIGS. 21-31, the example bi-directional sensor 322 and/or the example incoming sensor 323 of FIGS. 32-40, the example sensor 102 of FIGS. 41-45, the example motion sensor 328 of FIGS. 46-48, or the example motion sensor 328 and/or the example imaging scanner 352 of FIGS. 49-51.

In the illustrated example of FIG. 56, the example vehicle monitor 5602 receives signals from sensors positioned to sense specific and/or different zones or areas adjacent the dock face 22 of the loading dock 14. The example vehicle monitor 5602 may detect the presence of a vehicle (e.g., the vehicle 10) at the loading dock 14 based on a sequence of signals activated in one or more of the different zones, a number of signals activated in one or more of the different zones, a pattern in which the signals covering the one or more of the different zones activate, etc. For example, the example vehicle monitor 5602 of the illustrated example includes a first zone monitor 5624, a second zone monitor 5626 and a third zone monitor 5628. In some examples, the vehicle monitor 5602 includes first and second zone monitors 5624 and 5626. In some examples, the vehicle monitor 5602 includes four or more zone monitors. For example, referring also to FIG. 12, the first zone monitor 5624 of the example vehicle monitor 5602 receives a signal from the example first zone sensor 74a, the example second zone monitor 5624 receives a signal from the example second zone sensor 74b, and the third zone monitor 5628 receives a signal from the example third zone sensor 74c. For example, the example vehicle monitor 5602 determines a vehicle is present at the loading dock 14 when the vehicle monitor 5602 receives a first signal provided by the example first zone sensor 74a, receives a second signal provided by the example second zone sensor 74b an amount of time (e.g., a first predetermined amount of time, a set amount of time, a second, etc.) after the example vehicle monitor 5602 received the first signal from the example first zone sensor 74a, and receives a third signal provided by the example third zone sensor 74c an amount of time (e.g., a second predetermined amount of time, two seconds, a second, etc.) after the vehicle monitor 5602 received the first and second signals from the respective first and second zone sensors 74a and 74b. In some examples, the vehicle monitor 5602 employs the timer 5612 to determine the amount of time (e.g., between received signals)

Likewise, the example pedestrian monitor 5604 determines the presence (or absence) of a pedestrian or forktruck at a specific area (e.g., the areas 52a-52g) adjacent to the dock face 22 of the loading dock 14. In particular, based on a signal received from a sensor via the signal manager 5608 and/or the input/output interface 5620, the example pedestrian monitor 5604 analyzes the signal to determine the presence (or absence) of a person (e.g., the person 12) in the area 52a-52g. For example, to determine the presence and/or status of a person at the loading dock 14, the pedestrian monitor 5602 of the illustrated example receives a signal from the example pedestrian sensor 40 (e.g., the away sensor 40a and the bi-directional sensor 40b) and/or the example pedestrian sensor 42 (e.g., the away sensor 42a and the bi-directional sensor 42b) of FIGS. 1-11, the example presence sensor 74 (e.g., the first zone sensor 74a, the second zone sensor 74b, and the third zone sensor 74c) of FIGS. 12-20, the example distance sensors 94 of FIGS. 21-31, the example pedestrian sensor 321 and/or the example bi-directional sensor 322 of FIGS. 32-40, the example sensor 102 of FIGS. 41-45, the example sensor 330 of FIGS. 46-48, and/or the example motion sensor 328 and/or the example imaging scanner 352 of FIGS. 49-51.

In the illustrated example of FIG. 56, the example pedestrian monitor 5604 receives signals from sensors that sense specific and/or different zones or areas (e.g., the areas 52a-52g) of the loading dock 14. The example pedestrian monitor 5604 detects the presence of a person at the loading dock 14 based on a sequence of activation of the sensors in one or more of the different zones, the number of signals activated in one or more of the different zones, a pattern of activation of the sensors in one or more of the different zones, etc. For example, the pedestrian monitor 5604 of FIG. 56 includes a first zone monitor 5630, a second zone monitor 5632 and a third zone monitor 5634. In some examples, the pedestrian monitor 5604 includes a first zone monitor 5630 and/or a second zone monitor 5632. In some examples, the pedestrian monitor 5604 includes four or more zone monitors. For example, referring also to FIG. 12, the first zone monitor 5630 of the example pedestrian monitor 5604 may receive a signal from the example first zone sensor 74a, the example second zone monitor 5632 may receive a signal from the example second zone sensor 74b, and the third zone monitor 5634 may receive a signal from the example third zone sensor 74c. For example, the pedestrian monitor 5604 of FIG. 56 determines a person is present at the loading dock 14 when the pedestrian monitor 5604 receives a signal provided by the example third zone sensor 74c and/or the example second zone sensor 74b without receiving a signal from the example first zone sensor 74a an amount of time (e.g., a few milliseconds) after receiving the signals from the example third zone sensor 74c and/or the second zone sensor 74b. In some examples, the pedestrian monitor 5604 employs the timer 5612 to determine the amount of time (e.g., between received signals).

The vehicle monitor 5602 of the illustrated example communicates the presence (or absence) of a vehicle at the loading dock 14 to the signal generator 5610. Likewise, the pedestrian monitor 5604 of the illustrated example communicates the presence (or absence) of a person in the area 52a-52g to the signal generator 5610. In turn, for example, the signal generator 5610 of FIG. 56 activates or deactivates the example signal device 38 and/or the example indoor signal device 46 based on the determinations made by the respective vehicle monitor 5602 and/or the pedestrian monitor 5604. For example, when the vehicle monitor 5602 determines that a vehicle is present at the loading dock 14, and the pedestrian monitor 5604 determines that a person is not present in the area 52a-52g, the signal generator 5610 of the illustrated example actives a warning signal (e.g., the example yellow light 68) of the example outdoor signal device 38 and/or the example graphical display 106 of the example indoor signal device 46 of FIGS. 1-55.

In some examples, the signal generator 5610 continues to activate a signal or warning for a period of time after the respective vehicle monitor 5602 and/or the pedestrian monitor 5604 no longer detect the presence of a vehicle or a person at the loading dock 14. For example, when the vehicle monitor 5602 of FIG. 56 determines a vehicle is present at the loading dock 14 and the pedestrian monitor 5604 determines that a person is not present in the area 52a-52g, the vehicle monitor 5602 and the pedestrian monitor 5604 communicate to the signal generator 5610 the presence of the vehicle and the absence of a person in the area 52a-52g. In turn, the signal generator 5610 activates a first signal (e.g., the example yellow warning light 68 of the example outdoor signal device 38). When the vehicle monitor 5602 no longer determines that the vehicle is present at the loading dock 14, and the pedestrian monitor 5604 does not detect a presence of a person in the area 52*a*-52*g*, the signal generator 5610 may continue to activate the first signal (e.g., the example yellow light 68) for a period of time (e.g., a threshold, a predetermined period of time, a set period of time, five seconds, etc.) after detecting the absence of the vehicle. After the signal generator 5610 determines that the period of time has expired and neither the vehicle monitor 5602 nor the pedestrian monitor 5604 detect presence of a vehicle at the loading dock 14 or a person in the area 52*a*-52*g*, the signal generator 5610 activates or otherwise emits a second signal (e.g., the example green light 66 on the outdoor signal device 38). For example, the signal generator 5610 may determine the expiration of the period of time using the timer 5612.

In some examples, the vehicle monitor 5602 and/or the pedestrian monitor 5604 analyze or determine a pattern or characteristic of the received signals to determine the presence of a vehicle at the loading dock 14 and/or a person in the area 52*a*-52*g*. For example, the vehicle monitor 5602 and/or the pedestrian monitor 5604 of FIG. 56 communicate the analyzed signals to the comparator 5614. The comparator 5614 in turn compares the analyzed signals with a pattern or characteristic of signals (e.g., a predefined pattern or characteristic) retrieved from the look-up table 5618 of the storage interface 5616. In some examples, the comparator 5614 compares a width of an object detected by the signals to a threshold (e.g., greater than 4 feet) and determines that the object detected is a vehicle if the width is greater than the threshold or determines that the object detected is a person if the width is less than the threshold. In some examples, for example in connection with the example system 100 of FIGS. 41-45, the vehicle monitor 5602 and/or the pedestrian monitor 5604 determine a characteristic manner in which the plurality of projections 104 is interrupted. The example comparator 5614 compares the detected characteristic manner with predefined characteristic manners stored, for example, in the look-up table 5618 of the storage interface 5616. If the determined characteristic pattern matches or is similar (e.g., substantially matching or being similar) to a characteristic pattern (e.g., a stored characteristic pattern, a predetermined characteristic pattern), the comparator 5614 communicates the results to the vehicle monitor 5602 and/or the pedestrian monitor 5604. In some examples, the comparator 5614 compares distance feedback signals provided by the plurality of projections 104 to determine whether a vehicle is present at the loading dock 14 and/or a person is present in the area 52*a*-52*g*.

The comparator 5614 communicates the results of the comparison to the vehicle monitor 5602 and/or the pedestrian monitor 5604. In some examples, to determine the presence of a vehicle and/or a person at the loading dock 14, the vehicle monitor 5602 and/or the pedestrian monitor 5604 of the illustrated example compare, via the comparator 5614, an image from the imaging scanner 352 to a predefined image retrieved from the look-up table 5618 of the storage interface 5616. In some examples, the vehicle monitor 5602 and/or the pedestrian monitor 5604 detect a dimension (e.g., a length, a width and/or a height) of an object present at the loading dock 14 that is captured by the example imaging scanner 352. The comparator 5614 compares the determined dimension to a threshold and determines that the object present is a vehicle if the dimensional value is greater than the threshold value and determines that the object present is a person if the dimensional value is less than the threshold value.

While an example manner of implementing the controller 51 of FIGS. 1-55 is illustrated in FIG. 56, one or more of the elements, processes and/or devices illustrated in FIG. 56 may be combined, divided, re-arranged, omitted, eliminated and/or implemented in any other way. Further, The example vehicle monitor 5602, the example pedestrian monitor 5604, the example signal identifier 5606, the example signal manager 5608, the example signal generator 5610, the example timer 5612, the example comparator 5614, the example storage 5616, the example look-up table 5618, the example input/output interface 5620, the first zone monitors 5624 and/or 5630, the second zone monitors 5626 and/or 5632, the third zone monitors 5628 and/or 5634 and/or, more generally, the example controller 51 of FIG. 56 may be implemented by hardware, software, firmware and/or any combination of hardware, software and/or firmware. Thus, for example, any of the example vehicle monitor 5602, the example pedestrian monitor 5604, the example signal identifier 5606, the example signal manager 5608, the example signal generator 5610, the example timer 5612, the example comparator 5614, the example storage 5616, the example look-up table 5618, the example input/output interface 5620, the first zone monitors 5624 and/or 5630, the second zone monitors 5626 and/or 5632, the third zone monitors 5628 and/or 5634 and/or, more generally, the example controller 51 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example vehicle monitor 5602, the example pedestrian monitor 5604, the example signal identifier 5606, the example signal manager 5608, the example signal generator 5610, the example timer 5612, the example comparator 5614, the example storage 5616, the example look-up table 5618, the example input/output interface 5620, the first zone monitors 5624 and/or 5630, the second zone monitors 5626 and/or 5632, the third zone monitors 5628 and/or 5634 and/or, more generally, the example controller 51 s/are hereby expressly defined to include a tangible computer readable storage device or storage disk such as a memory, a digital versatile disk (DVD), a compact disk (CD), a Blu-ray disk, etc. storing the software and/or firmware. Further still, the example controller 51 of FIGS. 1-55 may include one or more elements, processes and/or devices in addition to, or instead of, those illustrated in FIG. 56, and/or may include more than one of any or all of the illustrated elements, processes and devices.

Example flowcharts representative of example machine readable instructions for implementing the example controller 51 of FIG. 56 are shown in FIGS. 57-68. In these examples, the machine readable instructions comprise programs for execution by a processor such as the processor 7012 shown in the example processor platform 7000 discussed below in connection with FIG. 70. The program may be embodied in software stored on a tangible computer readable storage medium such as a CD-ROM, a floppy disk, a hard drive, a digital versatile disk (DVD), a Blu-ray disk, or a memory associated with the processor 7012, but the entire program and/or parts thereof could alternatively be executed by a device other than the processor 7012 and/or embodied in firmware or dedicated hardware. Further, although the example programs are described with reference to the flowcharts illustrated in FIGS. 57-68, many other methods of implementing the example controller 51 may alternatively be used. For example, the order of execution of the blocks may be changed, and/or some of the blocks described may be changed, eliminated, or combined.

As mentioned above, the example processes of FIGS. 57-68 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 57-68 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

Figure 57:
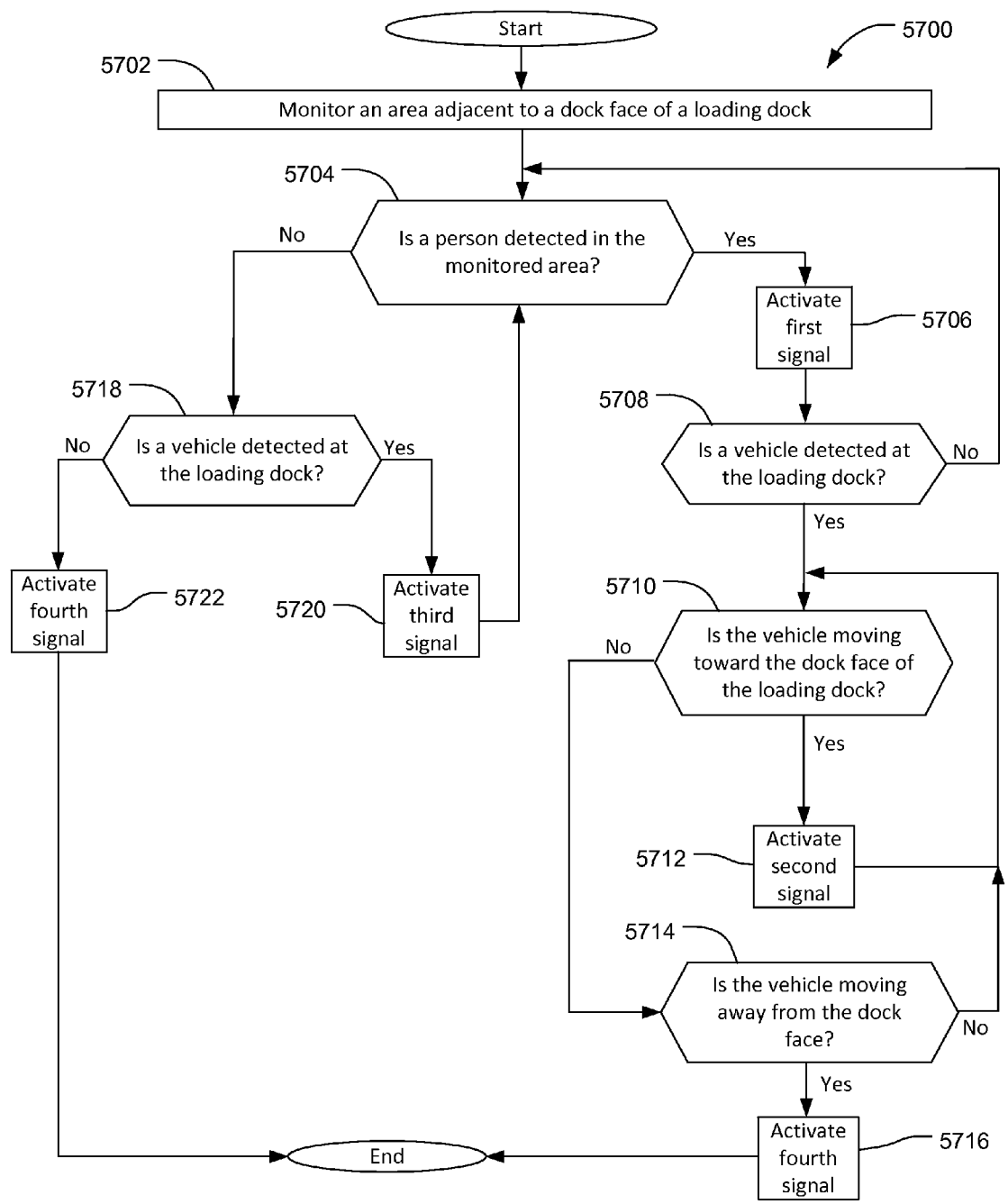
FIGS. 57-68 are flowcharts representative of example machine readable instructions which may be executed to implement the example controller of FIG. 56.

FIG. 57 is a flowchart representative of example machine readable instructions which may be executed to implement the example controller 51 of FIG. 56. The program 5700 of FIG. 57 begins at block 5702 when the example vehicle monitor 5602 monitors the loading dock 14 and the example pedestrian monitor 5604 monitors the area 52a-52g adjacent the dock face 22 of the loading dock 14. During monitoring, the example pedestrian monitor 5604 detects the presence of a person in the area 52a-52g (block 5704). If the pedestrian monitor 5604 detects the presence of a person in the area 52a-52g at block 5704, the pedestrian monitor 5604 causes the example signal generator 5610 to activate a first signal (block 5706). For example, the signal generator 5610 may activate the example red light 64 of the example outdoor signal device 38 and/or may activate the example pedestrian-symbol 108 of the example indoor signal device 46.

After the first signal is activated, the example vehicle monitor 5602 determines if a vehicle is present at the loading dock 14 (block 5708). If the example vehicle monitor 5602 determines that a vehicle is not present, the program returns to block 5704. If the vehicle monitor 5602 determines that a vehicle 10 is present at the loading dock at block 5708, the example vehicle monitor 5602 determines if the vehicle is moving in a direction toward the dock face 22 of the loading dock 14 (block 5710). If the vehicle monitor 5602 detects that the vehicle 10 is moving toward the dock face 22 at block 5710, the example vehicle monitor 5602 commands the example signal generator 5610 to activate a second signal (block 5712). For example, the example signal generator 5610 may activate the example red light 64 and the audible alarm 62 of the example outdoor signal device 38.

The program 5700 then returns to block 5710. If the example vehicle monitor 5602 does not detect that the vehicle 10 is moving toward the dock face 22 at block 5710, the example vehicle monitor 5602 determines if the vehicle 10 is moving away from the dock face 22 (block 5714). If the example vehicle monitor 5714 determines that the vehicle 10 is not moving away from the dock face 22, the program 5700 returns to block 5710. If the example vehicle monitor 5714 determines that the vehicle 10 is moving away from the dock face 22, the example signal generator 5610 activates a fourth signal (block 5716). For example, the example signal generator 5610 emits a signal that activates the example green light 66 of the example outdoor signal device 38.

If the example pedestrian monitor 5604 does not detect the presence of a person (e.g., the person 12) at block 5704, the example vehicle monitor 5602 determines if a vehicle is present (block 5718). If the example vehicle monitor 5602 detects the presence of a vehicle 10 at the loading dock 14, the example signal generator 5610 activates a third signal (block 5720). For example, the signal generator 5610 emits a signal that activates the example yellow light signal 68 of the example outdoor signal device 38 and/or the vehicle-symbol 110 of the example indoor signal device 46. The program 5700 then returns to block 5704. If the example vehicle monitor 5602 does not detect the presence of a vehicle at the loading dock 14 at block 5718, the example signal generator 5610 activates a fourth signal (block 5720). For example, the example signal generator 5610 activates the example green light signal 66 of the example outdoor signal device 38 and/or deactivates the example vehicle-symbol 110 and the example pedestrian-symbol 108 of the example indoor signal device 46.

Figure 58:
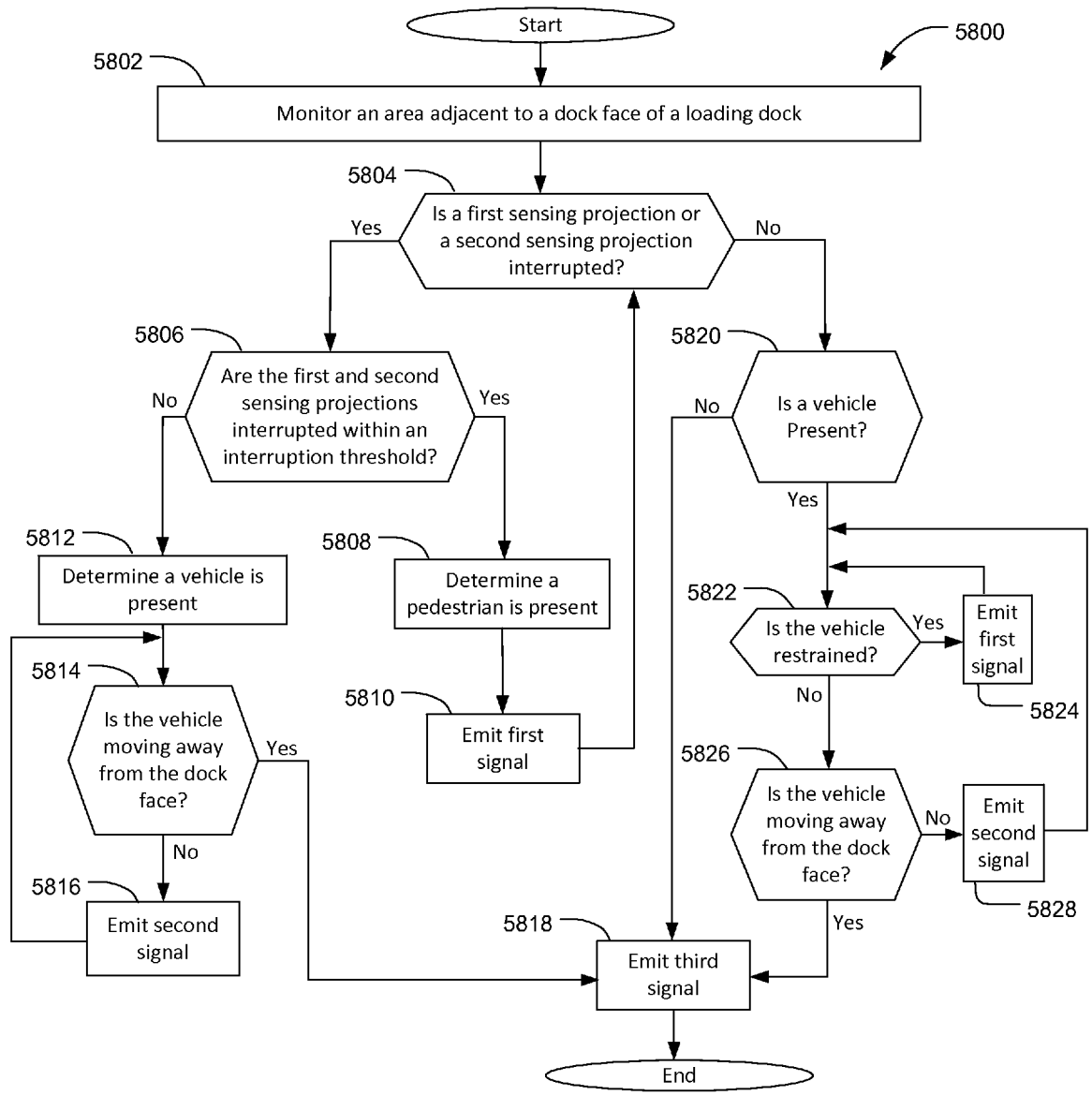

FIG. 58 is a flowchart representative of example machine readable instructions which may be executed to implement the example controller 51 of FIG. 56. The example program 5800 of FIG. 58 begins at block 5802 when the example vehicle monitor 5602 monitors the loading dock 14 for the presence of a vehicle (e.g., the vehicle 10) and the example pedestrian monitor 5604 monitors the area 52a-52g adjacent the dock face 22 of the loading dock 14. During monitoring, the example vehicle monitor 5602 and/or the pedestrian monitor 5604 determine if a first sensing projection (e.g., the example sensing projections 76, 78 or 80 of FIG. 12) or a second sensing projection (e.g., the example sensing projections 76, 78 or 80 of FIG. 12) are interrupted (block 5804). If the example vehicle monitor 5602 and/or the example pedestrian monitor 5604 determine that the first sensing projection or the second sensing projection are interrupted at block 5804, the example vehicle monitor 5602 and/or the example pedestrian monitor 5604 determine if the first and second sensing projections were interrupted within an interruption threshold (e.g., the second sensing projection is interrupted one or more seconds/milliseconds after the first sensing projection is interrupted, the first and second projections are interrupted substantially simultaneously or instantaneously, etc.) (block 5806). If the example vehicle monitor 5602 and/or the example pedestrian monitor 5604 determine that the first and second projections were interrupted within the interruption threshold (e.g., a duration of time in which the second sensing projection is interrupted after the first sensing projection is interrupted, or a duration of time in which the first sensing projection is interrupted after the second sensing projection is interrupted), the example pedestrian monitor 5604 determines that a person 12 is present (block 5808). For example, the example pedestrian monitor 5604 may determine a person 12 is present in the area 52b of FIG. 12 when the example second and third projections 78 and 80 are interrupted within the interruption threshold while the example first projection 76 is uninterrupted. In response, the example signal generator 5610 emits a first signal (block 5810). For example, the first signal emitted by the example signal generator 5610 may activate the example red light signal 64 of the example outdoor signal device 38.

If the example vehicle monitor 5602 and/or the example pedestrian monitor 5604 determine that the first and second sensing projections were not interrupted within the interruption threshold at block 5806, the example vehicle monitor 5602 determines if a vehicle 10 is present at the loading dock 14 (block 5812). For example, the example vehicle monitor 5602 may determine a presence of the vehicle 10 at the loading dock 14 when the example vehicle monitor 5602 receives a first interrupted signal by the example first zone sensor 74*a*, a second interrupted signal by the example second zone sensor 74*b*, and a third interrupted signal by the example third zone sensor 74*c* in sequential order and within a threshold time delay between the respective signal interruptions.

The example vehicle monitor 5602 then determines if the vehicle 10 is moving in a direction away from the dock face 22 (block 5814). For example, the vehicle monitor 5602 of FIG. 56 may receive a signal from the example motion sensor 72 and/or reversal of sequential interrupted-to-uninterrupted signals from the example third zone sensor 74*c*, the example second zone sensor 74*b*, and the example first zone sensor 74*a* as the vehicle 10 departs the loading dock 14. If the example vehicle monitor 5602 determines that the vehicle 10 is moving away from the dock face 22 at block 5814, the example signal generator 5610 activates or otherwise emits a second signal (block 5816). For example, the signal generator 5610 may activate the example green light signal 66 of the outdoor signal device 38. The example program 5800 then returns to block 5814. If the example vehicle monitor 5602 determines that the vehicle 10 is not moving in a direction away from the dock face 22 (i.e., the vehicle 10 is stationary or moving toward the dock face 22) (block 5814), the example signal generator 5610 activates or otherwise emits a third signal (block 5818). For example, the example signal generator 5610 may activate the example green light 66 of the example outdoor signal device 38.

If the example vehicle monitor 5602 and/or the example pedestrian monitor 5604 determine that the first and second sensing projections are not interrupted at block 5804, the example vehicle monitor 5602 determines if a vehicle 10 is present at the loading dock 14 (block 5820). For example, referring to FIG. 12, the vehicle monitor 5602 may receive a signal from the motion sensor 72 to determine the presence of a vehicle 10 if neither of the example sensing projections 76, 78 or 80 have been interrupted. If the example vehicle monitor 5602 detects the presence of a vehicle 10 at the loading dock 14 at block 5820, the example vehicle monitor 5602 determines if the vehicle 10 is restrained (block 5822). For example, the example vehicle restraint 28 may be activated or engaged with the ICC bar 34 of the example vehicle 10. For example, when the example vehicle 10 is restrained, the example vehicle monitor 5602 may receive a signal from a sensor operatively coupled to the example vehicle restraint 28 to indicate that the example vehicle restraint 28 is engaged with the vehicle 10. If the example vehicle monitor 5602 determines that the vehicle 10 is restrained at block 5822, the example signal generator 5610 activates or otherwise emits the first signal (block 5824). If the example vehicle monitor 5602 determines that the vehicle 10 is not restrained by the example vehicle restraint 28 at block 5822, the example vehicle monitor 5602 determines if the vehicle 10 is moving away from the dock face 22 (block 5826). If the example vehicle monitor 5602 determines that the vehicle 10 is moving away from the dock face 22 at block 5826, the example signal generator 5610 activates or otherwise emits the second signal (block 5828). If the example vehicle monitor 5602 determines that the vehicle 10 is not moving away from the dock face 22 at block 5826, the example signal generator 5610 activates or otherwise emits the third signal (e.g., the example green light 64) (block 5818).

Figure 59:
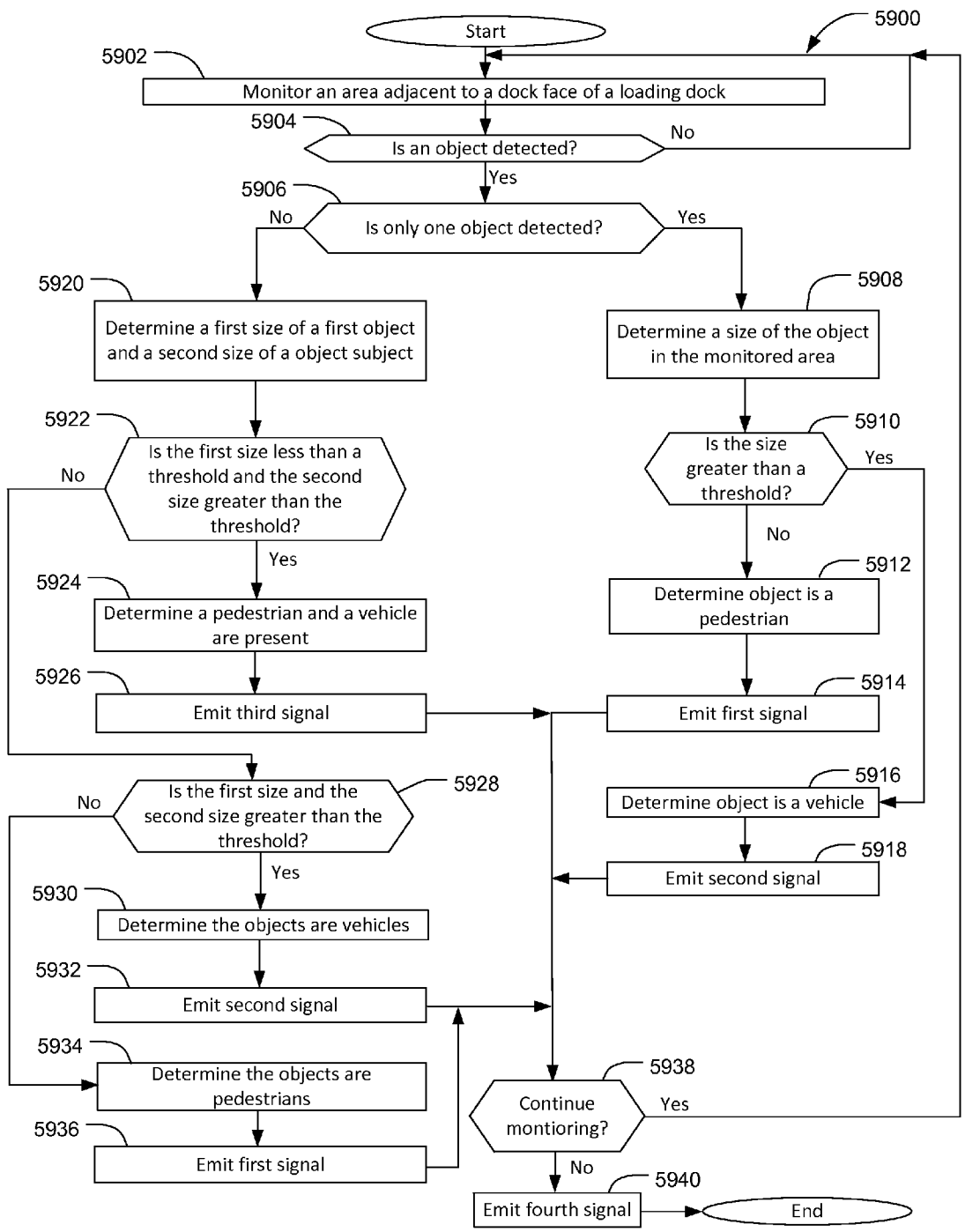

FIG. 59 is a flowchart representative of example machine readable instructions which may be executed to implement the example controller 51 of FIG. 56. The example program 5900 of FIG. 59 begins at block 5902 when the example vehicle monitor 5602 monitors the loading dock 14 for the presence of a vehicle (e.g., the vehicle 10) and the example pedestrian monitor 5604 monitors the area 52*a*-52*g* adjacent to the dock face 22 of the loading dock 14 for the presence of a person (e.g., the person 12) (block 5902). During monitoring, the example vehicle monitor 5602 and/or the example pedestrian monitor 5604 determine if an object (e.g., the vehicle 10, the person 12) is present (block 5904). If the example vehicle monitor 5602 and/or the example pedestrian monitor 5604 do not detect the presence of an object at block 5904, the example program 5900 returns to block 5902. If the example vehicle monitor 5602 and/or the example pedestrian monitor 5604 detect the presence of an object at block 5904, the example vehicle monitor 5602 and/or the example pedestrian monitor 5604 determine if only one object is detected (block 5906).

If only one object is detected at block 5906, the example vehicle monitor 5602 and/or the example pedestrian monitor 5604 determine a size (e.g., a width or length) of the sensed object based on signals received from sensors (e.g., the example presence sensors 74 of FIGS. 12-20) at the loading dock 14 (block 5908). For example, the example first zone sensor 74*a*, the example second zone sensor 74*b* and/or the example third zone sensor 74*c* may send a signal representative of a size (e.g., a width) of the sensed object at the loading dock 14. The example comparator 5614 determines if the size of the object is greater than a threshold (block 5910).

If the example comparator 5614 determines that the size of the object is less than a threshold at block 5910, the example pedestrian monitor 5604 determines that the sensed object is a person (block 5912). For example, the threshold may be a width approximately less than 4 feet and/or a height approximately less than 7 feet from a driving surface (e.g., the example driving surface 89 of FIG. 12 or the example driving surface 340 of FIG. 46). The example pedestrian monitor 5604 causes the example signal generator 5610 to emit a first signal (block 5914). For example, the example signal generator 5910 emits the example red light 64 of the example outdoor signal device 38. If the example comparator 5614 determines that the size of the object is greater than a threshold at block 5910, the example vehicle monitor 5602 determines that the sensed object is a vehicle (block 5916). The example vehicle monitor 5602 causes the example signal generator 5610 to emit a second signal (block 5918). For example, the example signal generator 5910 emits the example yellow light 66 of the example outdoor signal device 38.

If the more than one object is detected at block 5906, the example vehicle monitor 5602 and/or the example pedestrian monitor 5604 determine a size (e.g., a width or a length) of the first sensed object and a size (e.g., a width or length) of the second sensed object based on signals received from sensors (e.g., the example presence sensors 74 of FIGS. 12-20) at the loading dock 14 (block 5920). The example vehicle monitor 5602 and/or the example pedestrian monitor 5604 then determine if the size of the first sensed object is less than the threshold and the size of the second sensed object is greater than the threshold (block 5922). If the example vehicle monitor 5602 and/or the example pedestrian monitor 5604 determine that the size of the first sensed object is less than the threshold and the second size of the second sensed object greater than the threshold at block 5922, the example vehicle monitor 5602 determines that the vehicle 10 is present at the loading dock 14 and the example pedestrian monitor 5604 determines that a person 12 present at the loading dock 14 (block 5924). The example vehicle monitor 5602 and/or the example pedestrian monitor 5604 command the example signal generator 5610 to activate or emit a third signal (block 5926). For example, the example signal generator 5910 emits the example red light 64 and the audible alarm 62 of the example outdoor signal device 38.

If the example vehicle monitor 5602 and/or the example pedestrian monitor 5604 determine that the size of the first sensed object and the size of the second sensed object are greater than the threshold at block 5922, the example vehicle monitor 5602 and/or the example pedestrian monitor 5604 determine that both objects are vehicles (block 5930). The example signal generator 5610 activates or otherwise emits the second signal (e.g., the example yellow light 66) (block 5932). If the example vehicle monitor 5602 and/or the example pedestrian monitor 5604 determine that the size of the first sensed object and the size of the second sensed object are less than the threshold at block 5922, the example vehicle monitor 5602 and/or the example pedestrian monitor 5604 determine that both objects are pedestrians (block 5934). The example signal generator 5610 activates or otherwise emits the first signal (e.g., the example red light 64) (block 5936).

After the first signal is emitted at blocks 5914 or 5936, the second signal is emitted at blocks 5918 or block 5932, or the third signal is emitted at block 5926, the example vehicle monitor 202 and the example pedestrian monitor 204 determine if continued monitoring of the loading dock 14 is needed (block 5938). For example, continued monitoring is needed when the example vehicle monitor 202 and/or the example pedestrian monitor 204 continue to detect the presence of the vehicle 10 and/or the person 12 at the loading dock 14. If continued monitoring is needed, the example program 5900 returns to block 5902. When example vehicle monitor 202 and the example pedestrian monitor 204 do not detect the presence of the vehicle 10 or the person 12 at the loading dock 14 and, thus, continued monitoring is not needed, the example signal generator 5910 emits a fourth signal (block 5940). For example, the example signal generator 5910 emits the example green light 66 of the example outdoor signal device 38.

Figure 60:
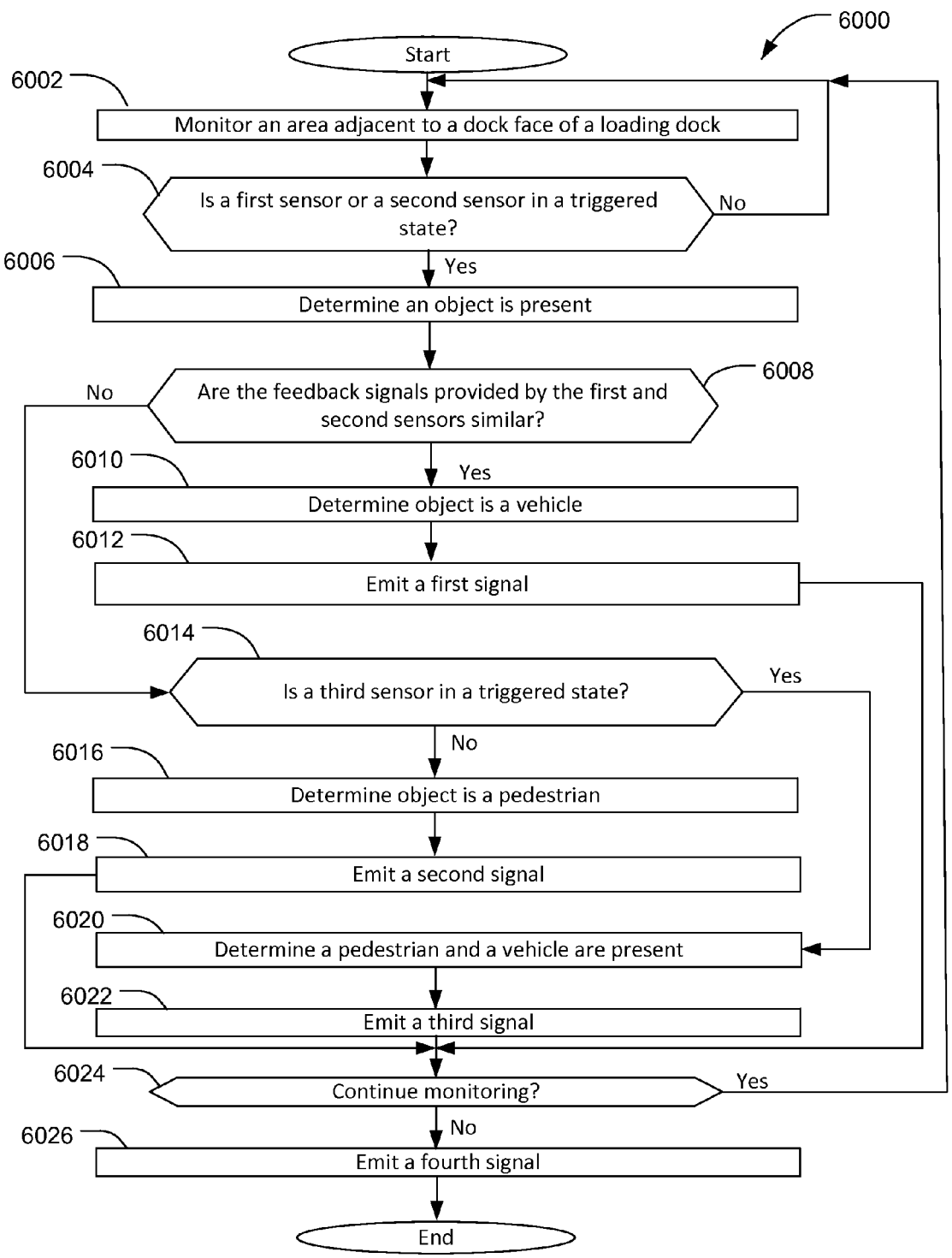

FIG. 60 is a flowchart representative of example machine readable instructions which may be executed to implement the example controller 51 of FIG. 56. The example program 6000 of FIG. 60 begins at block 6002 when the example vehicle monitor 5602 monitors the loading dock 14 for the presence of a vehicle (e.g., the vehicle 10) and the pedestrian monitor 5604 monitors the area 52*a*-52*g* adjacent to the dock face 22 of the loading dock 14 for the presence of a person (e.g., the person 12) (block 6002). To detect the presence of an object (e.g., the example vehicle 10, the example person 12), the example vehicle monitor 5602 and/or the example pedestrian monitor 5604 determine if a first sensor or a second sensor is in a triggered state (block 6004). For example, the example vehicle monitor 5602 and/or the example pedestrian monitor 5604 may receive signals from the example distance sensors 94 of FIGS. 21-31. For example, in the example system 70 of FIGS. 21-31, the example vehicle monitor 5602 and/or the example pedestrian monitor 5604 receive signals representative of the example four sensing projections 96.

The example vehicle monitor 5602 and/or the example pedestrian monitor 5604 determine that an object is not present if neither the first sensor nor the second sensor is in a triggered state at block 6004 (e.g., the example sensing projections 96 are uninterrupted). If the example vehicle monitor 5602 and/or the example pedestrian monitor 5604 determine that the first sensor or the second sensor is in a triggered state at block 6004 (e.g., at least one of the example sensing projections 96 is interrupted), the example vehicle monitor 5602 and/or the example pedestrian monitor 5604 determine that an object is present at the loading dock 14 (block 6006). To determine if the detected object is a vehicle or a person, the example vehicle monitor 5602 and/or the example pedestrian monitor 5604 determine if feedback signals (e.g., distance readings) of the first and second sensors are similar (e.g., a distance of the feedback signals, a time lapse between emitting and receiving the signals, similar in phase, etc.) (block 6008). If feedback signals provided by the first and second sensors are similar at block 6006, the example vehicle monitor 5602 determines that the detected object is a vehicle 10 (block 6010). In turn, the example signal generator 5610 activates or otherwise emits a first signal (block 6012). For example, the example first signal may be indicative of the vehicle 10 being present (e.g., the example yellow light 68 of the outdoor signal device 38).

If the example vehicle monitor 5602 and/or the example pedestrian monitor 5604 determine that the signals are not similar at block 608, the example vehicle monitor 5602 determines if a third sensor is in a triggered state (block 6014). For example, the third sensor may be the example motion sensor 92 of FIG. 21. If the example vehicle monitor 5602 determines that the third sensor is in a non-triggered state at block 6014, then the example pedestrian monitor 5604 determines that the object is a person 12 (block 6016). In turn, the example signal generator 210 activates or otherwise emits a second signal (block 6018). For example, the example second signal may be indicative of the person 12 being within the area 52*a*-52*g* (e.g., the example red light 64 of the outdoor signal device 38).

If the example vehicle monitor 5602 determines that the third sensor is in a triggered state at block 6014, the example vehicle monitor 5602 determines that a vehicle 10 is present at the loading dock 14 and the example pedestrian monitor 5604 determines that a person 12 is present in the area 52*c* (block 6020). In turn, the example signal generator 5610 activates or otherwise emits a third signal (block 6022). For example, the example third signal may be indicative of the person 12 being in the area 52*a*-52*g* while the vehicle 10 is present at the loading dock 14. For example, the example third signal may be the example red light 64 and/or the audible alarm 62 of the example outdoor signal device 38. In some examples, the example vehicle monitor 5602 may detect the direction of movement of the vehicle 10 relative to the dock face 22 of the loading dock 14. For example, if the vehicle monitor 5602 detects that the vehicle 10 is moving toward the dock face 22 while the example pedestrian monitor 5604 detects the person 12 present in the area 52a-52g, the example signal generator 5610 may activate or emit the example red light 64 and the audible alarm 62 of the outdoor signal device 38. If the vehicle 10 is not moving toward the dock face 22, the signal generator 5610 may emit only the example red light 64 of the outdoor signal device 38.

The example vehicle monitor 5602 and/or the example pedestrian monitor 5604 then determine if continued monitoring is needed (block 6024). For example, the example vehicle monitor 5602 determines that continued monitoring is needed when the example vehicle monitor 5602 still detects the presence of the vehicle 10 and/or the example vehicle monitor 5602 detects that the vehicle 10 is not moving in a direction away from the dock face 22 of the loading dock 14. Similarly, the example pedestrian monitor 5604 determines that continued monitoring is needed when the example pedestrian monitor 5604 detects that the person 12 is still present in the area 52a-52g. If continued monitoring is needed at block 6024, the example program 6000 returns to block 6002. If continued monitoring is no longer needed, the example signal generator 5610 activates or otherwise emits a fourth signal (block 6026). For example, the example fourth signal may be the example green light 66 of the example outdoor signal device 38.

Figure 61:
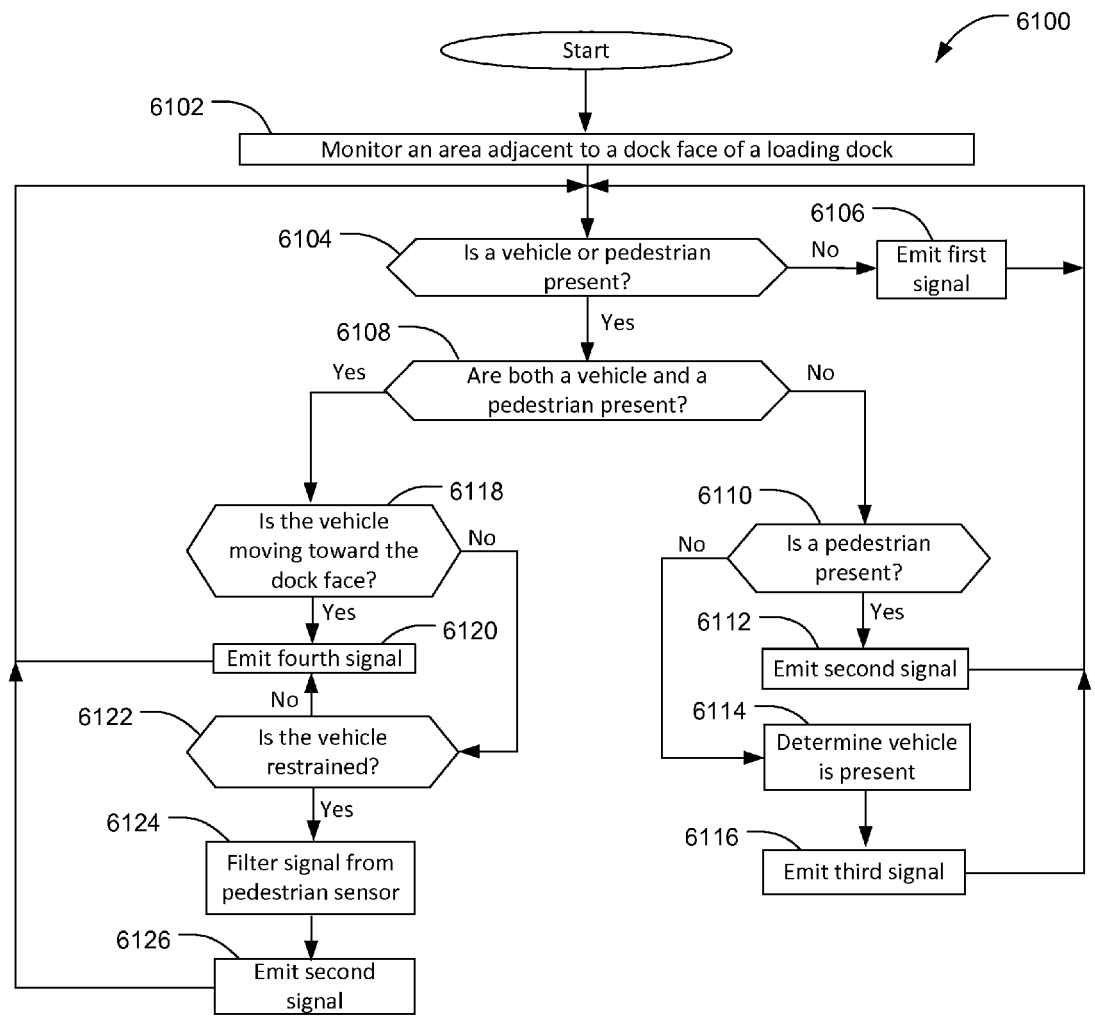

FIG. 61 is a flowchart representative of example machine readable instructions which may be executed to implement the example controller 51 of FIG. 56. The example program 6100 of FIG. 61 begins at block 6102 when the example vehicle monitor 5602 monitors the loading dock 14 for the presence of a vehicle (e.g., the vehicle 10) and the example pedestrian monitor 5604 monitors the area 52a-52g adjacent to the dock face 22 of the loading dock 14 for the presence of a person (e.g., the person 12). The example vehicle monitor 5602 and the example pedestrian monitor 5604 determine whether a vehicle 10 and a person 12 are present at the loading dock 14, respectively (block 6104). For example, referring to the example system 320 of FIGS. 32-34, the example vehicle monitor 5602 and/or the example pedestrian monitor 5604 receive signals from the example pedestrian sensor 321, the example bi-directional sensor 322 and/or the example incoming sensor 323. If neither the vehicle 10 nor the person 12 is present at the loading dock 14 (block 6104), the example signal generator 5610 emits or activates a first signal (block 6106). For example, the example signal generator 5610 may activate the example green light 64 of the example outdoor signal device 38.

If the example vehicle monitor 5602 and/or the example pedestrian monitor 5604 detect the vehicle 10 or the person 12 at block 6104, the example vehicle monitor 5602 and/or the example pedestrian monitor 5604 determine if both the vehicle 10 is present at the loading dock 14 and the person 12 is present in the area 52a-52g (block 6108). If only one of the vehicle 10 or the person 12 is detected at block 6104, the example pedestrian monitor 5604 determines if the person 12 is present (block 6110). For example, the example pedestrian monitor 5604 receives a signal from the example pedestrian sensor 321 of FIGS. 32-40 to determine if the person 12 is present in the area 52e. If the example pedestrian monitor 5604 determines that the person 12 is present (block 6110), the example signal generator 5610 generates a second signal (block 6112). For example, the example second signal activated by the example signal generator 5610 may be the example right light 64 of the example signal device 38. If the example pedestrian monitor 5604 determines that the person 12 is not present (block 6110), the example vehicle monitor 5602 determines that the vehicle 10 is present at loading dock 14 (block 6114). In turn, the example signal generator 5610 activates or otherwise emits a third signal (block 6116). For example, the example third signal generated by the example signal generator 5610 may be the example yellow light 66 of the example outdoor signal device 38.

If the example vehicle monitor 5602 and the example pedestrian monitor 5604 determine that both the vehicle 10 and the person 12 are present at the loading dock 14 at block 6108, the example vehicle monitor 5604 of the illustrated example determines if the vehicle 10 is moving in a direction toward the dock face 22 of the loading dock 14 (block 6118). If the vehicle 10 is moving toward the dock face 22 (block 6118), the example signal generator 5610 activates or otherwise emits a fourth signal (block 6120). For example, the example fourth signal generated by the example signal generator 5610 may be the example red light 64 and the example audible alarm 62 of the example outdoor signal device 38.

If the example vehicle monitor 5602 is not moving toward the dock face 22, the example vehicle monitor 5602 determines if the vehicle 10 is restrained (e.g., via the example vehicle restraint 28) (block 6122). If the vehicle 10 is not restrained, the example signal generator continues to activate or otherwise emit the fourth signal (block 6120). If the vehicle 10 is restrained, the example signal manager 5608 causes the example vehicle monitor 5602 and/or the example pedestrian monitor 5604 to filter (e.g., ignore, bypass, etc.) a signal generated by a pedestrian sensor (block 6124). For example, when the vehicle 10 is restrained at the loading dock 14 via the vehicle restraint 28, the signals generated by the example pedestrian sensor 321, the example bi-directional sensor 322 and/or the example incoming sensor 323 are identified by the example signal identifier 5606. In turn, for example, the example signal manager 5608 causes the example vehicle monitor 5602 and/or the example pedestrian monitor 5604 to ignore signals generated and received from the example pedestrian sensor 321 of FIGS. 32-40. With the signal of the pedestrian sensor filtered or ignored, the example signal generator 5610 generates the second signal (block 6126). For example, the example second signal may be the example red light 64 of the example outdoor signal device 38. In other words, the example audible alarm 62 is not activated with the example red light 64 when the vehicle 10 is restrained via the restraint 28 and the person 12 is present in the area 52a-52g of the loading dock 14.

Figure 62:
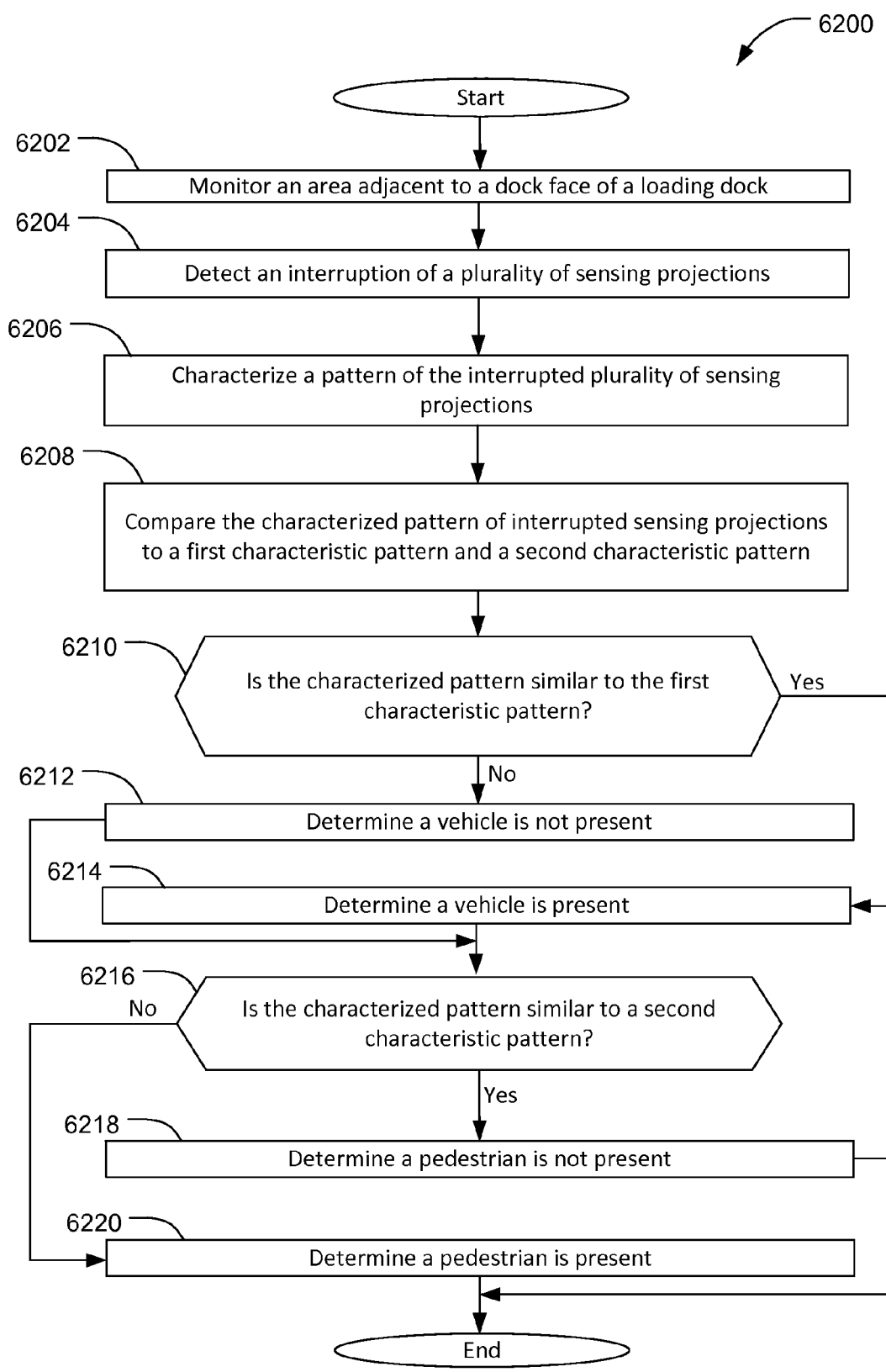

FIG. 62 is a flowchart representative of example machine readable instructions which may be executed to implement the example controller 51 of FIG. 56. The example program 6200 of FIG. 62 begins at block 6202 when the example vehicle monitor 5602 monitors the loading dock 14 and the example pedestrian monitor 5604 monitors the area 52a-52g adjacent the dock face 22 of the loading dock 14. The example vehicle monitor 5602 and the example pedestrian monitor 5604 detect an interruption of a plurality of sensing projections (block 6204). For example, referring to FIGS. 41-45, the example vehicle monitor 5602 and/or the example pedestrian monitor 5604 detect an interruption of the example plurality of sensing projections 104 provided by the example sensor 102. The example vehicle monitor 5602 and/or the example pedestrian monitor 5604 characterize a pattern of the interrupted plurality of sensing projections (block 6206). For example, an example characteristic may include a sequence in which the example plurality of sensing projections 104 are interrupted, a quantity of interrupted sensing projections 104, a distance feedback signal, etc. The example vehicle monitor 5602 compares the characterized pattern of the interrupted sensing projections 104 with a first characteristic pattern (e.g., representative of a vehicle present) and/or the example pedestrian monitor 5604 compares the characterized pattern with a second characteristic pattern (e.g., representative of a person present) (block 6208). For example, the example comparator 5614 compares the characterized pattern with the first characteristic pattern.

The example vehicle monitor 5602 then determines if the characterized pattern is similar (e.g., a match within a threshold, an exact match, etc.) to the first predefined characteristic pattern (block 6210). If the characterized pattern is not similar to the first characteristic pattern at block 6210, then the example vehicle monitor 5602 determines that a vehicle 10 is not present (block 6212). If the characterized pattern is similar to the first characteristic pattern at block 6210, then the example vehicle monitor 5602 determines that the vehicle 10 is present (block 6214).

The example pedestrian monitor 5604 then determines if the characterized pattern is similar (e.g., a match within a threshold, an exact match, etc.) to a second characteristic pattern (block 6216). If the characterized pattern is not similar to the second characteristic pattern at block 6210, then the example pedestrian monitor 5604 determines that the person 12 is not present (block 6218). If the characterized pattern is similar to the second characteristic pattern at block 6210, then the example pedestrian monitor 5604 determines that the person 12 is present (block 6220). The example signal generator 5610, for example, can activate or deactivate a signal (e.g., the signal 63 of FIG. 2) of the example outdoor signal device 38 and/or the indoor signal device 46 based on whether the vehicle 10 and/or the person 12 are present or not present.

Figure 63:
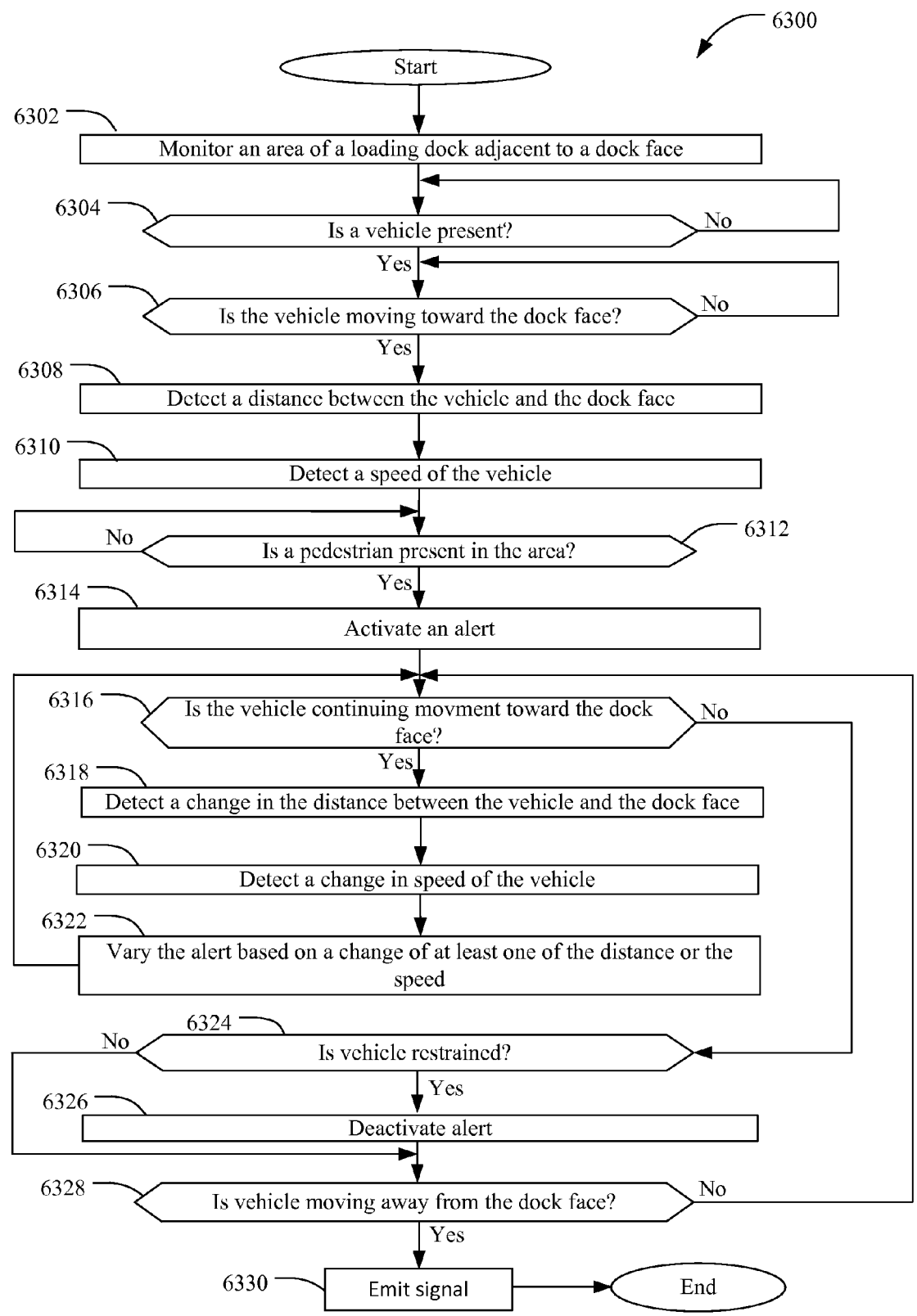

FIG. 63 is a flowchart representative of example machine readable instructions which may be executed to implement the example controller 51 of FIG. 56. The example program 6300 of FIG. 63 begins at block 6302 when the example vehicle monitor 5602 monitors the loading dock 14 and the example pedestrian monitor 5604 monitors the area 52a-52g adjacent to the dock face 22 of the loading dock 14. The example vehicle monitor 5602 detects if a vehicle 10 is present (block 6304). If the example vehicle monitor 5602 detects the vehicle 10 is present at the loading dock 14, the example vehicle monitor 5602 determines if the vehicle 10 is moving toward the dock face 22 of the loading dock 14 (block 6306). For example, the example vehicle monitor 5602 receives different signals from a sensor to determine if a distance changes between the different signals. If the example vehicle monitor 5602 determines that the vehicle 10 is moving toward the dock face 22, the example vehicle monitor 5602 detects a distance between the vehicle 10 and the dock face 22 (block 6308) and/or the example vehicle monitor 5602 detects a speed of the vehicle 10 moving toward the dock face 22 (block 6310).

The example pedestrian monitor 5604 determines if a person 12 is present (block 6312). If the person 12 is present, the example pedestrian monitor 5604 instructs the example signal generator 5610 to generate or emit an alert (block 6314). For example, the alert may be the example audible alarm 62 of the example outdoor signal device 38. When the example pedestrian monitor 5604 detects that the person 12 is present, the example vehicle monitor 5604 continues to monitor the vehicle 10 moving toward the dock face 22 (block 6316). If the example vehicle monitor 5602 determines that the vehicle is moving in a direction toward the dock face 22, the example vehicle monitor 5602 detects a change in a distance between the vehicle 10 and the dock face 22 (block 6318) and/or the example vehicle monitor 5602 detects a change in speed of the vehicle 10 (block 6320). In turn, the example signal generator 5610 varies the alert (e.g., a volume, rate, or frequency of the alert) based on the change of at least one of the distance or the speed of the vehicle 10 (block 6322). If the example vehicle monitor 5602 does not detect that the vehicle 10 is moving toward the dock face 22 at block 6316, the example vehicle monitor 5602 determines if the vehicle 10 is restrained (block 6324). If the vehicle 10 is restrained (e.g., via the restraint 28), the example signal generator 5610 deactivates the alert (block 6326). If the vehicle 10 is not restrained, the example vehicle monitor 5602 determines if the vehicle 10 is moving in a direction away from the dock face 22 (block 6328). If the example vehicle monitor 5602 detects that the vehicle 10 is not moving in a direction away from the dock face 22, the example vehicle monitor 5602 continues to monitor the vehicle 10 to determine if the vehicle 10 starts moving toward the dock face 22 (block 6316). If the example vehicle monitor 5602 determines that the vehicle 10 is moving away from the dock face 22, the example signal generator 5610 emits a signal (e.g., the example green light 66 of the example outdoor signal device 38) (block 6330).

Figure 64:
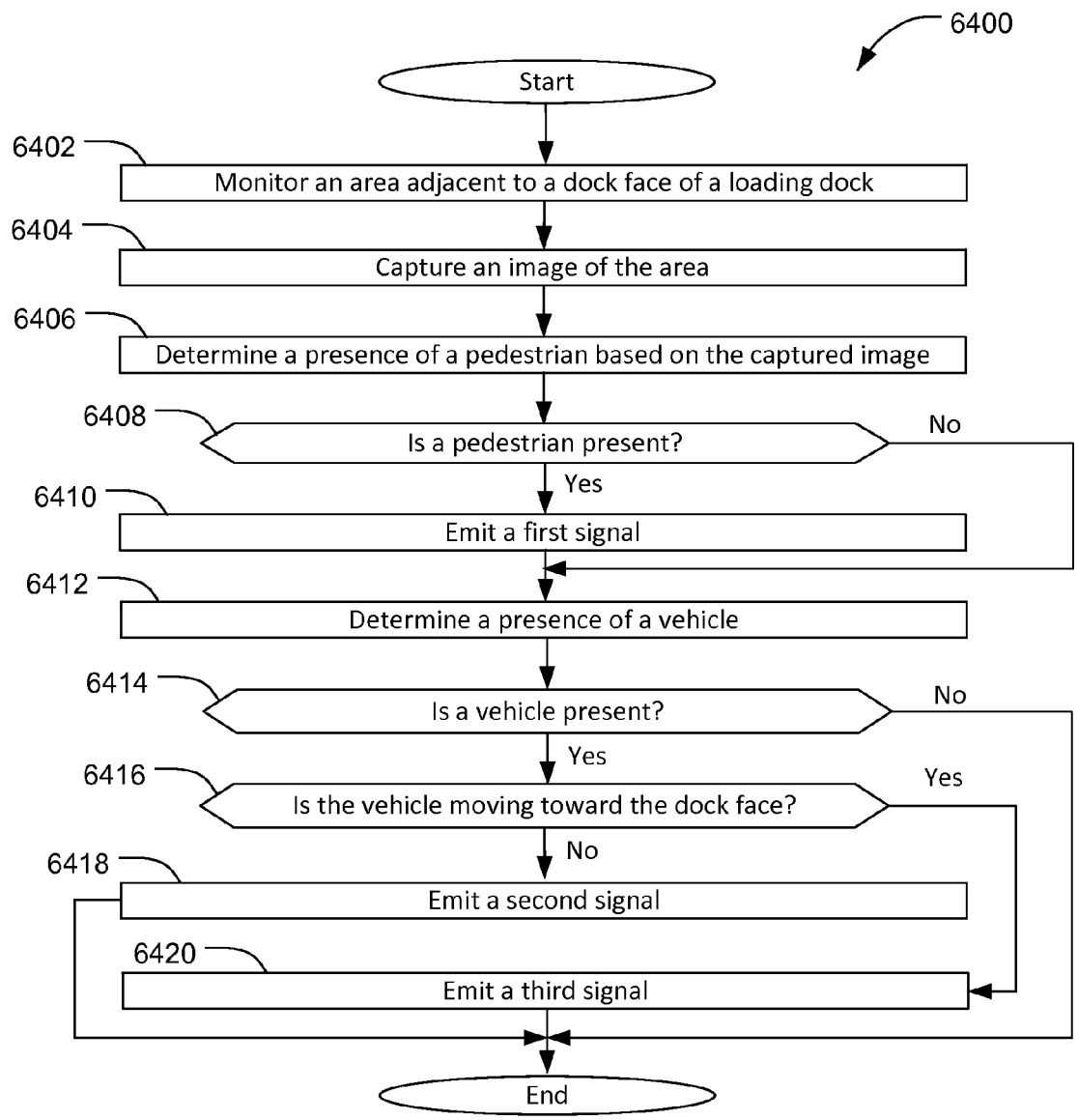

FIG. 64 is a flowchart representative of example machine readable instructions which may be executed to implement the example controller 51 of FIG. 56. The example program 6400 of FIG. 64 begins at block 6402 when the example vehicle monitor 5602 monitors the loading dock 14 and the example pedestrian monitor 5604 monitors the area 52a-52g adjacent to the dock face 22 of the loading dock 14. Referring to the example system 350 of FIGS. 49-51, for example, the example vehicle monitor 5602 and/or the example pedestrian monitor 5604 receives a signal from the example motion sensor 328 and/or an image from the example imaging scanner 352. The example vehicle monitor 5602 and/or the example pedestrian monitor 5604 receive a captured image of the loading dock 14 and/or area 52g (block 6404). For example, the captured image may be a three-dimensional model, a point of interest image, a digital image, and/or any other image.

The example pedestrian monitor 5604 determines if a person 12 is present in the area 52a-52g based on the captured image (block 6408). In some examples, the example pedestrian monitor 5604 determines a dimensional value or envelope of an object or point of interest in the captured image. The example comparator 5614 then compares the dimensional value to a threshold. If the dimensional value is less than a threshold value, the example pedestrian monitor 5604 determines a person is present. In some examples, the example pedestrian monitor 5604 compares, via the example comparator 5614, the captured image to a stored image (e.g., a predetermined or predefined image) to determine the presence of the person 12 in the area 52a-52g. If the person is present at block 6408, the example signal generator 5610 emits or otherwise activates a first signal (e.g., the example red light 64) (block 6410). If a person is not present at block 6408, the example vehicle monitor 5602 determines if the vehicle 10 is present at the loading dock 14 (block 6412). For example, the vehicle monitor 5602 may determine the presence of a vehicle 10 based on a comparison of the captured image with a stored image (e.g., a predetermined image) and/or based on a signal provided by the example motion sensor 328 of FIGS. 49-51. If a vehicle is detected at block 6414, the example vehicle monitor 5602 determines if the vehicle 10 is moving toward the dock face 22 (block 6416). If the vehicle 10 is not moving toward the dock face 22, the example signal generator 5610 emits or otherwise activates a second signal (e.g., the example yellow light 68) (block 6418). If the vehicle 10 is moving toward the dock face 22 while the person 12 is present, the example signal generator 5610 emits or otherwise activates a third signal (e.g., the red light 64 and the audible alarm 62) (block 6420). The example vehicle monitor 5602 and the example pedestrian monitor 5604 determine if continued monitoring is needed (block 6422). If monitoring is still needed due the vehicle 10 and/or the person 12 still present, the example vehicle monitor 5602 and the example pedestrian monitor 5604 monitor the loading dock 14 (block 6402).

Figure 65:
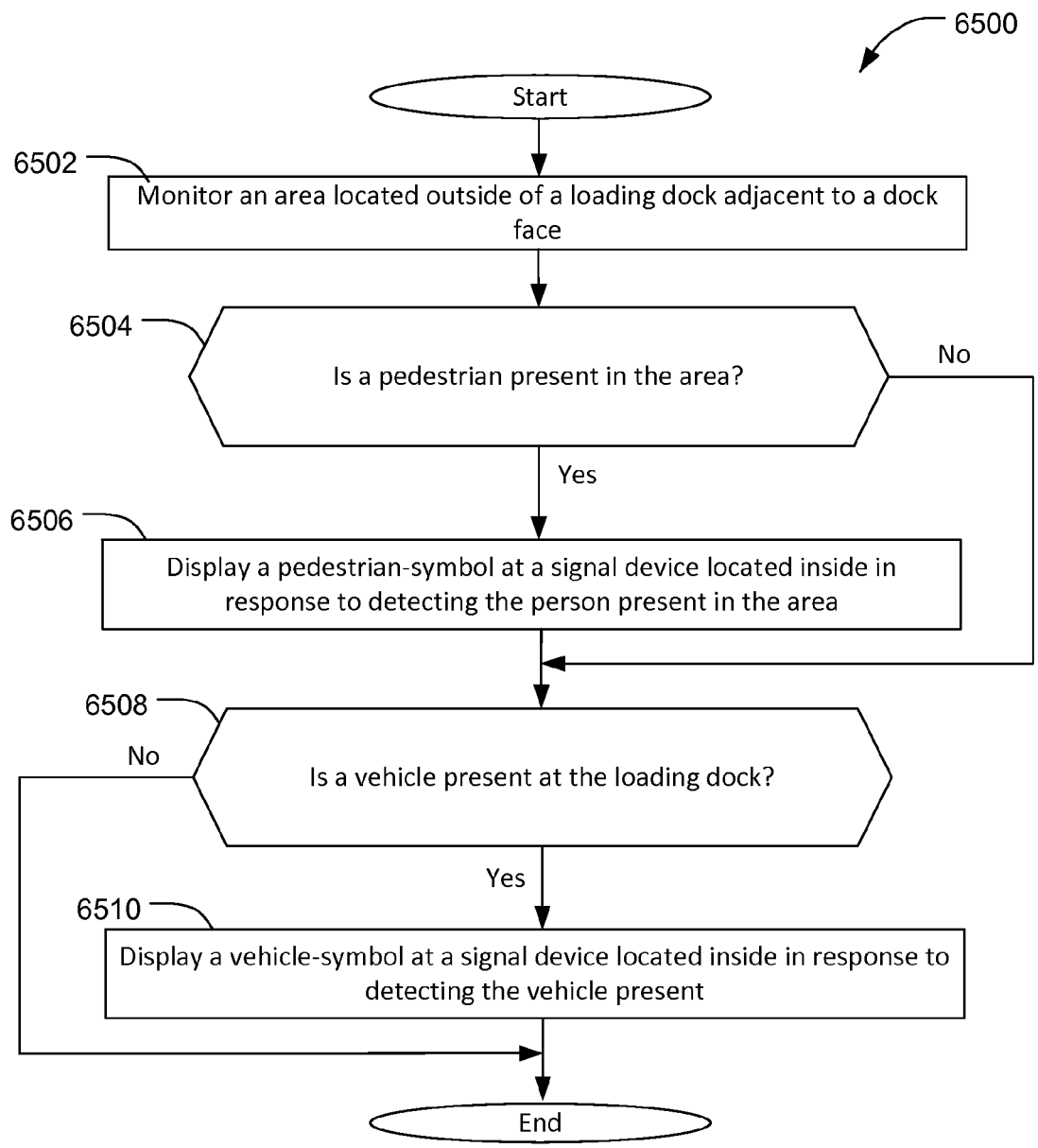

FIG. 65 is a flowchart representative of example machine readable instructions which may be executed to implement the example controller 51 of FIG. 56. The example program 6500 of FIG. 65 begins at block 6502 when the example vehicle monitor 5602 monitors the loading dock 14 and the example pedestrian monitor 5604 monitors the area 52a-52g adjacent the dock face 22 of the loading dock 14. The example pedestrian monitor 5604 determines if the person 12 is present in the area 52a-52g located outside of the loading dock 14 adjacent the dock face 22 (block 6504). If the person is present, the example signal generator 5610 displays a pedestrian-symbol 108 at a signal device (e.g., the example indoor signal device 46) located inside the loading dock 14 in response to detecting the person 12 present in the area 52a-52g (block 6506). If a person is not present at block 1104, the example vehicle monitor 5602 determines if a vehicle 10 is present adjacent the area 52a-52g outside of the loading dock 14 (block 6508). If the example vehicle monitor 5602 determines that the vehicle 10 is present, the example signal generator 5610 displays a vehicle-symbol 110 at the example indoor signal device 46 located inside the loading dock 14 (block 6510).

Figure 66:
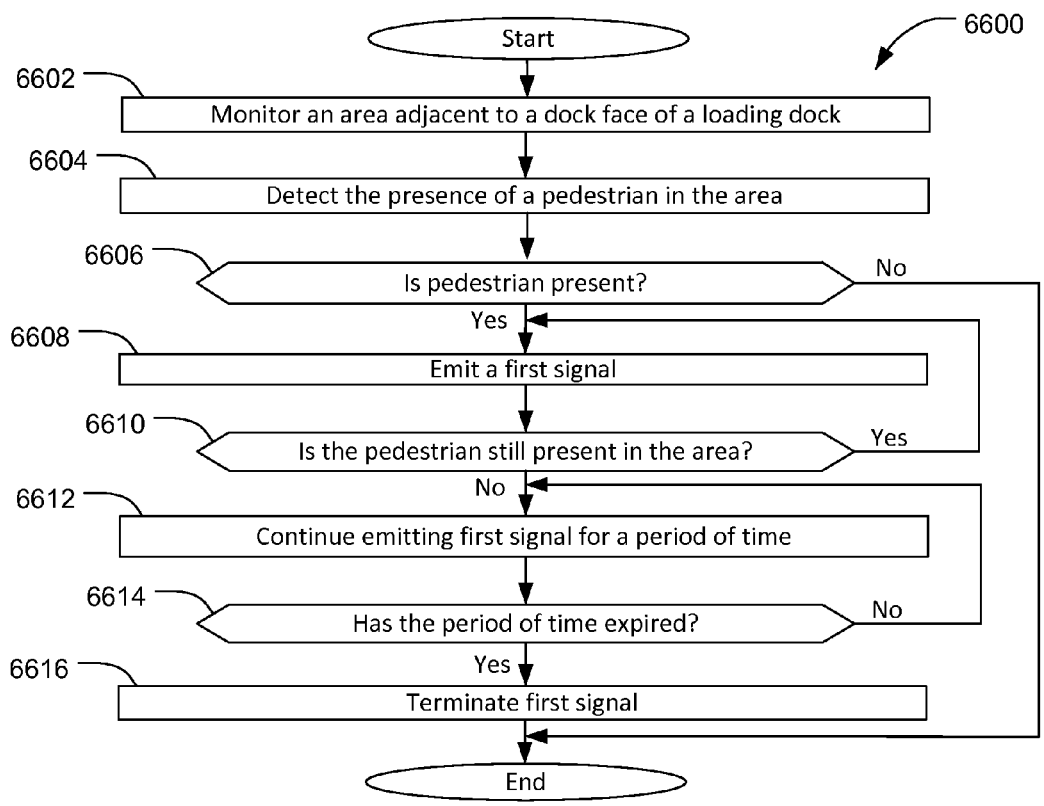

FIG. 66 is a flowchart representative of example machine readable instructions which may be executed to implement the example controller 51 of FIG. 56. The example program 6600 of FIG. 66 begins at block 6602 when the example vehicle monitor 5602 monitors the loading dock 14 and the example pedestrian monitor 5604 monitors the area 52a-52g adjacent the dock face 22 of the loading dock 14. The example pedestrian monitor 5604 determines if the person 12 is present in the area 52a-52g (block 6604). If the example pedestrian monitor 5604 detects the person 12 is present (block 6606), the example signal generator 5610 emits a first signal (block 6608). The example pedestrian monitor 5604 determines if the person 12 is still present in the area 52a-52g (block 6610). If the person is still present, the example signal generator 5610 continues to emit the first signal (block 6608). If the person 12 is no longer present, the example signal generator 5610 continues to emit the first signal for a period of time (e.g., a pre-set period of time, an amount of time, etc.) (block 6612). The example pedestrian monitor 5604 then determines (e.g., via the example timer 5612) if the period of time has expired (block 6614). If the period of time has not expired, the example signal generator 5610 continues to emit the first signal (block 6612). If the period of time has expired, the example signal generator 5610 terminates the first signal (block 6616).

Figure 67:
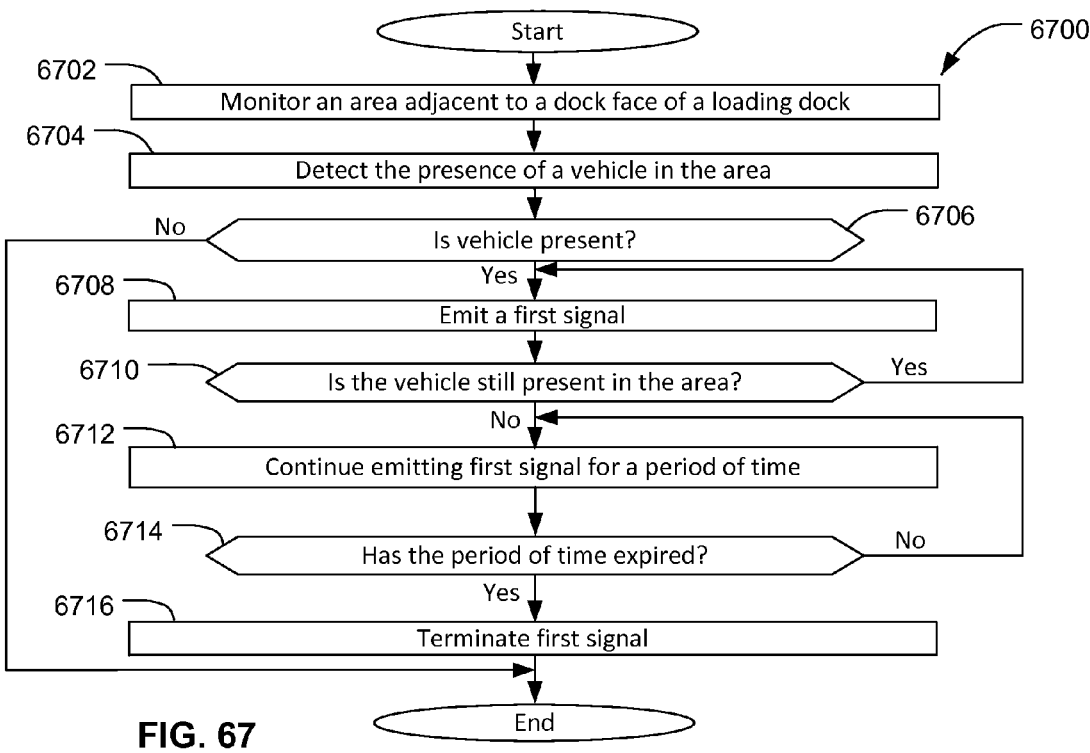

FIG. 67 is a flowchart representative of example machine readable instructions which may be executed to implement the example controller 51 of FIG. 56. The example program 6700 of FIG. 67 begins at block 6702 when the example vehicle monitor 5602 monitors the loading dock 14 and the example pedestrian monitor 5604 monitors the area 52a-52g adjacent to the dock face 22 of the loading dock 14. The example vehicle monitor 5602 determines if the vehicle 10 is present adjacent the area 52a-52f of the loading dock 14 (block 6704). If the example vehicle monitor 5602 detects the vehicle 10 being present (block 6704), the example signal generator 5610 emits a first signal (block 6708). The example vehicle monitor 5602 determines if the vehicle 10 is still present at the loading dock 14 (block 6710). If the vehicle 10 is still present, the example signal generator 5610 continues to emit or otherwise activate the first signal (block 6708). If the vehicle 10 is no longer present (block 6710), the example signal generator 5610 continues to emit the first signal for a period of time (e.g., a pre-set period of time, duration of time, etc.) (block 6712). The example vehicle monitor 5602 then determines (e.g., via the timer 5612) if the period of time has expired (block 6714). If the period of time has not expired, the example signal generator 5610 continues to emit the first signal (block 6712). If the period of time has expired at block 6714, the example signal generator 5610 terminates the first signal (block 6716).

Figure 68:
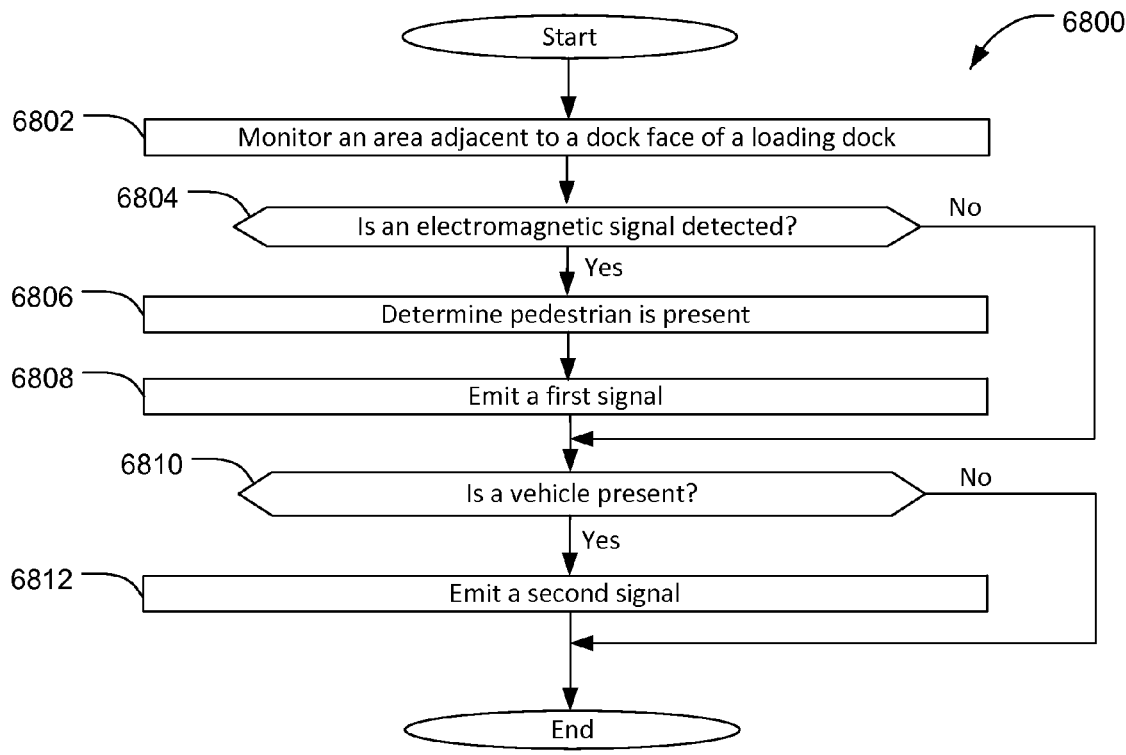

FIG. 68 is a flowchart representative of example machine readable instructions which may be executed to implement the example controller 51 of FIG. 56. The example program 6800 of FIG. 68 begins at block 6802 when the example vehicle monitor 5602 monitors the loading dock 14 and the example pedestrian monitor 5604 monitors the area 52a-52g adjacent to the dock face 22 of the loading dock 14. The example pedestrian monitor 5604 detects an electromagnetic signal (block 6804). For example, a person (e.g., the person 12) can carry a device 35 that emits an electromagnetic signal. If an electromagnetic signal is detected (block 6804), the example pedestrian monitor 5604 determines that a person is present (block 6806). In turn, the example signal generator 5610 emits a first signal (block 6808). The example vehicle monitor 5602 then detects if the vehicle 10 is present (block 6810). If the vehicle 10 is present at block 6810, the example signal generator 5610 emits a second signal (block 6812). In some examples, the second signal is provided in the vehicle 10. For example, the second signal may activate a signal device 37 carried by the driver of the vehicle 10 and/or a signal device 37 positioned on and/or in the vehicle 10.

Figure 69:
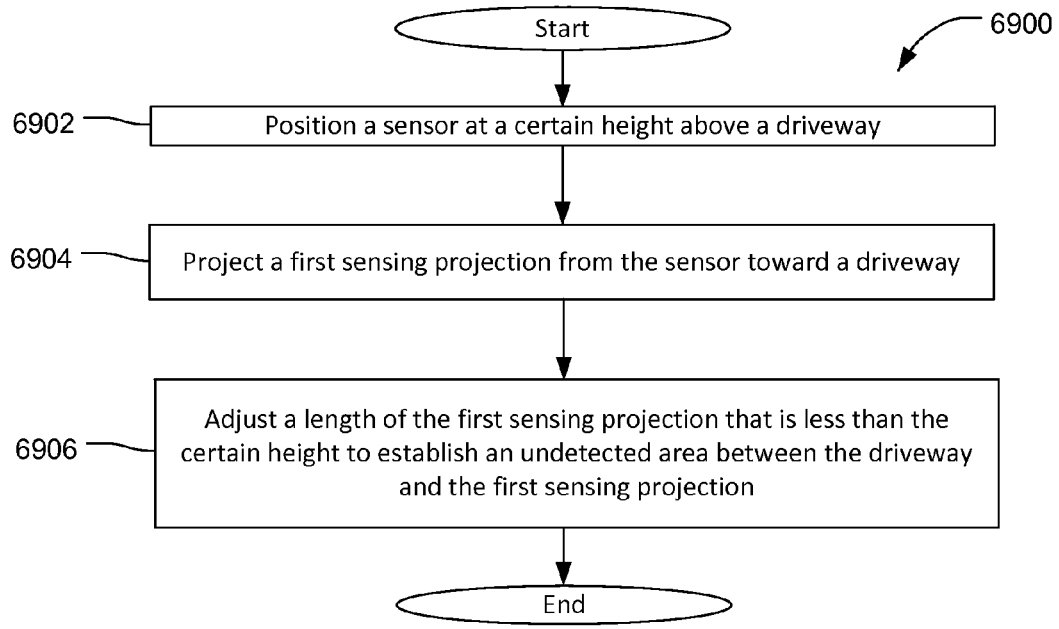
FIG. 69 is a flowchart representative of an example method of implementing an example system in accordance with the teachings disclose herein.

FIG. 69 is a flowchart representative of an example method of implementing a system at the loading dock 14. To implement the system, a sensor is positioned at a certain height above a doorway (block 6902). For example, referring to the example system 326 of FIGS. 46-48, the example presence sensor 330 is positioned a height 338 above the driveway 340. A first sensing projection from a sensor is projected toward a driveway (block 6904). A length of the first sensing projection is adjusted to a length that is less than the certain height to establish an undetected area between the driveway and the first sensing projection (block 6906). For example, the presence sensor 330 projects sensing projections 332 that extend the distance 336 that is less than the height 338 to provide the undetected area 342.

Figure 70:
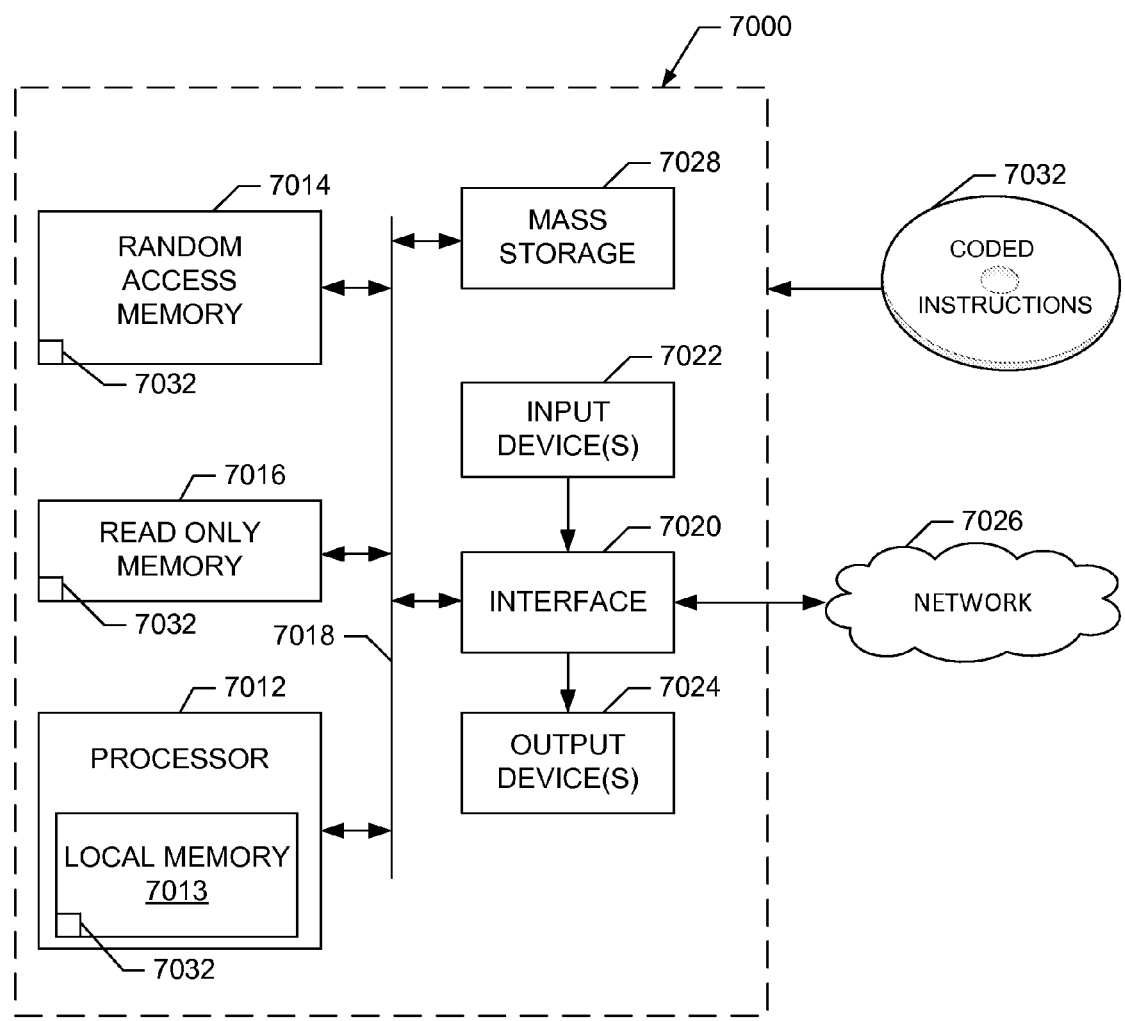
FIG. 70 is a block diagram of an example processor platform capable of executing the instructions of FIGS. 57-68 to implement an example controller of FIGS. 1-56.

FIG. 70 is a block diagram of an example processor platform 1000 capable of executing the instructions of FIGS. 57-68 to implement the apparatus of FIG. 56. The processor platform 1000 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a personal video recorder, a set top box, or any other type of computing device.

The processor platform 7000 of the illustrated example includes a processor 7012. The processor 1012 of the illustrated example is hardware. For example, the processor 7012 can be implemented by one or more integrated circuits, logic circuits, microprocessors or controllers from any desired family or manufacturer.

The processor 7012 of the illustrated example includes a local memory 7013 (e.g., a cache). The processor 7012 of the illustrated example is in communication with a main memory including a volatile memory 7014 and a non-volatile memory 7016 via a bus 7018. The volatile memory 7014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 7016 may be implemented by flash memory and/or any other desired type of memory device. Access to the main memory 7014, 7016 is controlled by a memory controller.

The processor platform 7000 of the illustrated example also includes an interface circuit 7020. The interface circuit 7020 may be implemented by any type of interface standard, such as an Ethernet interface, a universal serial bus (USB), and/or a PCI express interface.

In the illustrated example, one or more input devices 7022 are connected to the interface circuit 7020. The input device(s) 7022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 7024 are also connected to the interface circuit 7020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 7020 of the illustrated example, thus, typically includes a graphics driver card, a graphics driver chip or a graphics driver processor.

The interface circuit 7020 of the illustrated example also includes a communication device such as a transmitter, a receiver, a transceiver, a modem and/or network interface card to facilitate exchange of data with external machines (e.g., computing devices of any kind) via a network 7026 (e.g., an Ethernet connection, a digital subscriber line (DSL), a telephone line, coaxial cable, a cellular telephone system, etc.).

The processor platform 7000 of the illustrated example also includes one or more mass storage devices 7028 for storing software and/or data. Examples of such mass storage devices 7028 include floppy disk drives, hard drive disks, compact disk drives, Blu-ray disk drives, RAID systems, and digital versatile disk (DVD) drives.

The coded instructions 7032 of FIGS. 57-67 may be stored in the mass storage device 7028, in the volatile memory 7014, in the non-volatile memory 7016, and/or on a removable tangible computer readable storage medium such as a CD or DVD.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A method for detecting a subject at a loading dock that includes an indoor area, an outdoor area, a doorway between the indoor area and the outdoor area, and a dock face generally facing in a forward direction toward the outdoor area, the method comprising:
   projecting, via a sensor, a first sensing projection and a second sensing projection relative to the dock face, the first sensing projection to extend a first sensing length relative to the dock face and the second sensing projection to extend a second sensing length relative to the dock face, the second sensing length being greater than the first sensing length;
   detecting an interruption of at least one of the first sensing projection or the second sensing projection by a subject;
   determining that the subject is a person when the subject interrupts the first sensing projection and the second sensing projection simultaneously; and
   determining that the subject is a vehicle when the subject interrupts the second sensing projection before interrupting the first sensing projection in response to the vehicle moving toward the dock face.

2. The method of claim 1, wherein the first sensing length and the second sensing length extend away from the dock face.

3. The method of claim 1, wherein the method further comprising determining, via a motion sensor, whether the vehicle is moving toward the dock face.

4. The method of claim 1, further comprising:
   determining, via a motion sensor, whether the vehicle is moving relative to the dock face; and
   selectively engaging and releasing the vehicle at the loading dock via a vehicle restraint.

5. The method of claim 4, further including emitting a first signal in response to at least one of the following:
   a. the vehicle restraint engaging the vehicle at the loading dock, and
   b. determining that the person is interrupting the first sensing projection and the second sensing projection.

6. The method of claim 5, further including emitting a second signal in response to at least one of the following:
   a. the motion sensor determining the vehicle is moving back toward the dock face while the first sensing projection and the second sensing projection are uninterrupted;
   b. the motion sensor determining the vehicle is moving back toward the dock face while the vehicle is interrupting at least one of the first sensing projection and the second sensing projection; or
   c. the motion sensor determining the vehicle is not moving while the vehicle is interrupting at least one of the first sensing projection and the second sensing projection.

7. The method of claim 6, further including emitting a third signal in response to at least one of the following:
   a. the motion sensor determining the vehicle is not moving back toward the dock face while the first sensing projection and the second sensing projection are uninterrupted;
   b. the motion sensor determining the vehicle is not moving back toward the dock face while the vehicle restraint is releasing the vehicle; and
   c. the motion sensor, the first sensing projection, and the second sensing projection are uninterrupted by the subject.

8. The method of claim 7, wherein the first signal is red, the second signal is yellow, and the third signal is green.

9. The method of claim 1, wherein the sensor is an ultrasonic sensor.

10. A method for detecting a subject at a loading dock having a doorway between an indoor area and an outdoor area, the loading dock including a dock face, the method comprising:
monitoring an area adjacent a loading dock by sensing a width of the area via a first sensor and a second sensor;
sensing, whether the first sensor or the second sensor is in a triggered state;
determining that a vehicle is present in the area when the first sensor and the second sensor are in the triggered state and are providing two substantially equivalent feedback signals; and
determining that a person is present in the area and a vehicle is not present in the area when at least one of the first sensor or the second sensor is in the triggered state, and the first sensor and the second sensor provide different feedback signals.

11. The method of claim 10, further comprising:
monitoring the area proximate the dock face via a third sensor to determine whether the vehicle is present at the loading dock; and
determining that both the person is present within the area and the vehicle is present at the loading dock when the third sensor determines that the vehicle is present while at least one of the first sensor or the second sensor is in the triggered state providing different feedback signals.

12. The method of claim 10, further including:
determining whether a person is present within an area proximate the dock face;
emitting a first signal in response to determining the person is present within the area;
detecting a vehicle being present at the loading dock;
detecting movement of the vehicle in a direction toward the dock face;
emitting a second signal in response to the detecting movement of the vehicle toward the dock face when detecting the person is not present the area; and
emitting a third signal in response to determining that the person is present within the area and detecting movement of the vehicle toward the dock face.

13. The method of claim 12, wherein the first signal, the second signal and the third signal are distinguishable from each other.

14. The method of claim 12, further comprising:
detecting movement of the vehicle in a direction away from the dock face; and
emitting a fourth signal in response to detecting movement of the vehicle in a direction away from the dock face.

15. A method for detecting a subject at a loading dock that includes an indoor area, an outdoor area and a doorway between the indoor area and the outdoor area, and a dock face generally facing in a forward direction toward the outdoor area, the method comprising:
emitting a plurality of sensing projections angularly distributed within approximately a ninety-degree range in an array covering a monitored area;
detecting an interruption pattern of the plurality of sensing projections, the interruption pattern including a sequence and a quantity of interrupted sensing projections;
comparing the detected interruption pattern to a first predefined interruption pattern and a second predefined interruption pattern; and
based on the comparison of the detected interruption pattern, determining at least one of a person is present when a first sensing projection of the plurality of sensing projections is interrupted or a vehicle is present at the loading dock when more than two sensing projections are interrupted simultaneously.

16. The method of claim 15, further comprising:
during a first period, determining the person being present at the outdoor area and determining that the vehicle is not moving towards the dock;
emitting a first signal during the first period;
during a second period, determining the vehicle is moving toward the dock and determining that the person is not present at the outdoor area;
emitting a second signal during the second period;
during a third period, determining both the person and the vehicle being present at the outdoor area; and
emitting a third signal during the third period, wherein the first signal, the second signal and the third signal are distinguishable from each other.

17. The method of claim 15, wherein the sensing projections are angularly distributed to cover an area greater than the ninety-degree range.

18. The method of claim 15, wherein the monitored area is less than ninety degrees.

19. The method of claim 15, further comprising determining whether the vehicle is moving in a direction away from the dock face based on the comparison of the detected interrupted pattern.

20. The method of claim 15, further comprising determining whether the vehicle is moving toward the dock face based on the comparison of the detected interrupted pattern.

21. The method of claim 15, further comprising emitting the plurality of sensing projections from a single enclosure.

22. The method of claim 15, wherein the sensing projections are planar sensing projections.

23. A method for detecting a subject at a loading dock that includes an indoor area, an outdoor area and a doorway between the indoor area and the outdoor area, and a dock face generally facing in a forward direction toward the outdoor area, the method comprising:
sensing, via a first sensor, a person within an area proximate the dock face;
sensing, via a second sensor, a vehicle moving toward the dock face;
emitting, via a processor, an alert in response to sensing the person present within the area while the vehicle is moving in a direction toward the dock face;
detecting, via the processor, a change in speed of the vehicle as the vehicle is moving toward the dock face; and
varying, via the processor, the alert based on the change in speed.

* * * * *